US008244858B2

(12) United States Patent
Firminger et al.

(10) Patent No.: US 8,244,858 B2
(45) Date of Patent: *Aug. 14, 2012

(54) ACTION EXECUTION BASED ON USER MODIFIED HYPOTHESIS

(75) Inventors: Shawn P. Firminger, Redmond, WA (US); Jason Garms, Redmond, WA (US); Edward K. Y. Jung, Bellevue, WA (US); Chris D. Karkanias, Sammamish, WA (US); Eric C. Leuthardt, St. Louis, MO (US); Royce A. Levien, Lexington, MA (US); Robert W. Lord, Seattle, WA (US); Mark A. Malamud, Seattle, WA (US); John D. Rinaldo, Jr., Bellevue, WA (US); Clarence T. Tegreene, Bellevue, WA (US); Kristin M. Tolle, Redmond, WA (US); Lowell L. Wood, Jr., Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 470 days.

This patent is subject to a terminal disclaimer.

(21) Appl. No.: 12/462,201

(22) Filed: Jul. 29, 2009

(65) Prior Publication Data
US 2010/0131446 A1 May 27, 2010

Related U.S. Application Data

(63) Continuation-in-part of application No. 12/313,659, filed on Nov. 21, 2008, now Pat. No. 8,046,455, and a continuation-in-part of application No. 12/315,083, filed on Nov. 26, 2008, now Pat. No. 8,005,948, and a continuation-in-part of application No. 12/319,135, filed on Dec. 31, 2008, now Pat. No. 7,937,465, and a continuation-in-part of application No. 12/319,134, filed on Dec. 31, 2008, now Pat. No. 7,945,632, and a continuation-in-part of application No. 12/378,162, filed on Feb. 9, 2009, now Pat. No. 8,028,063, and a continuation-in-part of application No. 12/378,288, filed on Feb. 11, 2009, now Pat. No. 8,032,628, and a continuation-in-part of application No. 12/380,409, filed on Feb. 25, 2009, now Pat. No. 8,010,662, and a continuation-in-part of application No. 12/380,573, filed on Feb. 26, 2009, and a continuation-in-part of application No. 12/383,581, filed on Mar. 24, 2009, and a continuation-in-part of application No. 12/383,817, filed on Mar. 25, 2009, now Pat. No. 8,010,663, and a continuation-in-part of application No. 12/384,660, filed on Apr. 6, 2009, and a continuation-in-part of application No. 12/384,779, filed on Apr. 7, 2009, and a continuation-in-part of application No. 12/387,487, filed on Apr. 30, 2009, now Pat. No. 8,086,668, and a continuation-in-part of application No. 12/387,465, filed on Apr. 30, 2009, now Pat. No. 8,103,613, and a continuation-in-part of application No. 12/455,309, filed on May 28, 2009, now Pat. No. 8,010,664, and a continuation-in-part of application No. 12/455,317, filed on May 29, 2009, and a continuation-in-part of application No. 12/456,249, filed on Jun. 12, 2009, and a continuation-in-part of application No. 12/456,433, filed on Jun. 15, 2009, and a continuation-in-part of application No. 12/459,775, filed on Jul. 6, 2009, now Pat. No. 8,127,002, and a continuation-in-part of application No. 12/459,854, filed on Jul. 7, 2009, and a continuation-in-part of application No. 12/462,128, filed on Jul. 28, 2009.

(51) Int. Cl.
*G06F 15/16* (2006.01)
*G06F 11/30* (2006.01)

(52) U.S. Cl. ........ 709/224; 709/206; 709/217; 709/203; 706/11; 706/46; 706/54; 706/12; 706/59; 702/185; 702/183; 715/810; 715/764

(58) Field of Classification Search ................ 709/224, 709/217, 206, 203
See application file for complete search history.

(56) References Cited

U.S. PATENT DOCUMENTS

| | | | |
|---|---|---|---|
| 3,599,149 A | 8/1971 | Pardoe | |
| 6,697,800 B1 | 2/2004 | Jannink et al. | |
| 6,952,658 B2 * | 10/2005 | Greulich et al. | 702/185 |
| 7,203,430 B2 | 4/2007 | Ohta | |
| 7,400,928 B2 | 7/2008 | Hatlestsad | |
| 7,627,544 B2 | 12/2009 | Chkodrov et al. | |
| 7,937,465 B2 * | 5/2011 | Firminger et al. | 709/224 |
| 7,945,632 B2 * | 5/2011 | Firminger et al. | 709/206 |
| 8,005,948 B2 * | 8/2011 | Firminger et al. | 709/224 |
| 8,010,604 B2 | 8/2011 | Lapstun et al. | |
| 8,010,662 B2 * | 8/2011 | Firminger et al. | 709/224 |
| 8,010,663 B2 * | 8/2011 | Firminger et al. | 709/224 |
| 8,010,664 B2 * | 8/2011 | Firminger et al. | 709/224 |
| 8,028,063 B2 * | 9/2011 | Firminger et al. | 709/224 |
| 8,032,628 B2 * | 10/2011 | Firminger et al. | 709/224 |
| 8,046,455 B2 * | 10/2011 | Firminger et al. | 709/224 |
| 8,086,668 B2 * | 12/2011 | Firminger et al. | 709/203 |
| 8,127,002 B2 * | 2/2012 | Firminger et al. | 709/224 |
| 2003/0166277 A1 | 9/2003 | Zauderer et al. | |
| 2004/0010184 A1 | 1/2004 | Kenknight et al. | |
| 2004/0103108 A1 | 5/2004 | Andreev et al. | |
| 2005/0015217 A1 * | 1/2005 | Weidl et al. | 702/185 |
| 2005/0043922 A1 * | 2/2005 | Weidl et al. | 702/183 |
| 2005/0049988 A1 * | 3/2005 | Dahlquist et al. | 706/46 |
| 2005/0102578 A1 | 5/2005 | Bliss et al. | |
| 2006/0034430 A1 | 2/2006 | Liakis | |
| 2006/0058590 A1 | 3/2006 | Shaw et al. | |
| 2007/0293731 A1 | 12/2007 | Downs et al. | |
| 2008/0034056 A1 | 2/2008 | Renger et al. | |
| 2008/0059232 A1 | 3/2008 | Iliff | |
| 2008/0091515 A1 | 4/2008 | Thieberger et al. | |
| 2008/0215607 A1 | 9/2008 | Kaushansky et al. | |
| 2008/0218472 A1 | 9/2008 | Breen et al. | |
| 2008/0262872 A1 | 10/2008 | Perry et al. | |
| 2009/0049154 A1 | 2/2009 | Ge | |
| 2009/0077658 A1 | 3/2009 | King et al. | |
| 2009/0083208 A1 * | 3/2009 | Raghavan et al. | 706/47 |
| 2009/0132197 A1 | 5/2009 | Rubin et al. | |
| 2009/0240647 A1 | 9/2009 | Green et al. | |
| 2009/0276221 A1 | 11/2009 | Heiman et al. | |
| 2009/0326981 A1 | 12/2009 | Karkanias et al. | |
| 2010/0010866 A1 | 1/2010 | Bal et al. | |
| 2010/0088104 A1 | 4/2010 | DeRemer et al. | |
| 2010/0092095 A1 | 4/2010 | King et al. | |

FOREIGN PATENT DOCUMENTS

| | | |
|---|---|---|
| WO | WO 99/18842 | 4/1999 |

OTHER PUBLICATIONS

Agger, Michael; "Every Day We Write the Book: What would happen if Facebook made its data available for research?"; Slate; bearing date of Nov. 30, 2010; printed on Dec. 10, 2010; pp. 1-3; located at: http://www.slate.com/formatdynamics/CleanPrintProxy.aspx?1292008532368.

"Self-tracking links to get you started"; The Quantified Self: self knowledge through numbers; printed on Dec. 10, 2010; pp. 1-5; located at: http://quantifiedself.com/self-tracking-links-to-get-you-started/.

U.S. Appl. No. 12/462,128, Firminger et al.
U.S. Appl. No. 12/459,854, Firminger et al.
U.S. Appl. No. 12/459,775, Firminger et al.
U.S. Appl. No. 12/456,433, Firminger et al.
U.S. Appl. No. 12/456,249, Firminger et al.
U.S. Appl. No. 12/455,317, Firminger et al.
U.S. Appl. No. 12/455,309, Firminger et al.
U.S. Appl. No. 12/387,487, Firminger et al.
U.S. Appl. No. 12/387,465, Firminger et al.
U.S. Appl. No. 12/384,779, Firminger et al.
U.S. Appl. No. 12/384,660, Firminger et al.
U.S. Appl. No. 12/383,817, Firminger et al.
U.S. Appl. No. 12/383,581, Firminger et al.
U.S. Appl. No. 12/380,573, Firminger et al.
U.S. Appl. No. 12/380,409, Firminger et al.
U.S. Appl. No. 12/378,288, Firminger et al.
U.S. Appl. No. 12/378,162, Firminger et al.
U.S. Appl. No. 12/319,135, Firminger et al.
U.S. Appl. No. 12/319,134, Firminger et al.
U.S. Appl. No. 12/315,083, Firminger et al.
U.S. Appl. No. 12/313,659, Firminger et al.

Diaz, Jesus; "One Day, This Will Be Remembered as the First Real Tricorder"; gizmodo.com; bearing a date of Nov. 12, 2009; pp. 1-2; located at http://gizmodo.com/5403126/one-day-this-will-be-re-membered-as-the . . . ; printed on Nov. 25, 2009.

Gross, Daniel; "A Jewish Mother in Your Cell Phone"; Slate; bearing a date of Nov. 10, 2009; pp. 1-3; located at http://www.slate.com/formatdynamics/CleanPrintProxy.aspx?125919 . . . ; printed on Nov. 25, 2009.

Buchanan, Matt; "Twitter Toilet Tweets Your Poo"; Gizmodo.com; Bearing a date of May 18, 2009; Printed on Jul. 1, 2009; pp. 1-2; located at http://gizmodo.com/5259381/twitter-toilet-tweets-your-poo.

"Find Patterns in Data that Identify Combinations of Events that Occur Together"; SPSS Association Rule Components; Bearing a date of 2002; 5 Total Pages; SPSS Inc.; located at: http://www.spss.com/spssetd/files/AssocRuleTech.pdf.

"Find Sequential Patterns in Data to Predict Events More Accurately"; SPSS Sequence Association™ Component; Bearing a date of 2002; pp. 1-5; SPSS Inc.; located at: http://www.spss.com/spssetd/files/sequencetech.pdf.

Fox, Stuart; "The John 2.0"; Popular Science; Bearing a date of May 18, 2009; Printed on Jul. 1, 2009; pp. 1-2; located at http://www.popsci.com/scitech/article/2009-05/john-20.

Frucci, Adam; "SNIF Dog Tags Track What Your Dog Does All Day; Spoiler: Eat, Sleep, Poop"; Gizmodo.com; Bearing a date of Jun. 10, 2009; Printed on Jul. 1, 2009; pp. 1-2; located at http://i.gizmodo.com/5286076/snif-dog-tags-track-what-your-dog-does-all-day-spoiler-eat-sleep-poop.

"Hacklab.Toilet—a twitter-enabled toilet at hacklab.to"; Aculei.net; Printed on Jul. 1, 2009; pp. 1-8; located at http://aculei.net/~shardy/hacklabtoilet/.

Hansen, et al.; "Microblogging—Facilitating Tacit Knowledge?"—A Second Year Term Paper; Information Management Study at Copenhagen Business School; Bearing a date of 2008; pp. 1-42; located at http://www.scribd.com/doc/3460679/Microblogging-as-a-Facilitator-for-Tacit-Knowledge.

June, Laura; "Apple patent filing shows off activity monitor for skiers, bikers"; Engadget.com; Bearing a date of Jun. 11, 2009; Printed on Jul. 1, 2009; pp. 1-8; located at http://www.engadget.com/2009/06/11/apple-patent-filing-shows-off-activity-monitor-for-skiers-biker/.

Kraft, Caleb; "Twittering toilet"; Hackaday.com; Bearing a dated of May 5, 2009; Printed on Jul. 1, 2009; pp. 1-11; located at http://hackaday.com/2009/05/05/twittering-toilet/.

"Mobile pollution sensors deployed"; BBC News; Bearing a date of Jun. 30, 2009; Printed on Jul. 1, 2009; pp. 1-2; located at http://news.bbc.co.uk/2/hi/science/nature/8126498.stm; BBC MMIX.

Morales, et al.; "Using Sequential Pattern Mining for Links Recommendation in Adaptive Hypermedia Educational Systems"; Current Developments in Technology-Assisted Education; Bearing a date of 2006; pp. 1016-1020; FORMATEX 2006; located at: http://www.formatex.org/micte2006/pdf/1016-1020.pdf.

Nesbit, et al.; "Sequential Pattern Analysis Software for Educational Event Data"; pp. 1-5; Simon Fraser University, Burnaby, Canada; located at: http://www.sfu.ca/~mzhou2/temp/MB2008_1.pdf.

Oliver, Sam; "Apple developing activity monitor for skiers snowboarders, bikers."; AppleInsider; Bearing a date of Jun. 11, 2009; Printed on Jul. 1, 2009; pp. 1-6; located at http://www.appleinsider.com/articles/09/06/11/apple_developing_activity_monitor_for_skiers_snowboarders_bikers.html; AppleInsider.

Reiss, M.; "Correlations Between Changes in Mental States and Thyroid Activity After Different Forms of Treatment"; The British Journal of Psychology—Journal of Mental Science; Bearing dates of Mar. 6, 1954 and 1954; pp. 687-703 [Abstract only provided]; located at http://bjp.rcpsych.org/cgi/content/abstract/100/420/687; The Royal College of Psychiatrists.

Rettner, Rachael; "Technology, Cell Phones Allow Everyone to be a Scientist"; LiveScience; Bearing a date of Jun. 4, 2009; Printed on Jul. 1, 2009; pp. 1-3; located at http://www.livescience.com/technology/090604-mobile-sensor.html; Imaginova Corp.

Karimi, A. et al.; "A Predictive Location Model for Location-Based Services"; *GIS*'03; Nov. 7-8, 2003; pp. 126-133; ACM.

Ulicny, B. et al.; "New Metrics for Blog Mining"; Data Mining, Intrusion Detection, Information Assurance, and Data Networks Security 2007; Proceedings of the SPIE; 2007; 12 pages; vol. 6570.

\* cited by examiner

*Primary Examiner* — Jude Jean Gilles

(57) ABSTRACT

A computationally implemented method includes, but is not limited to: presenting to a user a hypothesis identifying at least a relationship between a first event type and a second event type; receiving from the user one or more modifications to modify the hypothesis; and executing one or more actions based, at least in part, on a modified hypothesis resulting, at least in part, from the reception of the one or more modifications. In addition to the foregoing, other method aspects are described in the claims, drawings, and text forming a part of the present disclosure.

46 Claims, 25 Drawing Sheets

104 Modification Reception Module

218 User Interface Reception Module

220 Network Reception Module

222 Electronic Entry Reception Module

224 Blog Entry Reception Module

226 Status Report Reception Module

228 Electronic Message Reception Module

230 Diary Entry Reception Module

FIG. 2b

108' Action Execution Module

232' Advisory Presentation Module

234' User Interface Indication Module

236' Network Transmission Module

238' Modified Hypothesis Presentation Module

240' Prediction Presentation Module

242' Recommendation Presentation Module

244' Justification Presentation Module

246' Past Event Presentation Module

248' Device Prompting Module

250' Device Instruction Module

252' Device Activation Module

254' Device Configuration Module

FIG. 2g

ACTION EXECUTION BASED ON USER MODIFIED HYPOTHESIS

RELATED APPLICATIONS

For purposes of the USPTO extra-statutory requirements, the present application constitutes a continuation-in-part of United States Patent Application No. Unknown, entitled ACTION EXECUTION BASED ON USER MODIFIED HYPOTHESIS, naming Shawn P. Firminger, Jason Garms, Edward K. Y. Jung, Chris D. Karkanias, Eric C. Leuthardt, Royce A. Levien, Robert W. Lord, Mark A. Malamud, John D. Rinaldo, Jr., Clarence T. Tegreene, Kristin M. Tolle, and Lowell L. Wood, Jr., as inventors, filed 28 Jul. 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/313,659, entitled CORRELATING SUBJECTIVE USER STATES WITH OBJECTIVE OCCURRENCES ASSOCIATED WITH A USER, naming Shawn P. Firminger, Jason Garms, Edward K. Y. Jung, Chris D. Karkanias, Eric C. Leuthardt, Royce A. Levien, Robert W. Lord, Mark A. Malamud, John D. Rinaldo, Jr., Clarence T. Tegreene, Kristin M. Tolle, and Lowell L. Wood, Jr., as inventors, filed 21 Nov. 2008 now U.S. Pat. No. 8,046,455, or is an application of which a currently co-pending application is entitled to the benefit of the filing date.

For purposes of the USPTO extra-statutory requirements, the present application constitutes a continuation-in-part of U.S. patent application Ser. No. 12/315,083, entitled CORRELATING SUBJECTIVE USER STATES WITH OBJECTIVE OCCURRENCES ASSOCIATED WITH A USER, naming Shawn P. Firminger, Jason Garms, Edward K. Y. Jung, Chris D. Karkanias, Eric C. Leuthardt, Royce A. Levien, Robert W. Lord, Mark A. Malamud, John D. Rinaldo, Jr., Clarence T. Tegreene, Kristin M. Tolle, and Lowell L. Wood, Jr., as inventors, filed 26 Nov. 2008 now U.S. Pat. No. 8,005,948, or is an application of which a currently co-pending application is entitled to the benefit of the filing date.

For purposes of the USPTO extra-statutory requirements, the present application constitutes a continuation-in-part of U.S. patent application Ser. No. 12/319,135, entitled CORRELATING DATA INDICATING AT LEAST ONE SUBJECTIVE USER STATE WITH DATA INDICATING AT LEAST ONE OBJECTIVE OCCURRENCE ASSOCIATED WITH A USER, naming Shawn P. Firminger; Jason Garms; Edward K. Y. Jung; Chris D. Karkanias; Eric C. Leuthardt; Royce A. Levien; Robert W. Lord; Mark A. Malamud; John D. Rinaldo, Jr.; Clarence T. Tegreene; Kristin M. Tolle; Lowell L. Wood, Jr. as inventors, filed 31 Dec. 2008 now U.S. Pat. No. 7,937,465, or is an application of which a currently co-pending application is entitled to the benefit of the filing date.

For purposes of the USPTO extra-statutory requirements, the present application constitutes a continuation-in-part of U.S. patent application Ser. No. 12/319,134, entitled CORRELATING DATA INDICATING AT LEAST ONE SUBJECTIVE USER STATE WITH DATA INDICATING AT LEAST ONE OBJECTIVE OCCURRENCE ASSOCIATED WITH A USER, naming Shawn P. Firminger; Jason Garms; Edward K. Y. Jung; Chris D. Karkanias; Eric C. Leuthardt; Royce A. Levien; Robert W. Lord; Mark A. Malamud; John D. Rinaldo, Jr.; Clarence T. Tegreene; Kristin M. Tolle; Lowell L. Wood, Jr. as inventors, filed 31 Dec. 2008 now U.S. Pat. No. 7,945,632, or is an application of which a currently co-pending application is entitled to the benefit of the filing date.

For purposes of the USPTO extra-statutory requirements, the present application constitutes a continuation-in-part of U.S. patent application Ser. No. 12/378,162, entitled SOLICITING DATA INDICATING AT LEAST ONE OBJECTIVE OCCURRENCE IN RESPONSE TO ACQUISITION OF DATA INDICATING AT LEAST ONE SUBJECTIVE USER STATE, naming Shawn P. Firminger; Jason Garms; Edward K. Y. Jung; Chris D. Karkanias; Eric C. Leuthardt; Royce A. Levien; Robert W. Lord; Mark A. Malamud; John D. Rinaldo, Jr.; Clarence T. Tegreene; Kristin M. Tolle; Lowell L. Wood, Jr. as inventors, filed 9 Feb. 2009 now U.S. Pat. No. 8,028,063, or is an application of which a currently co-pending application is entitled to the benefit of the filing date.

For purposes of the USPTO extra-statutory requirements, the present application constitutes a continuation-in-part of U.S. patent application Ser. No. 12/378,288, entitled SOLICITING DATA INDICATING AT LEAST ONE OBJECTIVE OCCURRENCE IN RESPONSE TO ACQUISITION OF DATA INDICATING AT LEAST ONE SUBJECTIVE USER STATE, naming Shawn P. Firminger; Jason Garms; Edward K. Y. Jung; Chris D. Karkanias; Eric C. Leuthardt; Royce A. Levien; Robert W. Lord; Mark A. Malamud; John D. Rinaldo, Jr.; Clarence T. Tegreene; Kristin M. Tolle; Lowell L. Wood, Jr. as inventors, filed 11 Feb. 2009 now U.S. Pat. No. 8,032,628, or is an application of which a currently co-pending application is entitled to the benefit of the filing date.

For purposes of the USPTO extra-statutory requirements, the present application constitutes a continuation-in-part of U.S. patent application Ser. No. 12/380,409, entitled SOLICITING DATA INDICATING AT LEAST ONE SUBJECTIVE USER STATE IN RESPONSE TO ACQUISITION OF DATA INDICATING AT LEAST ONE OBJECTIVE OCCURRENCE, naming Shawn P. Firminger; Jason Garms; Edward K. Y. Jung; Chris D. Karkanias; Eric C. Leuthardt; Royce A. Levien; Robert W. Lord; Mark A. Malamud; John D. Rinaldo, Jr.; Clarence T. Tegreene; Kristin M. Tolle; Lowell L. Wood, Jr. as inventors, filed 25 Feb. 2009 now U.S. Pat. No. 8,010,662, or is an application of which a currently co-pending application is entitled to the benefit of the filing date.

For purposes of the USPTO extra-statutory requirements, the present application constitutes a continuation-in-part of U.S. patent application Ser. No. 12/380,573, entitled SOLICITING DATA INDICATING AT LEAST ONE SUBJECTIVE USER STATE IN RESPONSE TO ACQUISITION OF DATA INDICATING AT LEAST ONE OBJECTIVE OCCURRENCE, naming Shawn P. Firminger; Jason Garms; Edward K. Y. Jung; Chris D. Karkanias; Eric C. Leuthardt; Royce A. Levien; Robert W. Lord; Mark A. Malamud; John D. Rinaldo, Jr.; Clarence T. Tegreene; Kristin M. Tolle; Lowell L. Wood, Jr. as inventors, filed 26 Feb. 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/383,581, entitled CORRELATING DATA INDICATING SUBJECTIVE USER STATES ASSOCIATED WITH MULTIPLE USERS WITH DATA INDICATING OBJECTIVE OCCURRENCES, naming Shawn P. Firminger, Jason Garms, Edward K. Y. Jung, Chris D. Karkanias, Eric C. Leuthardt, Royce A. Levien, Robert W. Lord, Mark A. Malamud, John D. Rinaldo, Jr., Clarence T. Tegreene, Kristin M. Tolle, and Lowell L. Wood, Jr., as inventors, filed 24 Mar. 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/383,817, entitled CORRELATING DATA INDICATING SUBJECTIVE USER STATES ASSOCIATED WITH MULTIPLE USERS WITH DATA INDICATING OBJECTIVE OCCURRENCES, naming Shawn P. Firminger, Jason Garms, Edward K. Y. Jung, Chris D. Karkanias, Eric C. Leuthardt, Royce A. Levien, Robert W. Lord, Mark A. Malamud, John D. Rinaldo, Jr., Clarence T. Tegreene, Kristin M. Tolle, and Lowell L. Wood, Jr., as inventors, filed 25 Mar. 2009 now U.S. Pat. No. 8,010,663, or is an application of which a currently co-pending application is entitled to the benefit of the filing date.

For purposes of the USPTO extra-statutory requirements, the present application constitutes a continuation-in-part of U.S. patent application Ser. No. 12/384,660, entitled HYPOTHESIS BASED SOLICITATION OF DATA INDICATING AT LEAST ONE SUBJECTIVE USER STATE, naming Shawn P. Firminger, Jason Garms, Edward K. Y. Jung, Chris D. Karkanias, Eric C. Leuthardt, Royce A. Levien, Robert W. Lord, Mark A. Malamud, John D. Rinaldo, Jr., Clarence T. Tegreene, Kristin M. Tolle, and Lowell L. Wood, Jr., as inventors, filed 6 Apr. 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/384,779, entitled HYPOTHESIS BASED SOLICITATION OF DATA INDICATING AT LEAST ONE SUBJECTIVE USER STATE, naming Shawn P. Firminger, Jason Garms, Edward K. Y. Jung, Chris D. Karkanias, Eric C. Leuthardt, Royce A. Levien, Robert W. Lord, Mark A. Malamud, John D. Rinaldo, Jr., Clarence T. Tegreene, Kristin M. Tolle, and Lowell L. Wood, Jr., as inventors, filed 7 Apr. 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/387,487, entitled HYPOTHESIS BASED SOLICITATION OF DATA INDICATING AT LEAST ONE OBJECTIVE OCCURRENCE, naming Shawn P. Firminger, Jason Garms, Edward K. Y. Jung, Chris D. Karkanias, Eric C. Leuthardt, Royce A. Levien, Robert W. Lord, Mark A. Malamud, John D. Rinaldo, Jr., Clarence T. Tegreene, Kristin M. Tolle, and Lowell L. Wood, Jr., as inventors, filed 30 Apr. 2009 now U.S. Pat. No. 8,086,668, or is an application of which a currently co-pending application is entitled to the benefit of the filing date.

For purposes of the USPTO extra-statutory requirements, the present application constitutes a continuation-in-part of U.S. patent application Ser. No. 12/387,465, entitled HYPOTHESIS BASED SOLICITATION OF DATA INDICATING AT LEAST ONE OBJECTIVE OCCURRENCE, naming Shawn P. Firminger, Jason Garms, Edward K. Y. Jung, Chris D. Karkanias, Eric C. Leuthardt, Royce A. Levien, Robert W. Lord, Mark A. Malamud, John D. Rinaldo, Jr., Clarence T. Tegreene, Kristin M. Tolle, and Lowell L. Wood, Jr., as inventors, filed 30 Apr. 2009 now U.S. Pat. No. 8,103,613, or is an application of which a currently co-pending application is entitled to the benefit of the filing date.

For purposes of the USPTO extra-statutory requirements, the present application constitutes a continuation-in-part of U.S. patent application Ser. No. 12/455,309, entitled HYPOTHESIS DEVELOPMENT BASED ON SELECTIVE REPORTED EVENTS, naming Shawn P. Firminger, Jason Garms, Edward K. Y. Jung, Chris D. Karkanias, Eric C. Leuthardt, Royce A. Levien, Robert W. Lord, Mark A. Malamud, John D. Rinaldo, Jr., Clarence T. Tegreene, Kristin M. Tolle, and Lowell L. Wood, Jr., as inventors, filed 28 May 2009 now U.S. Pat. No. 8,010,664, or is an application of which a currently co-pending application is entitled to the benefit of the filing date.

For purposes of the USPTO extra-statutory requirements, the present application constitutes a continuation-in-part of U.S. patent application Ser. No. 12/455,317, entitled HYPOTHESIS DEVELOPMENT BASED ON SELECTIVE REPORTED EVENTS, naming Shawn P. Firminger, Jason Garms, Edward K. Y. Jung, Chris D. Karkanias, Eric C. Leuthardt, Royce A. Levien, Robert W. Lord, Mark A. Malamud, John D. Rinaldo, Jr., Clarence T. Tegreene, Kristin M. Tolle, and Lowell L. Wood, Jr., as inventors, filed 29 May 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/456,249, entitled HYPOTHESIS SELECTION AND PRESENTATION OF ONE OR MORE ADVISORIES, naming Shawn P. Firminger, Jason Garms, Edward K. Y. Jung, Chris D. Karkanias, Eric C. Leuthardt, Royce A. Levien, Robert W. Lord, Mark A. Malamud, John D. Rinaldo, Jr., Clarence T. Tegreene, Kristin M. Tolle, and Lowell L. Wood, Jr., as inventors, filed 12 Jun. 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/456,433, entitled HYPOTHESIS SELECTION AND PRESENTATION OF ONE OR MORE ADVISORIES, naming Shawn P. Firminger, Jason Garms, Edward K. Y. Jung, Chris D. Karkanias, Eric C. Leuthardt, Royce A. Levien, Robert W. Lord, Mark A. Malamud, John D. Rinaldo, Jr., Clarence T. Tegreene, Kristin M. Tolle, and Lowell L. Wood, Jr., as inventors, filed 15 Jun. 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/459,775, entitled HYPOTHESIS DEVELOPMENT BASED ON USER AND SENSING DEVICE DATA, naming Shawn P. Firminger, Jason Garms, Edward K. Y. Jung, Chris D. Karkanias, Eric C. Leuthardt, Royce A. Levien, Robert W. Lord, Mark A. Malamud, John D. Rinaldo, Jr., Clarence T. Tegreene, Kristin M. Tolle, and Lowell L. Wood, Jr., as inventors, filed 6 Jul. 2009 now U.S. Pat. No. 8,127,002, or is an application of which a currently co-pending application is entitled to the benefit of the filing date.

For purposes of the USPTO extra-statutory requirements, the present application constitutes a continuation-in-part of U.S. patent application Ser. No. 12/459,854, entitled HYPOTHESIS DEVELOPMENT BASED ON USER AND SENSING DEVICE DATA, naming Shawn P. Firminger, Jason Garms, Edward K. Y. Jung, Chris D. Karkanias, Eric C. Leuthardt, Royce A. Levien, Robert W. Lord, Mark A. Malamud, John D. Rinaldo, Jr., Clarence T. Tegreene, Kristin M. Tolle, and Lowell L. Wood, Jr., as inventors, filed 7 Jul. 2009, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, Benefit of Prior-Filed Application, USPTO Official Gazette Mar. 18, 2003, available at http://www.uspto.gov/web/offices/com/sol/og/2003/week11/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)). All subject matter of the Related Applications and of any and all parent, grandparent, great-grandparent, etc. applications of the Related Applications is incorporated herein by reference to the extent such subject matter is not inconsistent herewith.

SUMMARY

A computationally implemented method includes, but is not limited to presenting to a user a hypothesis identifying at least a relationship between a first event type and a second event type; receiving from the user one or more modifications to modify the hypothesis; and executing one or more actions based, at least in part, on a modified hypothesis resulting, at least in part, from the reception of the one or more modifications. In addition to the foregoing, other method aspects are described in the claims, drawings, and text forming a part of the present disclosure.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

A computationally implemented system includes, but is not limited to: means for presenting to a user a hypothesis identifying at least a relationship between a first event type and a second event type; means for receiving from the user one or more modifications to modify the hypothesis; and means for executing one or more actions based, at least in part, on a modified hypothesis resulting, at least in part, from the reception of the one or more modifications. In addition to the foregoing, other system aspects are described in the claims, drawings, and text forming a part of the present disclosure.

A computationally implemented system includes, but is not limited to: circuitry for presenting to a user a hypothesis identifying at least a relationship between a first event type and a second event type; circuitry for receiving from the user one or more modifications to modify the hypothesis; and circuitry for executing one or more actions based, at least in part, on a modified hypothesis resulting, at least in part, from the reception of the one or more modifications. In addition to the foregoing, other system aspects are described in the claims, drawings, and text forming a part of the present disclosure.

A computer program product including a signal-bearing medium bearing one or more instructions presenting to a user a hypothesis identifying at least a relationship between a first event type and a second event type; one or more instructions for receiving from the user one or more modifications to modify the hypothesis; and one or more instructions for executing one or more actions based, at least in part, on a modified hypothesis resulting, at least in part, from the reception of the one or more modifications. In addition to the foregoing, other computer program product aspects are described in the claims, drawings, and text forming a part of the present disclosure.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

FIG. 2b shows another perspective of the modification reception module 104 of the computing device 10 of FIG. 1b.

FIG. 2d shows another perspective of the mobile device 30 of FIG. 1a.

FIG. 2g shows another perspective of the action execution module 108' of the mobile device 30 of FIG. 2d.

DETAILED DESCRIPTION

Figure 1A:
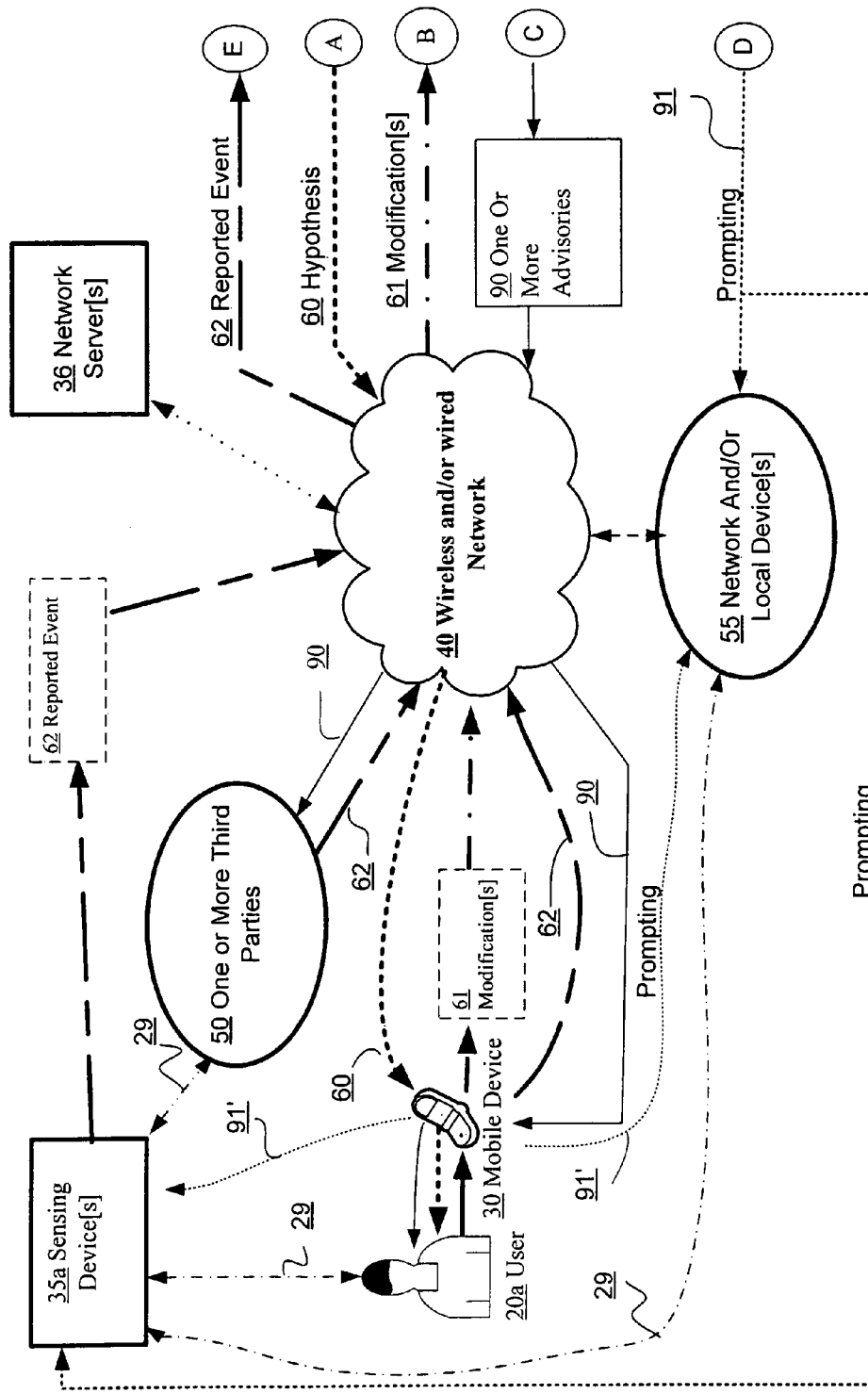
FIGS. 1a and 1b show a high-level block diagram a computing device 10 and a mobile device 30 operating in a network environment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

A recent trend that is becoming increasingly popular in the computing/communication field is to electronically record one's feelings, thoughts, and other aspects of the person's everyday life onto an open diary. One place where such open diaries are maintained are at social networking sites commonly known as "blogs" where users may report or post their latest status, personal activities, and various other aspects of the users' everyday life. The process of reporting or posting blog entries is commonly referred to as blogging. Other social networking sites may allow users to update their personal information via, for example, social networking status reports in which a user may report or post for others to view their current status, activities, and/or other aspects of the user.

A more recent development in social networking is the introduction and explosive growth of microblogs in which individuals or users (referred to as "microbloggers") maintain open diaries at microblog websites (e.g., otherwise known as "twitters") by continuously or semi-continuously posting microblog entries. A microblog entry (e.g., "tweet") is typically a short text message that is usually not more than 140 characters long. The microblog entries posted by a microblogger may report on any aspect of the microblogger's daily life. Typically, such microblog entries will describe the various "events" associated with or are of interest to the microblogger that occurs during a course of a typical day. The microblog entries are often continuously posted during the course of a typical day, and thus, by the end of a normal day, a substantial number of events may have been reported and posted.

Each of the reported events that may be posted through microblog entries may be categorized into one of at least three possible categories. The first category of events that may be reported through microblog entries are "objective occurrences" that may or may not be associated with the microblogger. Objective occurrences that are associated with a microblogger may be any characteristic, incident, happening, or any other event that occurs with respect to the microblogger or are of interest to the microblogger that can be objectively reported by the microblogger, a third party, or by a device. Such events would include, for example, intake of food, medicine, or nutraceutical, certain physical characteristics of the microblogger such as blood sugar level or blood pressure, activities of the microblogger, external events such as performance of the stock market (which the microblogger may have an interest in), performance of a favorite sports team, and so forth.

Other examples of objective occurrences include, for example, external events such as the local weather, activities of others (e.g., spouse or boss), the behavior or activities of a pet or livestock, the characteristics or performances of mechanical or electronic devices such as automobiles, appliances, and computing devices, and other events that may directly or indirectly affect the microblogger.

A second category of events that may be reported or posted through microblog entries include "subjective user states" of the microblogger. Subjective user states of a microblogger may include any subjective state or status associated with the microblogger that can only be typically reported by the microblogger (e.g., generally cannot be directly reported by a third party or by a device). Such states including, for example, the subjective mental state of the microblogger (e.g., happiness, sadness, anger, tension, state of alertness, state of mental fatigue, jealousy, envy, and so forth), the subjective physical state of the microblogger (e.g., upset stomach, state of vision, state of hearing, pain, and so forth), and the subjective overall state of the microblogger (e.g., "good," "bad," state of overall wellness, overall fatigue, and so forth). Note that the term "subjective overall state" as will be used herein refers to those subjective states that may not fit neatly into the other two categories of subjective user states described above (e.g., subjective mental states and subjective physical states).

A third category of events that may be reported or posted through microblog entries include "subjective observations" made by the microblogger. A subjective observation is similar to subjective user states and may be any subjective opinion, thought, or evaluation relating to any external incidence (e.g., outward looking instead of inward looking as in the case of subjective user states). Thus, the difference between subjective user states and subjective observations is that subjective user states relates to self-described subjective descriptions of the user states of one's self while subjective observations relates to subjective descriptions or opinions regarding external events. Examples of subjective observations include, for example, a microblogger's perception about the subjective user state of another person (e.g., "he seems tired"), a microblogger's perception about another person's activities (e.g., "he drank too much yesterday"), a microblogger's perception about an external event (e.g., "it was a nice day today"), and so forth. Although microblogs are being used to provide a wealth of personal information, thus far they have been primarily limited to their use as a means for providing commentaries and for maintaining open diaries.

Another potential source for valuable but yet to be fully exploited is data that may be provided by sensing devices that are used to sense and/or monitor various aspects of everyday life. Currently there are a number of sensing devices that can detect and/or monitor various user-related and nonuser-related events. For example, there are presently a number of sensing devices that can sense various physical or physiological characteristics of a person or an animal (e.g., a pet or a livestock). Examples of such devices include commonly known and used monitoring devices such as blood pressure devices, heart rate monitors, blood glucose sensors (e.g., glucometers), respiration sensor devices, temperature sensors, and so forth. Other examples of devices that can monitor physical or physiological characteristics include more exotic and sophisticated devices such as functional magnetic resonance imaging (fMRI) device, functional Near Infrared (fNIR) devices, blood cell-sorting sensing device, and so forth. Many of these devices are becoming more compact and less expensive such that they are becoming increasingly accessible for purchase and/or self-use by the general public.

Other sensing devices may be used in order to sense and/or monitor activities of a person or an animal. These would include, for example, global positioning systems (GPS), pedometers, accelerometers, and so forth. Such devices are compact and can even be incorporated into, for example, a mobile communication device such a cellular telephone or on the collar of a pet. Other sensing devices for monitoring activities of individuals (e.g., users) may be incorporated into larger machines and may be used in order to monitor the usage of the machines by the individuals. These would include, for example, sensors that are incorporated into exercise machines, automobiles, bicycles, and so forth. Today there are even toilet monitoring devices that are available to monitor the toilet usage of individuals.

Other sensing devices are also available that can monitor general environmental conditions such as environmental temperature sensor devices, humidity sensor devices, barometers, wind speed monitors, water monitoring sensors, air pollution sensor devices (e.g., devices that can measure the amount of particulates in the air such as pollen, those that measure $CO_2$ levels, those that measure ozone levels, and so forth). Other sensing devices may be employed in order to monitor the performance or characteristics of mechanical and/or electronic devices. All the above described sensing devices may provide useful data that may indicate objectively observable events (e.g., objective occurrences).

In accordance with various embodiments, the data provided through social networking sites (e.g., via microblog entries, status entries, diary entries, and so forth) as well as, in some cases, those from sensing devices may be processed in order to develop a hypotheses that identifies the relationship between multiple event types (e.g., types of events). For example, based on past events reported by a person (e.g., a microblogger) and/or reported by sensing devices, a hypothesis such as a hypothesis may be developed relating to the person, a third party, a device, external activities, environmental conditions, or anything else that may be of interest to the person. One way to develop or create such a hypothesis is by identifying a pattern of events that repeatedly reoccurs.

Once such a hypothesis is developed, one or more actions may be executed based on the hypothesis and in response to, for example, occurrence of one or more reported events that may match or substantially match one or more of the event types identified in the hypothesis. Examples of actions that could be executed include, for example, the presentation of advisories or the prompting of one or more devices (e.g., sensing devices or home appliances) to execute one or more operations. However, the development of a hypothesis based on identifying repeatedly reoccurring patterns of events may lead to the development of a faulty or incorrect hypothesis.

As an illustration, suppose a hypothesis is developed by identifying a repetitively reoccurring pattern of events that indicate, for example, that whenever the person wakes-up late, eats ice cream, and drinks coffee, a stomach ache follows. However, merely looking at repetitively reoccurring patterns of events may result in a hypothesis that includes types of events that may not be relevant to the hypothesis or may not accurately reflect the types of events that should be included in the hypothesis. For example, in the above example, waking-up late may not be relevant to having a stomach ache. That is, the hypothesis may have been based on data that indicated that prior to past occurrences of stomachaches, the subject (e.g., user) had reported waking-up late, eating ice cream, and drinking coffee. However, the reports of waking-up late occurring prior to previous reports of stomachaches may merely have been a coincidence. As can be seen, using the technique determining repeatedly reoccurring patterns of events may result in the development of inaccurate or even false hypothesis.

Accordingly, robust methods, systems, and computer program products are provided to, among other things, present to a user a hypothesis identifying at least a relationship between a first event type and a second event type and receive from the user one or more modifications to modify the hypothesis. The methods, systems, and computer program products may then facilitate in the execution of one or more actions based, at least in part, on a modified hypothesis resulting, at least in part, from the reception of the one or more modifications. Examples of the types of actions that may be executed include, for example, the presentation of the modified hypothesis or advisories relating to the modified hypothesis. Other actions that may be executed include the prompting of mechanical and/or electronic devices to execute one or more operations based, at least in part, on the modified hypothesis. In some cases, the execution of the one or more actions, in addition to being based on the modified hypothesis, may be in response to a reported event.

The robust methods, systems, and computer program products may be employed in a variety of environments including, for example, social networking environments, blogging or microblogging environments, instant messaging (IM) environments, or any other type of environment that allows a user to, for example, maintain a diary. Further, the methods, systems, and computing program products in various embodiments may be implemented in a standalone computing device or implemented in a client/server environment.

In various implementations, a "hypothesis," as referred to herein, may define one or more relationships or links between different types of events (i.e., event types) including defining a relationship between at least a first event type (e.g., a type of event such as a particular type of subjective user state including, for example, a subjective mental state such as "happy") and a second event type (e.g., another type of event such as a particular type of objective occurrence, for example, favorite sports team winning a game). In some cases, a hypothesis may be represented by an events pattern that may indicate spatial or sequential (e.g., time/temporal) relationships between different event types (e.g., subjective user states, subjective observations, and/or objective occurrences). In some embodiments, a hypothesis may be further defined by an indication of the soundness (e.g., strength) of the hypothesis.

Note that for ease of explanation and illustration, the following description will describe a hypothesis as defining, for example, the sequential or spatial relationships between two, three, or four event types. However, those skilled in the art will recognize that such a hypothesis may also identify the relationships between five or more event types (e.g., a first event type, a second event type, a third event type, a fourth event type, a fifth event type, and so forth).

In some embodiments, a hypothesis may, at least in part, be defined or represented by an events pattern that indicates or suggests a spatial or a sequential (e.g., time/temporal) relationship between different event types. Such a hypothesis, in some cases, may also indicate the strength or weakness of the link between the different event types. That is, the strength or weakness (e.g., soundness) of the correlation between different event types may depend upon, for example, whether the events pattern repeatedly occurs and/or whether a contrasting events pattern has occurred that may contradict the hypothesis and therefore, weaken the hypothesis (e.g., an events pattern that indicates a person becoming tired after jogging for thirty minutes when a hypothesis suggests that a person will be energized after jogging for thirty minutes).

As briefly described above, a hypothesis may be represented by an events pattern that may indicate spatial or sequential (e.g., time or temporal) relationship or relationships between multiple event types. In some implementations, a hypothesis may indicate a temporal relationship or relationships between multiple event types. In alternative implementations a hypothesis may indicate a more specific time relationship or relationships between multiple event types. For example, a sequential pattern may represent the specific pattern of events that occurs along a timeline that may specify the specific amount of time, if there are any, between occurrences of the event types. In still other implementations, a hypothesis may indicate the specific spatial (e.g., geographical) relationship or relationships between multiple event types.

In various embodiments, a hypothesis may initially be provided to a user (e.g., a microblogger or a social networking user) that the hypothesis may or may not be directly associated with. That is, in some embodiments, a hypothesis may be initially provided that directly relates to a user. Such a hypothesis may relate to, for example, one or more subjective user states associated with the user, one or more activities associated with the user, or one or more characteristics associated with the user. In other embodiments, however, a hypothesis may be initially provided that may not be directly associated with a user. For example, a hypothesis may be initially provided that may be particularly associated with a third party (e.g., a spouse of the user, a friend, a pet, and so forth), while in other embodiments, a hypothesis may be initially provided that is directed to a device that may be, for example, operated or used by the user. In still other cases, a hypothesis may be provided that relates to one or more environmental characteristics or conditions.

In some embodiments, the hypothesis to be initially provided to a user may have been originally created based, for example, on reported events as reported by the user through, for example, blog entries, status reports, diary entries, and so forth. Alternatively, such a hypothesis may be supplied by a third party source such as a network service provider or a content provider.

After being presented with the hypothesis, the user may be provided with an opportunity to modify the presented hypothesis. Various types of modifications may be made by the user including, for example, revising or deleting one or more event types identified by the hypothesis, revising one or more relationships between the multiple event types identified by the hypothesis, or adding new event types to the hypothesis. Based on the modifications provided by the user, a modified hypothesis may be generated. In some embodiments, the user may be provided with the option to delete or deactivate the hypothesis or an option to select or revise the type of actions that may be executed based on the modified hypothesis.

Based, at least in part, on the modified hypothesis, one or more actions may be executed. Examples of the types of actions that may be executed include, for example, presenting to the user or a third party one or more advisories related to the modified hypothesis or prompting one or more devices to execute one or more operations based on the modified hypothesis. The one or more advisories that may be presented may include, for example, presentation of the modified hypothesis, presentation of a recommendation for a future action, presentation of a prediction of a future event, and/or presentation of a past event or events. Examples of the types of devices that may be prompted to execute one or more operations include, for example, sensing devices (e.g., sensing devices that can sense physiological or physical characteristics of the user or a third party, sensing devices that can sense the activities of the user or a third party, sensing devices to monitor environmental conditions, and so forth), household appliances, computing or communication devices, environmental devices (e.g., air conditioner, humidifier, air purifier, and so forth), and/or other types of electronic/mechanical devices. In some embodiments, the one or more actions may be in response to, in addition to being based on the modified hypothesis, a reported event.

Figure 1B:
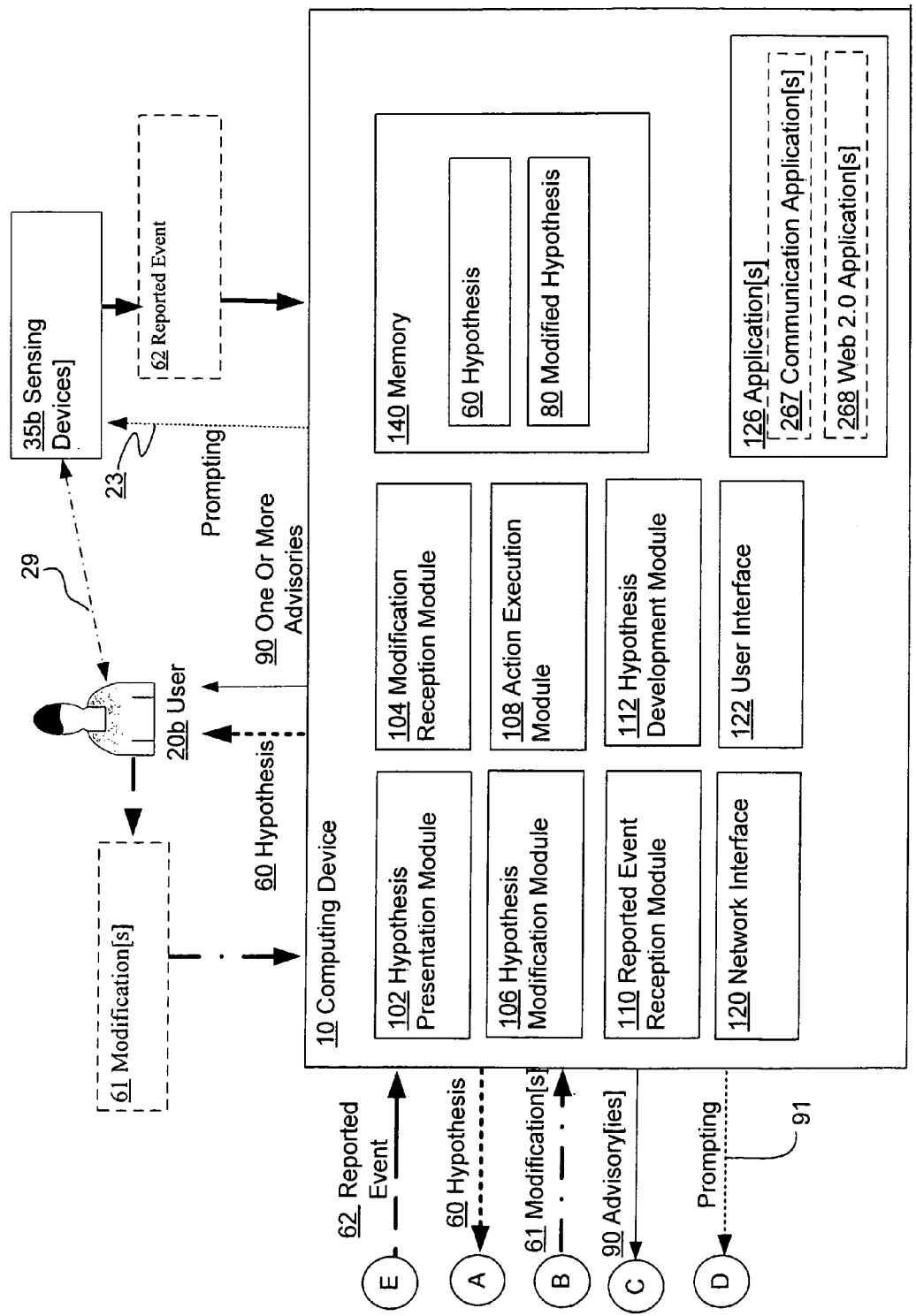

FIGS. 1a and 1b illustrate an example environment in accordance with various embodiments. In the illustrated environment, an exemplary system 100 may include at least a computing device 10 (see FIG. 1b). In some embodiments, the computing device 10 may be a server (e.g., network server), which may communicate with a user 20a via a mobile device 30 and through a wireless and/or wired network 40. In other embodiments, the computing device 10 may be a standalone device, which may communicate directly with a user 20b via a user interface 122.

Regardless of whether the computing device 10 is a network server or a standalone device, the computing device 10 may be designed to, among other things, present to a user 20* a hypothesis 60 that identifies at least a relationship between a first event type and a second event type, receive from the user 20* one or more modifications 61 to modify the hypothesis 60, and execute one or more actions based, at least in part, on a modified hypothesis 80 resulting, at least in part, from the reception of the one or more modifications 61. As will be further described herein, in embodiments where the computing device 10 is a server that communicates with a user 20a via the mobile device 30, the mobile device 30 may also be designed to perform the above-described operations. In the following, "*" indicates a wildcard. Thus, references to user 20* may indicate a user 20a or a user 20b of FIGS. 1a and 1b. Similarly, references to sensing devices 35* may be a reference to sensing devices 35a or sensing devices 35b of FIGS. 1a and 1b.

As indicated earlier, in some embodiments, the computing device 10 may be a network server (or simply "server") while in other embodiments the computing device 10 may be a standalone device. In the case where the computing device 10 is a network server, the computing device 10 may communicate indirectly with a user 20*a*, one or more third parties 50, and one or more sensing devices 35*a* via wireless and/or wired network 40. A network server, as will be described herein, may be in reference to a server located at a single network site or located across multiple network sites or a conglomeration of servers located at multiple network sites. The wireless and/or wired network 40 may comprise of, for example, a local area network (LAN), a wireless local area network (WLAN), personal area network (PAN), Worldwide Interoperability for Microwave Access (WiMAX), public switched telephone network (PTSN), general packet radio service (GPRS), cellular networks, and/or other types of wireless or wired networks. In contrast, in embodiments where the computing device 10 is a standalone device, the computing device 10 may at least directly communicate with a user 20*b* (e.g., via a user interface 122) and one or more sensing devices 35*b*.

The mobile device 30 may be a variety of computing/communication devices including, for example, a cellular phone, a personal digital assistant (PDA), a laptop, a desktop, or other types of computing/communication devices that can communicate with the computing device 10. In some embodiments, the mobile device 30 may be a handheld device such as a cellular telephone, a smartphone, a Mobile Internet Device (MID), an Ultra Mobile Personal Computer (UMPC), a convergent device such as a personal digital assistant (PDA), and so forth.

In embodiments in which the computing device 10 is a standalone device, the computing device 10 may be any type of portable device (e.g., a handheld device) or non-portable device (e.g., desktop computer or workstation). For these embodiments, the computing device 10 may be any one of a variety of computing/communication devices including, for example, a cellular phone, a personal digital assistant (PDA), a laptop, a desktop, or other types of computing/communication devices. In some embodiments, in which the computing device 10 is a handheld device, the computing device 10 may be a cellular telephone, a smartphone, an MID, an UMPC, a convergent device such as a PDA, and so forth. In various embodiments, the computing device 10 may be a peer-to-peer network component device. In some embodiments, the computing device 10 and/or the mobile device 30 may operate via a Web 2.0 construct (e.g., Web 2.0 application 268).

The one or more sensing devices 35* may include one or more of a variety of different types of sensing/monitoring devices to sense various aspects (e.g., characteristics, features, or activities) associated with a user 20*, one or more third parties 50, one or more network and/or local devices 55, one or more external activities, one or more environmental characteristics, and so forth. Examples of such sensing devices 35* include, for example, those devices that can measure physical or physical characteristics of a subject (e.g., a user 20* or a third party 50) such as a heart rate sensor device, blood pressure sensor device, blood glucose sensor device, functional magnetic resonance imaging (fMRI) device, a functional near-infrared (fNIR) device, blood alcohol sensor device, temperature sensor device (e.g., thermometer), respiration sensor device, blood cell-sorting sensor device (e.g., to sort between different types of blood cells), and so forth. Another type of devices that may be included in the one or more sensing devices 35 includes, for example, those that can sense the activities of their subjects (e.g., user 20* or a third party 50). Examples of such devices include, for example, pedometers, accelerometers, an image capturing device (e.g., digital or video camera), toilet monitoring devices, exercise machine sensor devices, and so forth. Other types of sensing devices 35* include, for example, global positioning system (GPS) devices, environmental sensors such as a room thermometer, barometer, air quality sensor device, humidity sensor device, sensing devices to sense characteristics or operational performances of devices, and so forth.

The one or more third parties 50 depicted in FIG. 1*a* may include, for example, one or more persons (e.g., a spouse, a friend, a social networking group, a co-worker, and so forth), one or more animals (e.g., a pet or livestock), and/or business entities (e.g., content provider, network service provider, etc.).

There are at least two ways that the computing device 10 may initially acquire a hypothesis 60. One way is to acquire the hypothesis 60 from a third party source such as a network service provider, a content provider, or an application provider. A second way is to self-develop the hypothesis 60. For example, in various implementations, and regardless of whether the computing device 10 is a standalone device or as a network server, a hypothesis 60 may be initially developed (e.g., created) by the computing device 10 based, at least in part, on events data that may be provided by one or more sources (e.g., a user 20*, one or more third parties 50, or one or more sensing devices 35*). The events data provided by the one or more sources may indicate past events as reported by the sources. In some cases, such data may be provided by the one or more sources via electronic entries such as blog entries (e.g., microblog entries), status reports, electronic messages (email, instant messages (IMs), etc.), diary entries, and so forth.

By identifying a repeatedly reoccurring pattern of reported events, for example, a hypothesis 60 may be developed by the computing device 10. The resulting hypothesis 60 may indicate a spatial or a sequential (temporal or specific time) relationship between at least a first event type (e.g., a type of subjective user state, a type of subjective observation, or a type of objective occurrence) and a second event type (e.g., a type of subjective user state, a type of subjective observation, or a type of objective occurrence).

The computing device 10 may then present (e.g., indicate via a user interface 122 or transmit via the wireless and/or wired network 40) to a user 20* the hypothesis 60. In embodiments where the computing device 10 is a server, the computing device 10 may present the hypothesis 60 to a user 20*a* by transmitting the hypothesis 60 to the mobile device 30 via the wireless and/or wired network 40. The mobile device 30 may then audioally and/or visually present the hypothesis 60 to the user 20*a*. On the other hand, in embodiments where the computing device 10 is a standalone device, the hypothesis 60 may be directly presented to a user 20*b* by audioally or visually indicating the hypothesis 60 to the user 20*a* via a user interface 122.

The hypothesis 60 may be presented to a user 20*(e.g., user 20*a* or user 20*b*) in a variety of different ways. For example, in various implementations, the hypothesis 60* may be presented in graphical form, in pictorial form, in textual form, in audio form and so forth. In some implementations, the hypothesis 60 to be presented may be modifiable such that one or more event types and/or their relationships (e.g., spatial or temporal/time relationships) with respect to each other that are identified by the hypothesis 60 may be revised or even deleted. Such modifiable hypothesis 60 may also allow a user 20* to add to the hypothesis 60 additional event types with respect to the event types already included in the hypothesis 60. In some implementations, the computing device 10 may present to the user 20* an option to delete or deactivate the hypothesis 60.

After presenting the hypothesis 60 to the user 20*, the computing device 10 may be designed to receive from the user 20* one or more modifications 61 to modify the hypothesis 60. In embodiments in which the computing device 10 is a server, the computing device 10 may receive the one or more modifications 61 from the user 20a through mobile device 30 and via the wireless and/or wired network 40. Note that for these embodiments, the mobile device 30 may directly receive the one or more modifications 61 from the user 20a and may then transmit the one or more modifications 61 to the computing device 10. In alternative embodiments in which the computing device 10 is a standalone device, the computing device 10 may receive the one or more modifications 61 directly from the user 20b via a user interface 122.

In various implementations, the one or more modifications 61 received from the user 20* may be for revising and/or deleting one or more event types and their relationships with respect to each other that are indicated by the hypothesis 60. In some cases, the one or more modifications 61 may also include modifications to add one or more event types with to respect to the event types already included in the hypothesis 60. In other words, the one or more modifications 61 to be received by the computing device 10 and/or by the mobile device 30 may include one or more modifications for adding one or more event types to the hypothesis 60 and their relationships (e.g., spatial or temporal relationships) with the event types already included in the hypothesis 60. Note that in some cases, the computing device 10 (as well as the mobile device 30) may receive from the user 20*, an indication of one or more actions to be executed based, at least in part, on the resulting modified hypothesis 80.

In any event, the computing device 10 may then generate a modified hypothesis 80 by modifying the hypothesis 60 based on the one or more modifications 61 received from the user 20*(user 20a or user 20b). In some embodiments, the modified hypothesis 80 may be stored in memory 140.

The computing device 10 (as well as the mobile device 30) may then execute one or more actions based, at least in part, on the modified hypothesis 80 resulting from the reception of the one or more modifications 61 by the computing device 10. Various types of actions may be executed by the computing device 10 and/or by the mobile device 30 in various alternative embodiments. For example, in some embodiments, the computing device 10 and/or the mobile device 30 may present one or more advisories 90 to a user 20* or to one or more third parties 50. For instance, in embodiments where the computing device 10 is a server, the computing device 10 may present the one or more advisories 90 to a user 20a by transmitting the one or more advisories 90 to the mobile device 30 (or to one or more third parties 50) via a wireless and/or wired network 40. The mobile device 30 may then present the one or more advisories 90 to a user 20a by audioally and/or visually indicating to the user 20a (e.g., via an audio and/or display system) the one or more advisories 90.

In embodiments in which the computing device 10 is a standalone device, the computing device 10 may present the one or more advisories 90 to a user 20b by audioally and/or visually indicating to the user 20b (e.g., via an audio and/or display system) the one or more advisories. For these embodiments, the computing device 10 may present the one or more advisories 90 to one or more third parties 50 by transmitting the one or more advisories 90 to the one or more third parties 50 via a wireless and/or wired network 40.

The one or more advisories 90 to be presented by the computing device 10 or by the mobile device 30 may be one or more of a variety of advisories that may be associated with the modified hypothesis 80 and that can be presented. For example, in some implementations, the one or more advisories 90 to be presented may include at least one form (e.g., an audio form, a graphical form, a pictorial form, a textual form, and so forth) of the modified hypothesis 80. In the same or different implementations, the one or more advisories 90 to be presented may include a prediction of a future event or an indication of an occurrence of a past reported event. In the same or different implementations, the one or more advisories 90 to be presented may include a recommendation for a future course of action and in some cases, justification for the recommendation.

In some embodiments, the computing device 10 and/or the mobile device 30 may execute one or more actions by prompting 91* one or more devices (e.g., one or more sensing devices 35* and/or one or more network/local devices 55) to execute one or more operations. For example, prompting 91* one or more sensing devices 35* to sense various characteristics associated with a user 20* or a third party 50, or prompting one or more household devices (which may be network and/or local devices 55) to perform one or more operations. Note that references to "prompting one or more to execute one or more devices" herein may be in reference to directing, instructing, activating, requesting, and so forth, one or more devices to execute one or more operations.

In embodiments in which the computing device 10 is a server, the computing device 10 may indirectly or directly prompt one or more devices. For example, in some embodiments, the computing device 10 may indirectly prompt one or more devices to execute one or more operations by transmitting to the mobile device 30 a request or instructions to prompt other devices to execute one or more operations. In response to the request or instructions transmitted by the computing device 10, the mobile device 30 may directly prompt 91' one or more devices (e.g., sensing devices 35* and/or network and/or local devices 55) to execute one or more operations. In the same or different embodiments, the computing device 10 may alternatively or complimentarily directly prompt 91 the one or more devices (e.g., sensing devices 35 and/or network and/or local devices 55) to execute one or more operations. In embodiments in which the computing device 10 is a standalone device, the computing device 10 may directly (e.g., without going through mobile device 30) prompt 91 the one or more devices (e.g., sensing devices 35* and/or network and/or local devices 55) to execute the one or more operations.

In some embodiments, the one or more actions to be executed by the computing device 10 or by the mobile device 30 may be in response, at least in part, to a reported event. For instance, the one or more actions to be executed by the computing device 10 or by the mobile device 30 may be in response to a reported event 62 that at least substantially matches with at least one of the event types identified by the modified hypothesis 80. To illustrate, suppose the modified hypothesis 80 indicates that the gas tank of car belonging to a user 20* is always empty (e.g., a first event type) whenever a particular friend returns a car after borrowing it (e.g., a second event type). In response to receiving data (e.g., in the form of a blog entry or status report) that indicates that the particular friend has again borrowed and returned the user's car (e.g., reported event 62), and based at least in part on the modified hypothesis 80, the computing device 10 may execute one or more actions (e.g., transmitting one or more advisories such as a warning to fill-up the gas tank to the mobile device 30). In this example, the computing device 10 may execute the one or more actions because the reported event 62 at least substantially matches the second event type as identified by the modified hypothesis 80. Note that the reported event 62 that may initiate the one or more actions to be executed by the computing device 10 or the mobile device 30 (which in the above example, may execute one or more actions by audioally or visually indicating the one or more advisories 90) may be reported by a user 20*, one or more third parties 50, or from one or more sensing devices 35*.

Referring particularly now to the computing device 10 of FIG. 1b, which may include one or more components and/or modules. As those skilled in the art will recognize, these components and modules may be implemented by employing hardware (e.g., in the form of circuitry such as application specific integrated circuit or ASIC, field programmable gate array or FPGA, or other types of circuitry), software, a combination of both hardware and software, or may be implemented by a general purpose computing device executing instructions included in a signal-bearing medium.

In various embodiments, the computing device 10 may include a hypothesis presentation module 102, a modification reception module 104, a hypothesis modification module 106, an action execution module 108, a reported event reception module 110, a hypothesis development module 112, a network interface 120 (e.g., network interface card or NIC), a user interface 122 (e.g., a display monitor, a touchscreen, a keypad or keyboard, a mouse, an audio system including a microphone and/or speakers, an image capturing system including digital and/or video camera, and/or other types of interface devices), a memory 140, and/or one or more applications 126. In some implementations, a copy of the hypothesis 60 and/or a copy of a modified hypothesis 80 may be stored in memory 140. The one or more applications 126 may include one or more communication applications 267 (e.g., email application, IM application, text messaging application, a voice recognition application, and so forth) and/or one or more Web 2.0 applications 268. Note that in various embodiments, a persistent copy of the one or more applications 126 may be stored in memory 140.

Figure 2A:
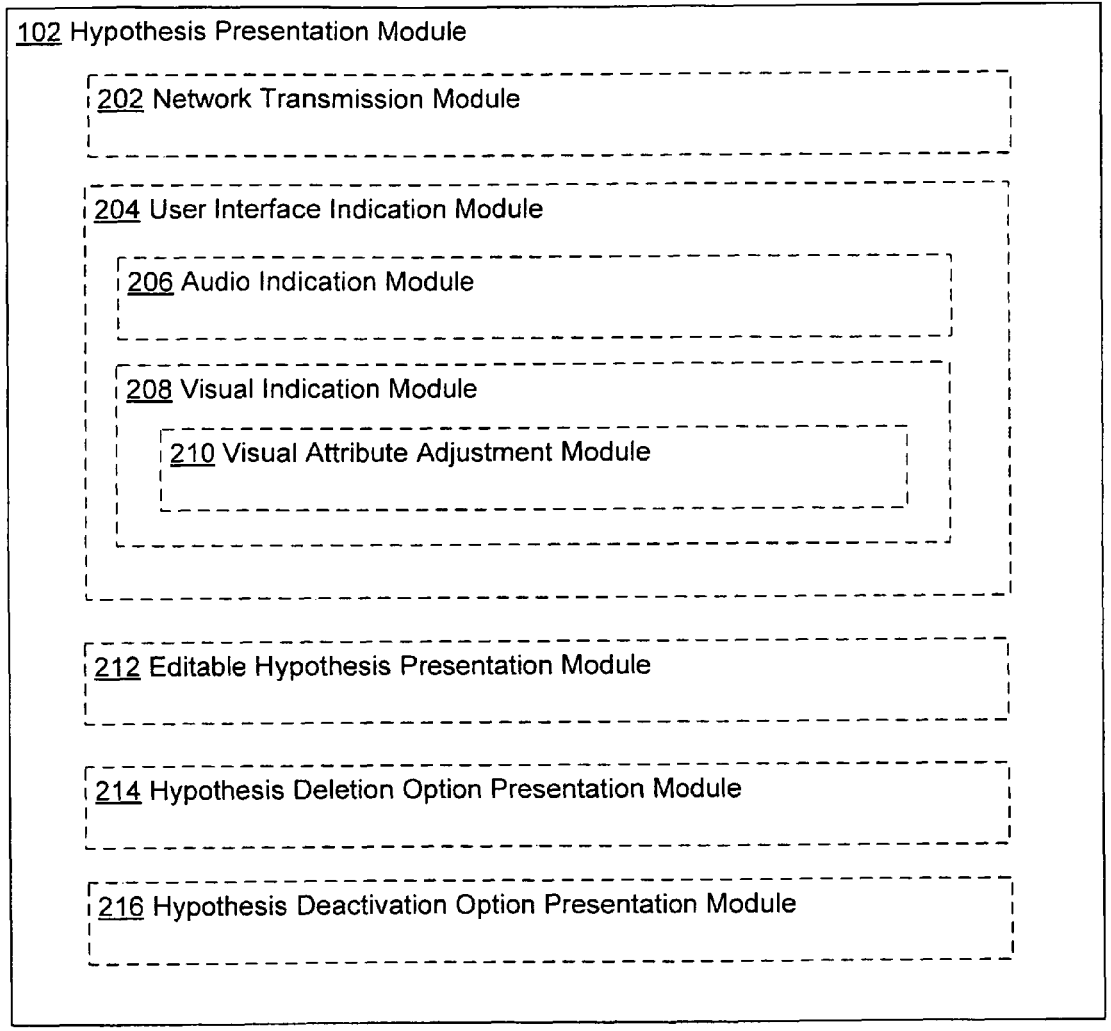
FIG. 2a shows another perspective of the hypothesis presentation module 102 of the computing device 10 of FIG. 1b.

Turning now to FIG. 2a illustrating particular implementations of the hypothesis presentation module 102 of FIG. 1b. The hypothesis presentation module 102 may be configured to present one or more hypotheses 60 including presenting to a user 20* a hypothesis 60 identifying at least a relationship between at least a first event type (e.g., a subjective user state, a subjective observation, or an objective occurrence) and a second event type (e.g., a subjective user state, a subjective observation, or an objective occurrence). Note that in embodiments in which the computing device 10 is a server, the hypothesis 60 to be presented may be presented to user 20a by transmitting the hypothesis 60 to a mobile device 30, which may then audioally or visually indicate the hypothesis 60 to user 20a. While in embodiments in which the computing device 10 is a standalone device, the computing device 10 may present the hypothesis 60 to a user 20b via the user interface 122.

In some implementations, the hypothesis 60 to be presented may identify the relationships between the first, the second event type, a third event type, a fourth event type, and so forth. As will be further described herein, the hypothesis 60 to be presented by the hypothesis presentation module 102 may identify the relationship between a variety of different event types (e.g., identifying a relationship between a subjective user state and an objective occurrence, identifying a relationship between a first objective occurrence and a second objective occurrence, and so forth). In some implementations, the hypothesis 60 to be presented may have been previously developed based on data provided by the user 20*. In the same or different implementations, the hypothesis 60 to be presented may be related to the user 20*, to one or more third parties 50, to one or more devices, or to one or more environmental characteristics or conditions.

In order to present a hypothesis 60, the hypothesis presentation module 102 may further include one or more submodules. For instance, in various implementations, the hypothesis presentation module 102 may include a network transmission module 202 configured to transmit the hypothesis 60 to a user 20a via at least one of a wireless network and a wired network (e.g., wireless and/or wired network 40).

In the same or different implementations, the hypothesis presentation module 102 may include a user interface indication module 204 configured to indicate the hypothesis 60 to a user 20b via a user interface 122 (e.g., an audio system including one or more speakers and/or a display system including a display monitor or touchscreen). The user interface indication module 204 may, in turn, further include one or more additional sub-modules. For example, in some implementations, the user interface indication module 204 may include an audio indication module 206 configured to audioally indicate the hypothesis 60 to user 20b.

In the same or different implementations, the user interface indication module 204 may include a visual indication module 208 configured to visually indicate the hypothesis 60 to user 20b. Note that, and as will be further described herein, the visual indication module 208 may visually indicate the hypothesis 60 in a variety of different manners including, for example, in graphical form, in textual form, in pictorial form, and so forth. Further, in various implementations, the visual indication module 208 may represent the various event types and their relationships with respect to each other as indicated by the hypothesis 60 by symbolic representations (see, for example, FIGS. 2h to 2k).

For example, the visual indication module 208 indicating visually to the user 20* symbolic representations that may represent the various event types indicated by the hypothesis 60 including, for example, a first symbolic representation representing the first event type, a second symbolic representation representing the second event type, a third symbolic representation representing a third event type, a fourth symbolic representation representing a fourth event type, and so forth. A symbolic representation may be, for example, an icon, an emoticon, a figure, text such as a word or phrase, and so forth. Similarly, the visual indication module 208 may indicate the relationships (e.g., spatial or temporal relationships) between the event types, as identified by the hypothesis 60, by visually indicating symbolic representations that represents the relationships between the event types. Such symbolic representations representing the relationships between the event types may include, for example, specific spacing or angle between the symbolic representations representing the event types (e.g., as set against a grid background), lines or arrows between the symbolic representations representing the event types, text including a word or phrase, and/or a combination thereof.

In some implementations, the visual indication module 208 may further include a visual attribute adjustment module 210 that is configured to indicate the strength of the hypothesis 60 by adjusting a visual attribute (e.g., boldness, color, background, and so forth) associated with at least one of the symbolic representations representing the event types and their relationships. In various implementations, the hypothesis presentation module 102 may include an editable hypothesis presentation module 212 configured to present an editable form of the hypothesis 60 to the user 20*. In some embodiments, the editable form of the hypothesis 60 to be presented by the editable hypothesis presentation module 212 may include symbolic representations representing the event types and their relationships with respect to each other that may be modified and/or deleted. In the same or different implementations, the editable form of the hypothesis 60 may be modified such that additional event types may be added with respect to the event types already identified by the hypothesis 60.

In some implementations, the hypothesis presentation module 102 of FIG. 2a may include a hypothesis deletion option presentation module 214 configured to present an option to delete the hypothesis 60. In the same or alternative implementations, the hypothesis presentation module 102 may include a hypothesis deactivation option presentation module 216 configured to present an operation to deactivate or ignore the hypothesis 60. By deactivating the hypothesis 60, the action execution module 108 of the computing device 10 may be prevented from executing one or more actions based on the hypothesis 60 (e.g., or a modified version of the hypothesis 60).

Turning now to FIG. 2b illustrating particular implementations of the modification reception module 104 of FIG. 1b. In various implementations, the modification reception module 104 may be configured to receive at least one modification 61 to modify the hypothesis 60 from the user 20*. The modification reception module 104 may include one or more submodules in various alternative implementations. For example, in some implementations such as in implementations in which the computing device 10 is a standalone device, the modification reception module 104 may include a user interface reception module 218 configured to receive the at least one modification 61 for modifying the hypothesis 60 through a user interface 122 (e.g., a key pad, a microphone, a touchscreen, a mouse, a keyboard, and so forth). In the same or different implementations such as in implementations in which the computing device 10 is a server, the modification reception module 104 may include a network reception module 220 configured to receive the at least one modification 61 for modifying the hypothesis 60 via at least one of a wireless and/or wired network 40.

As depicted in FIG. 2b, the modification reception module 104 may include, in various implementations, an electronic entry reception module 222 configured to receive (e.g., via a user interface 122 or via wireless and/or wired network 40) the at least one modification 61 to modify the hypothesis 60 via one or more electronic entries as provided by the user 20*. In some implementations, the electronic entry reception module 222 may further include one or more sub-modules including, for example, a blog entry reception module 224 (e.g., for receiving from the user 20* the at least one modification 61 via one or more blog or microblog entries), a status report reception module 226 (e.g., for receiving from the user 20* the at least one modification 61 via one or more social networking status reports), an electronic message reception module 228 (e.g., for receiving from the user 20* the at least one modification 61 via one or more electronic messages such as e.g., emails, text messages, instant messages (IMs), and so forth), and/or a diary entry reception module 230 (e.g., for receiving from the user 20* the at least one modification 61 via one or more diary entries).

Various types of modifications 61 for modifying the hypothesis 60 may be received by the modification reception module 104. For instance, in some implementations, modifications 61 for deleting one or more of the event types (e.g., the first event type, the second event type, and so forth) indicated by the hypothesis 60 may be received by the modification reception module 104. For example, the modification reception module 104 may receive one or more modifications 61 for deleting a third event type, a fourth event type, and so forth, indicated by the hypothesis 60.

In some implementations, the modification reception module 104 may be designed to receive one or more modifications 61 for adding additional event types (e.g., a third event type, a fourth event type, and so forth) to the hypothesis 60 and with respect to the at least first event type and the second event type already included in the hypothesis 60. Note that when adding a new event type to the hypothesis 60, the relationships (e.g., spatial or temporal) between the added event type (e.g., a third event type) and the first event type and the second event type may also be provided.

In some implementations, the modification reception module 104 may be designed to receive one or more modifications 61 for revising one or more of the event types (e.g., the first event type and the second event type) included in the hypothesis 60. In the same or different implementations, the modification reception module 104 may be configured to receive one or more modifications 61 for modifying (e.g., revising) the relationship or relationships (e.g., spatial, temporal, or specific time relationship) between the event types (e.g., the first event type, the second event type, and so forth) included in the hypothesis 60. The one or more modifications 61 to be received by the modification reception module 104 may be for modifying any type of event types including, for example, a subjective user state type, a subjective observation type, and/or an objective occurrence type.

In various implementations, the computing device 10 may include a hypothesis modification module 106 that is designed to modify the hypothesis 60 based, for example, on the one or more modifications 61 received by the modification reception module 104. As a result of modifying the hypothesis 60, a modified hypothesis 80 may be generated, which in some cases may be stored in memory 140.

Figure 2C:
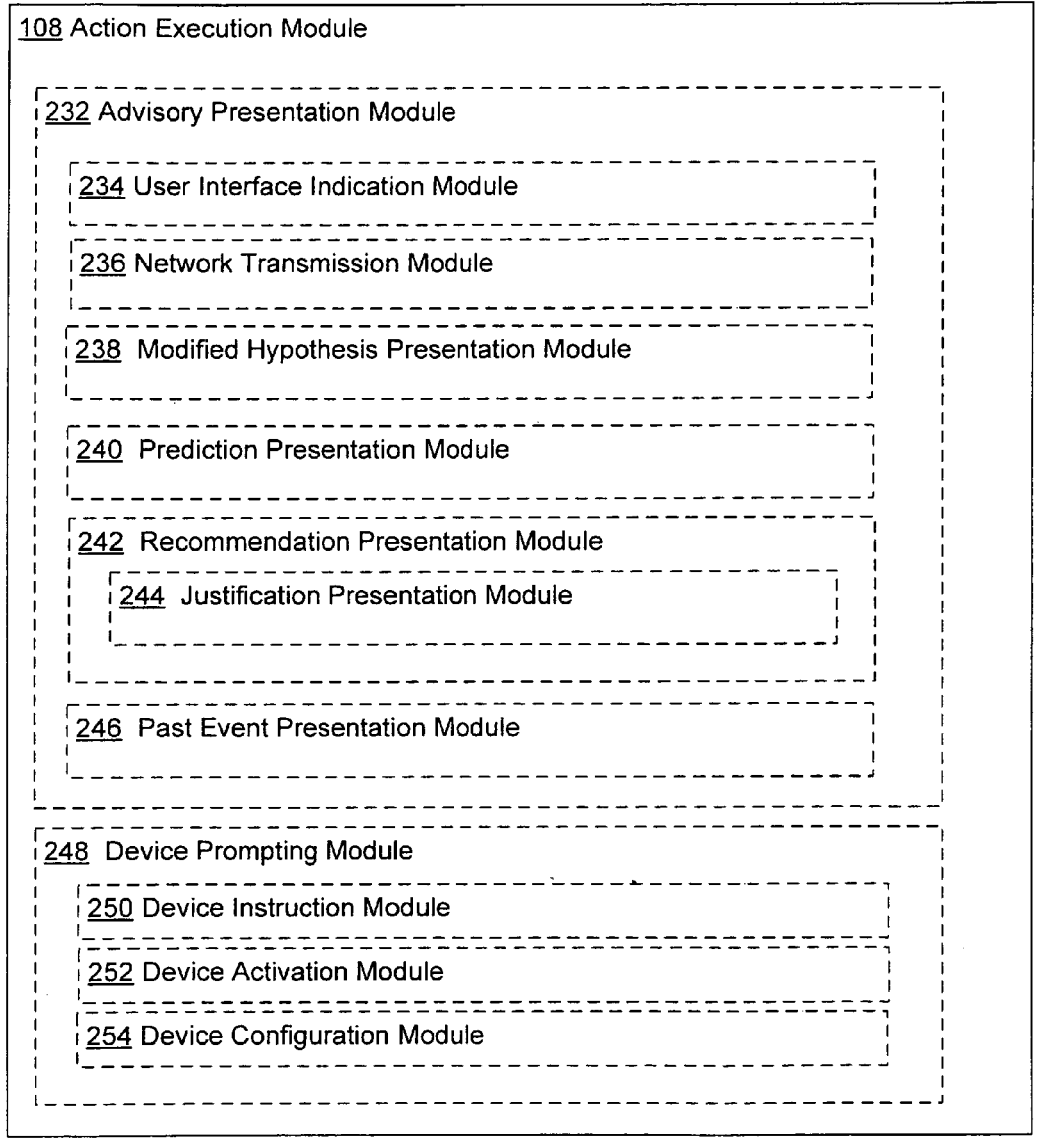
FIG. 2c shows another perspective of the action execution module 108 of the computing device 10 of FIG. 1b.

FIG. 2c illustrates particular implementations of the action execution module 108 of FIG. 1b. The action execution module 108 may be designed to execute at least one action based, at least in part, on a modified hypothesis 80 generated as a result, at least in part, of the reception of the at least one modification 61 by the modification reception module 104. As depicted in FIG. 2c, the action execution module 108 may include an advisory presentation module 232 that may be configured to present (e.g., indicate via user interface 122 or transmit via wireless and/or wired network 40) at least one advisory 90 related to the modified hypothesis 80. In various implementations, the at least one advisory 90 may be presented to a user 20* and/or one or more third parties 50.

The advisory presentation module 232 may further include one or more sub-modules in various alternative implementations. For instance, in various implementations, the advisory presentation module 232 may include a user interface indication module 234 that is configured to indicate the at least one advisory 90 via a user interface 122. In the same or different implementations, the advisory presentation module 232 may include a network transmission module 236 configured to transmit the at least one advisory 90 via a wireless and/or wired network 40. The network transmission module 236 may transmit the at least one advisory 90 to, for example, a user 20a (e.g., via mobile device 30) and/or one or more third parties 50.

In the same or different implementations, the advisory presentation module 232 may include a modified hypothesis presentation module 238 configured to present one or more form of the modified hypothesis 80. For instance, presenting an audio form, a textual form, a pictorial form, a graphical form, and/or other forms of the modified hypothesis 80. The modified hypothesis presentation module 238 may present the at least one form of the modified hypothesis 80 by presenting an indication of a spatial, temporal, or specific time relationship between at least two event types indicated by the modified hypothesis 80. The at least one form of the modified hypothesis 80 presented by the modified hypothesis presentation module 238 may indicate the relationship between the event types indicated by the modified hypothesis 80 including any combination of subjective user state types, objective occurrence types, and/or subjective observation types (e.g., indicate a relationship between a first type of subjective user state and a second type of subjective user state, indicate a relationship between a type of subjective user state and a type of objective occurrence, indicate a relationship between a type of subjective user state and a type of subjective observation, and so forth) as indicated by the modified hypothesis 80.

The advisory presentation module 232 may further include other sub-modules in various implementations. For example, in some implementations, the advisory presentation module 232 may include a prediction presentation module 240 configured to present at least one advisory 90 relating to a predication of one or more future events based, at least in part, on the modified hypothesis 80. For example, predicting that "a personal passenger vehicle belonging to the user will breakdown sometime during the coming week."

In various implementations, the advisory presentation module 232 may include a recommendation presentation module 242 configured to present at least one advisory 90 recommending a future course of action based, at least in part, on the modified hypothesis 80. For example, recommending that "the user take his personal passenger vehicle into the shop for repairs." In some implementations, the recommendation presentation module 242 may include a justification presentation module 244 configured to present a justification for the recommendation presented by the recommendation presentation module 242. For example, indicating that "the user should take her personal passenger vehicle into the shop because the last time the user did not take her personal vehicle into the shop after driving it for 15 thousand miles without being serviced, the personal vehicle broke down."

In some implementations, the advisory presentation module 232 may include a past event presentation module 246 configured to present an indication of one or more past events based, at least in part, on the modified hypothesis 80 (e.g., "the last time your husband went drinking, he overslept").

In various implementations, the action execution module 108 may include a device prompting module 248 configured to prompt (e.g., as indicated by ref. 91) at least one devices to execute at least one operation based, at least in part, on the modified hypothesis 80. The at least one device to be prompted to execute the at least one operation may include, for example, one or more sensing devices 35*, or one or more network/local devices 55. Network/local devices 55 are any device that may interface with a wireless and/or wired network 40 and/or any device that may be local with respect to, for example, the computing device 10. Examples of network/local devices 55 includes, for example, household devices such as household appliances, automobiles (or portions thereof), environmental devices such as air conditioners, humidifier, air purifiers, and so forth, electronic/communication devices (e.g., mobile device 30), and so forth.

In various alternative implementations, the device prompting module 248 may include one or more sub-modules. For example, in some implementations, the device prompting module 248 may include a device instruction module 250 configured to directly or indirectly instruct the at least one device (e.g., directly instructing a local device or indirectly instructing a network device via wireless and/or wired network 40) to execute the at least one operation. In the same or different implementations, the device prompting module 248 may include a device activation module 252 configured to directly or indirectly activate the at least one device (e.g., directly activating a local device or indirectly activating a network device via wireless and/or wired network 40) to execute the at least one operation. In the same or different implementations, the device prompting module 248 may include a device configuration module 254 designed to directly or indirectly configure the at least one device (e.g., directly configuring a local device or indirectly configuring a network device via wireless and/or wired network 40) to execute the at least one operation.

Referring back to the action execution module 108 of FIGS. 1*b* and 2*c*, in various implementations, the action execution module 108 may be configured to execute the one or more actions based on the modified hypothesis 80 as generated by the hypothesis modification module 106 and in response to a reported event. For example, the one or more actions may be executed if the reported event at least substantially matches with at least one of the event types (e.g., substantially matches with at least one of at least two event types) identified by the modified hypothesis 80. In some specific implementations, the one or more actions may only be executed if the reported event matches at least one of the event types identified by the modified hypothesis 80.

In various implementations, the computing device 10 of FIG. 1*b* may include one or more applications 126. The one or more applications 126 may include, for example, one or more communication applications 267 (e.g., text messaging application, instant messaging application, email application, voice recognition system, and so forth) and/or Web 2.0 application 268 to facilitate in communicating via, for example, the World Wide Web. In some implementations, copies of the one or more applications 126 may be stored in memory 140.

In various implementations, the computing device 10 may include a network interface 120, which may be a device designed to interface with a wireless and/or wired network 40. Examples of such devices include, for example, a network interface card (NIC) or other interface devices or systems for communicating through at least one of a wireless network or wired network 40. In some implementations, the computing device 10 may include a user interface 122. The user interface 122 may comprise any device that may interface with a user 20*b*. Examples of such devices include, for example, a keyboard, a display monitor, a touchscreen, a microphone, a speaker, an image capturing device such as a digital or video camera, a mouse, and so forth.

The computing device 10 may include a memory 140. The memory 140 may include any type of volatile and/or non-volatile devices used to store data. In various implementations, the memory 140 may comprise, for example, a mass storage device, a read only memory (ROM), a programmable read only memory (PROM), an erasable programmable read-only memory (EPROM), random access memory (RAM), a flash memory, a synchronous random access memory (SRAM), a dynamic random access memory (DRAM), and/or other memory devices. In various implementations, the memory 140 may store an existing hypotheses 80 and/or historical data (e.g., historical data including, for example, past events data or historical events patterns related to a user 20*, related to a subgroup of the general population that the user 20* belongs to, or related to the general population).

Figure 2D:
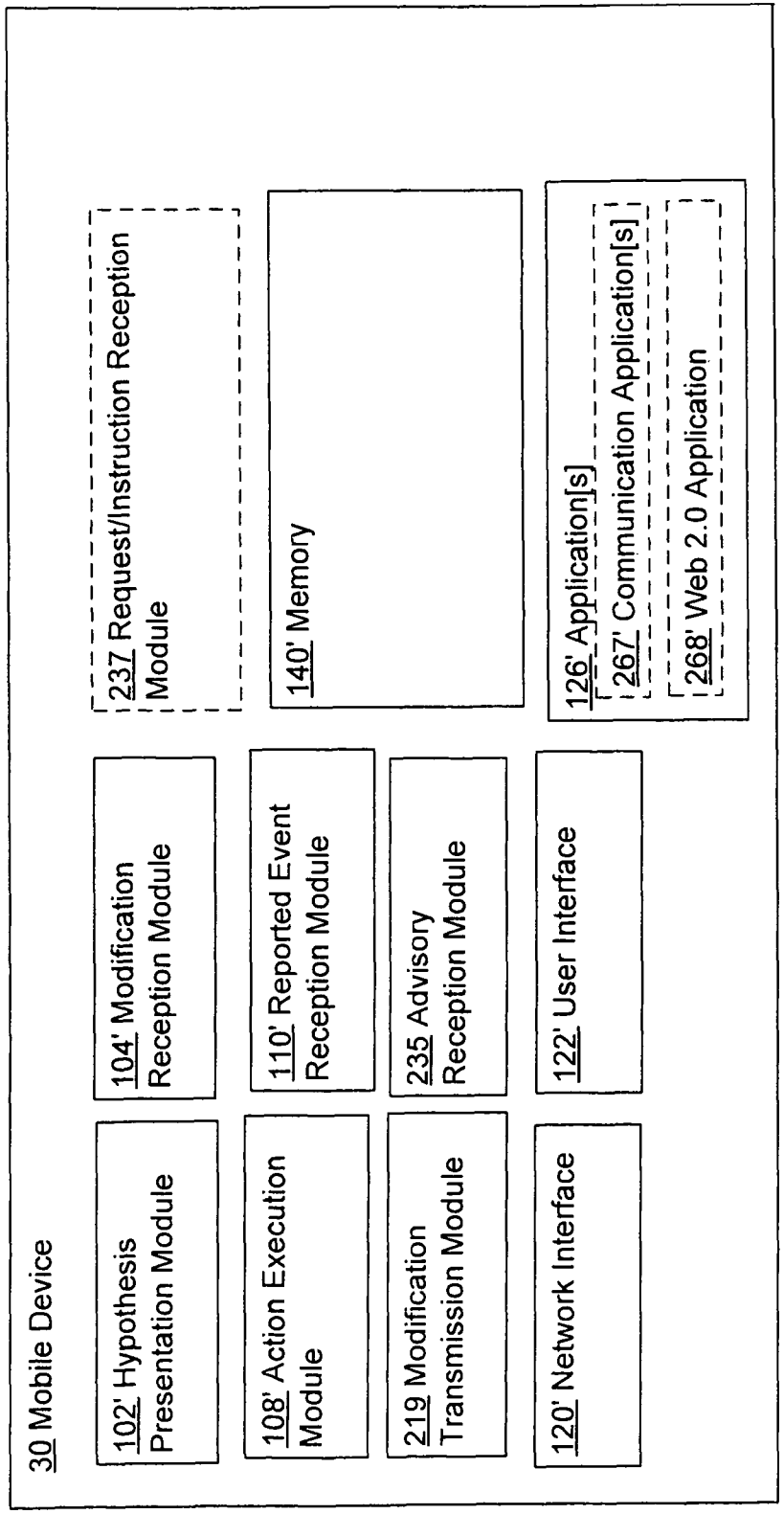

FIG. 2d illustrates particular implementations of the mobile device 30 of FIG. 1a. The mobile device 30, as previously described, may be a larger computing/communication device such as a laptop or a desktop computer, or a smaller computing/communication device including a handheld device such as a cellular telephone, a smart phone, a PDA, and so forth. In various embodiments, the mobile device 30 may include components and modules similar to those included in the computing device 10 of FIG. 1b.

For example, and similar to the computing device 10, the mobile device 30 may also include a hypothesis presentation module 102', a modification reception module 104', an action execution module 108', a reported event reception module 110', a network interface 120', a user interface 122', a memory 140', and/or one or more applications 126', which may include one or more communication applications 267' and/or one or more Web 2.0 applications 268'. Note that in some implementations, memory 140' may store a copy of the hypothesis 60 and/or the modified hypothesis 80'. These components and modules may generally perform the same or similar functions as their counterparts in the computing device 10 the computing device 10 with certain exceptions. For instance, with respect to the hypothesis presentation modules 102* of the mobile device 30 and the computing device 10, in the mobile device 30 case the hypothesis presentation module 102' may present (e.g., audioally or visually indicate) a hypothesis 60 to a user 20a via a user interface 122' while in the computing device 10 the hypothesis presentation module 102 may present a hypothesis 60 to a user 20a by transmitting the hypothesis 60 to the mobile device 30 via wireless and/or wired network 40 (e.g., in embodiments in which the computing device 10 is a server) or may present (e.g., audioally or visually indicate) the hypothesis 60 to a user 20b via a user interface 122 (e.g., in embodiments in which the computing device 10 is a standalone device). Note also that the unlike the computing device 10, the mobile device 30 may not include a hypothesis modification module 106 or a hypothesis development module 112 since operations performed by such modules may be performed by, for example, a server (e.g., computing device 10 in embodiments in which the computing device 10 is a server).

In addition to those components and modules described above, the mobile device 30 may include a modification transmission module 219 and an advisory reception module 235. The modification transmission module 219 may be designed to, among other things, transmit one or more modifications 61 (e.g., as provided by a user 20a through user interface 122') to a server (e.g., computing device 10 in embodiments in which the computing device 10 is a server) via, for example, wireless and/or wired network 40. The advisory reception module 235 may be designed to receive one or more advisories 90 related to the modified hypothesis 80 from the computing device 10 via, for example, wireless and/or wired network 40, the modified hypothesis 80 being generated by the computing device 10 (e.g., in embodiments in which the computing device 10 is a server) based on the hypothesis 60 and the one or more modifications 61 received from the mobile device 30.

Figure 2E:
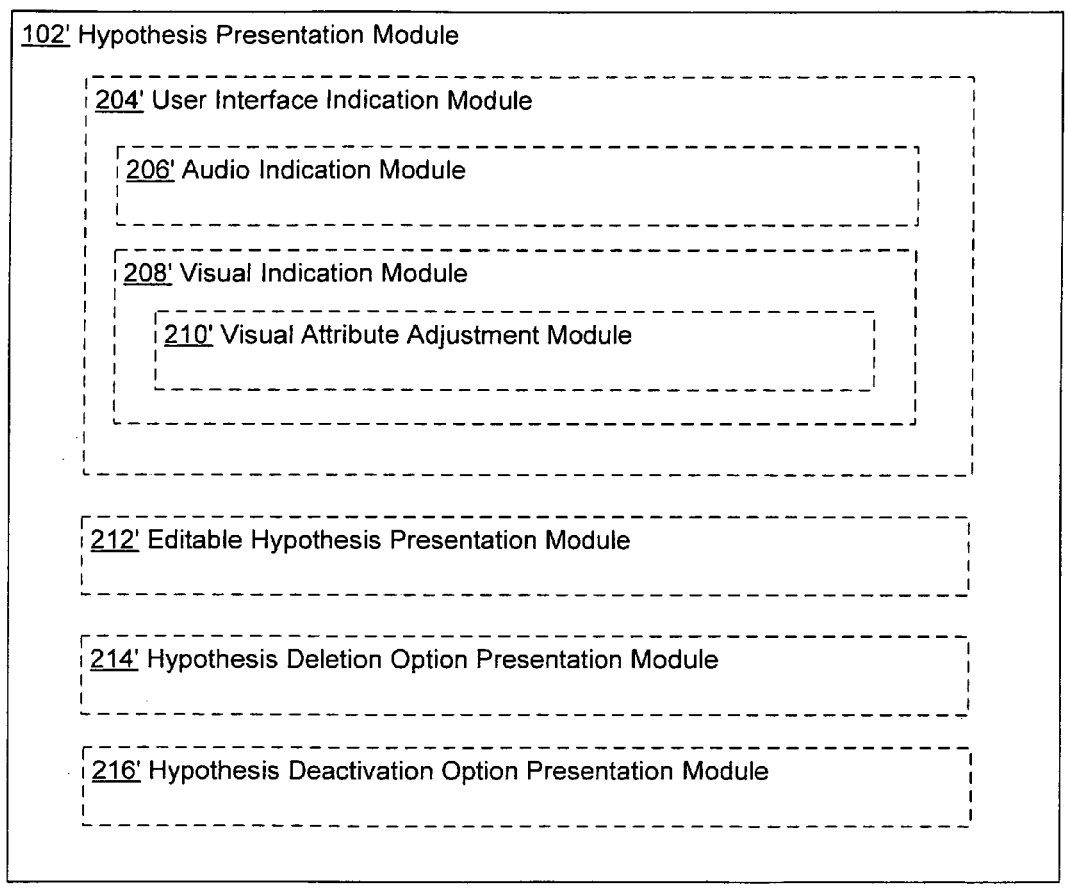
FIG. 2e shows another perspective of the hypothesis presentation module 102' of the mobile device 30 of FIG. 2d.

FIG. 2e illustrates particular implementations of the hypothesis presentation module 102' of the mobile device 30 of FIG. 2d. The hypothesis presentation module 102' of the mobile device 30 may perform the same or similar functions (e.g., present one or more hypotheses including presenting to a user 20a a hypothesis 60) as the hypothesis presentation module 102 of the computing device 10 (e.g., in embodiments in which the computing device 10 is a standalone device). As illustrated, the hypothesis presentation module 102' may include a user interface indication module 204', an editable hypothesis presentation module 212', a hypothesis deletion option presentation module 214', and/or a hypothesis deactivation option presentation module 216'. In various implementations, the user interface indication module 204' may further include an audio indication module 206' and a visual indication module 208', which may further include a visual attribute adjustment module 210'. These modules corresponds to and may perform the same or similar functions as the user interface indication module 204 (which may include the audio indication module 206, the visual indication module 208, and the visual attribute adjustment module 210), the editable hypothesis presentation module 212, the hypothesis deletion option presentation module 214, and the hypothesis deactivation option presentation module 216 (see FIG. 2a), respectively, of computing device 10.

Figure 2F:
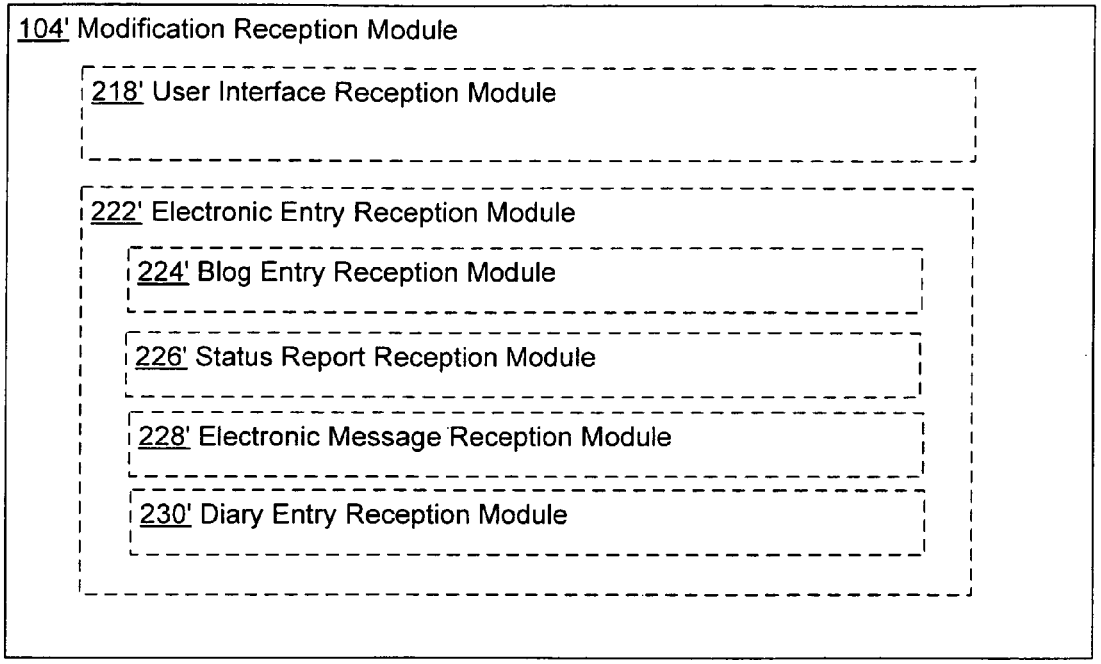
FIG. 2f shows another perspective of the modification reception module 104' of the mobile device 30 of FIG. 2d.

FIG. 2f illustrates particular implementations of the modification reception module 104' of the mobile device 30 of FIG. 2d. In various implementations, the modification reception module 104' may perform the same or similar functions (e.g., to receive at least one modification 61 to modify the hypothesis 60 from the user 20a) as the modification reception module 104 of the computing device 10 (e.g., in embodiments in which the computing device 10 is a standalone device). As illustrated, the modification reception module 104' may include a user interface reception module 218' and an electronic entry reception module 222', which may further include a blog entry reception module 224', a status report reception module 226', electronic message reception module 228', and/or diary entry reception module 230'. These modules may correspond to and may perform the same or similar functions as the functions performed by the user interface reception module 218, the electronic entry reception module 222, the blog entry reception module 224, the status report reception module 226, the electronic message reception module 228, and the diary entry reception module 230 (see FIG. 2b), respectively, of the computing device 10.

FIG. 2g illustrates particular implementations of the action execution module 108' of the mobile device 30 of FIG. 2d. In various implementations, the action execution module 108' may perform the same or similar functions (e.g., executing one or more actions based, at least in part, on a modified hypothesis 80 resulting, at least in part, from the reception of the one or modifications 61 by the modification reception module 104') as the action execution module 108 of the computing device 10 (e.g., in embodiments in which the computing device 10 is a standalone device). As illustrated, the action execution module 108' may include an advisory presentation module 232' and a device prompting module 248' that corresponds to and performs the same or similar functions as the advisory presentation module 232 and the device prompting module 248 of the computing device 10. As further illustrated, the advisory presentation module 232' may further include the same one or more sub-modules (e.g., a user interface indication module 234', a network transmission module 236', a modified hypothesis presentation module 238', a prediction presentation module 240', a recommendation presentation module 242' that further includes a justification presentation module 244', and/or a justification presentation module 244') that may be included in the advisory presentation module 232 of the computing device 10 performing the same or similar functions as their counterparts in the computing device 10. Likewise, the device prompting module 248' may further include the same one or more sub-modules (e.g., a device instruction module 250', a device activation module 252', and/or a device configuration module 254') that may be included in the device prompting module 248 of the computing device 10 performing the same or similar functions as their counterparts in the computing device 10.

Figure 2H:
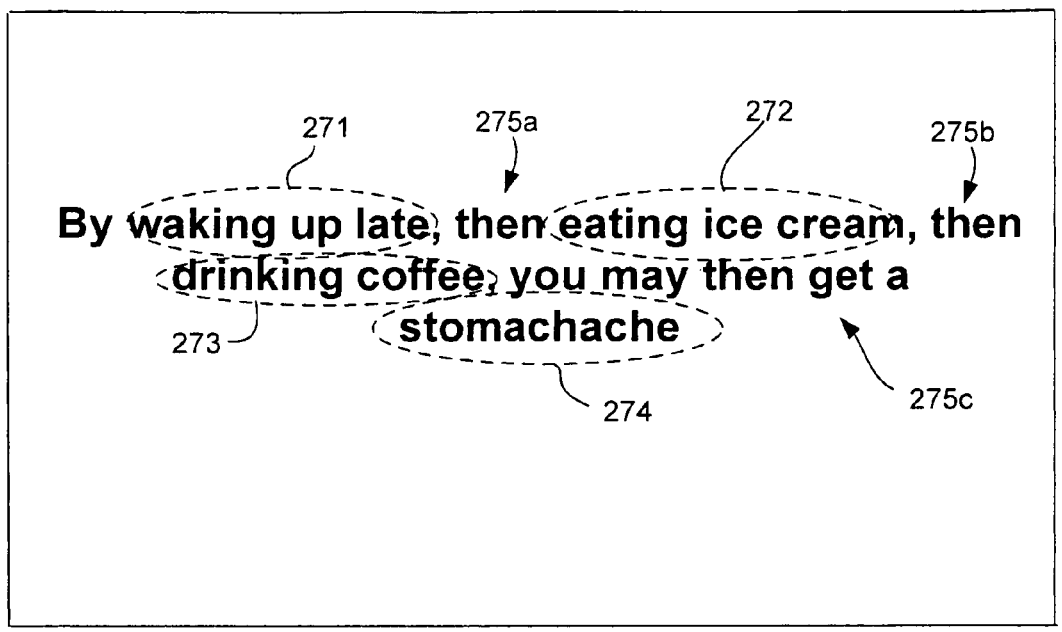
FIG. 2h shows an exemplarily user interface display displaying a visual version of a hypothesis.

There are many ways that a hypothesis 60 (or a modified hypothesis 80) may be visually or audioally indicated to a user 20*. FIGS. 2h to 2k illustrates just a few examples of how a hypothesis 60 (or a modified hypothesis 80) may be visually indicated on a user interface display device such as a display monitor or touchscreen. In particular, FIG. 2h is an exemplary textual version of a hypothesis 60 being visually indicated on a user interface display 270. The user interface display 270 shows a textual message indicating the hypothesis 60. In this case, some groups of words within the message represent different event types, while other words in the message represent the temporal relationships between the event types. For example, refs. 271, 272, 273, and 274 indicate selective words in the textual message that are different symbolic representations of different event types (e.g., waking up late, eating ice cream, drinking coffee, and stomachache). Refs. 275a, 275b, and 275c indicate symbolic representations (e.g., in the form of words) that represents the relationships (e.g., sequential or temporal relationships) between the different event types represented on the user interface display 270.

Figure 2I:
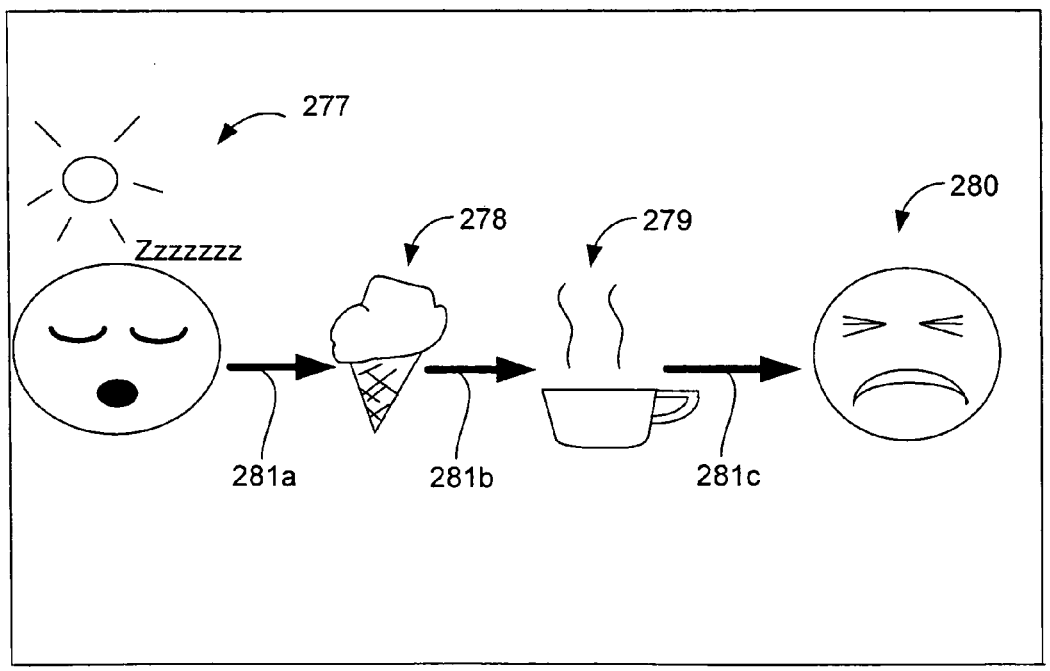
FIG. 2i shows another exemplarily user interface display displaying another visual version of the hypothesis.

FIG. 2i is an exemplary pictorial version of the hypothesis 60 textually illustrated in FIG. 2h being pictorially indicated on a user interface display 276. The user interface display 276 shows multiple symbolic representations (refs. 277, 278, 279, 280, 281a, 281b, and 281c) in the form of emoticons and figures/icons that represents the different event types and their relationships with each other. For instance, in this example the symbolic representation 277 (in the form of an emoticon) represents the event type "waking up late." The symbolic representation 278 (in the form of a figure/icon) represents the event type "eating ice cream." The symbolic representation 279 (in the form of a figure/icon) represents the event type "drinking coffee." The symbolic representation 280 (in the form of an emoticon) represents the event type "stomachache." The symbolic representations 281a, 281b, and 281c (in the form of arrows) represents the temporal relationships between the event types (e.g., as represented by symbolic representations 277, 278, 279, and 280) represented on the user interface display 276.

Figure 2J:
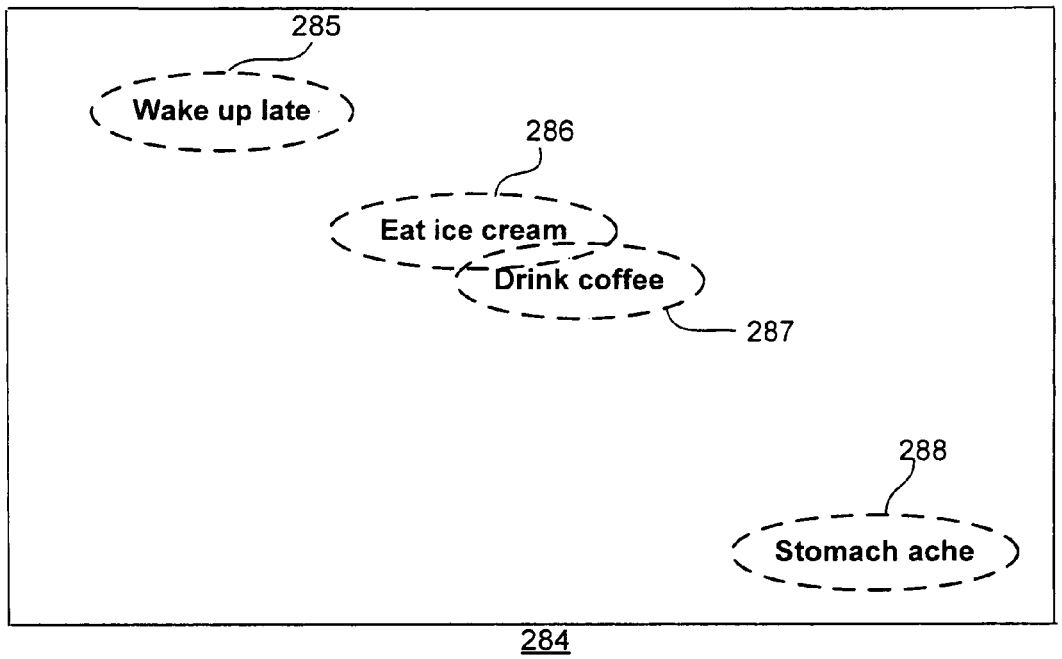
FIG. 2j shows another exemplarily user interface display displaying still another visual version of the hypothesis.

FIG. 2j is another exemplary pictorial version of the hypothesis 60 that was textually illustrated in FIG. 2h being again pictorially indicated on a user interface display 284. The user interface display 284 shows oval shapes (symbolic representations 285, 286, 287, and 288) that represents the four different event types. The relationships (e.g., temporal relationships) between the four different event types (as represented by the symbolic representations 285, 286, 287, and 288) may be symbolically represented by the specific placement of the symbolic representations 285, 286, 287, and 288 with respect to the user interface display 284 and with respect to each other. For example, in this illustrated example the top left corner of the user interface display may represent the earliest point in time, while the bottom right corner may represent the latest point in time. Thus, symbolic representation 285 (e.g., representing "wake up late") being closest to the top left corner of the user interface display 284 represents the earliest event type to occur, while symbolic representation 288 (e.g., representing "stomach ache"), which is located nearest to the bottom right corner, represents the latest event type to occur. Note that symbolic representation 286 and symbolic representation 287 intersect each other. Thus, the event types (e.g., "eat ice cream" and "drink coffee") that they represent are at least partially concurrently occurring event types. In order to facilitate a user in understanding the time relationships between the different event types a time increment grid may be placed in the background.

Figure 2K:
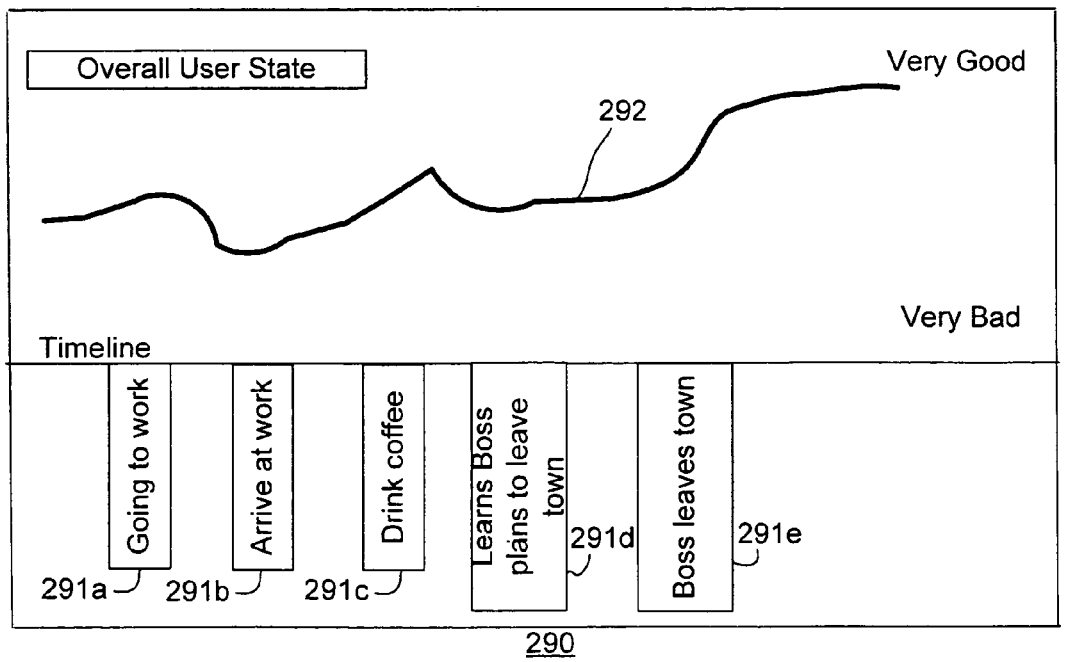
FIG. 2k shows another exemplarily user interface display displaying a visual version of another hypothesis.

FIG. 2k illustrates a pictorial/graphical representation of a hypothesis 60 (e.g., a hypothesis 60 that links going to work, arriving at work, drinking coffee, learning boss plans to leave town, boss leaving town, and overall user state) being pictorially/graphically represented on a user interface display 290. In this example, most of the event types indicated by the hypothesis 60 are represented by blocks (e.g., symbolic representations 291a, 291b, 291c, 291d, and 291e) below a timeline. The overall user state is represented symbolically by a line to indicate the specific overall user state at any given moment in time. Note that by employing the robust systems and methods described herein, a user may be able to modify the hypothesis 60 depicted in the user interface display 290. That is, the user may choose to modify the hypothesis 60 by deleting symbolic representations 291a, 291b, and 291c (e.g., representing going to work, arriving at work, and drinking coffee) if the user feels that the events represented by the symbolic representations may not be relevant to the user having a very good overall user state.

The various features and characteristics of the components, modules, and sub-modules of the computing device 10 and mobile device 30 presented thus far will be described in greater detail with respect to the processes and operations to be described herein.

Figure 3:
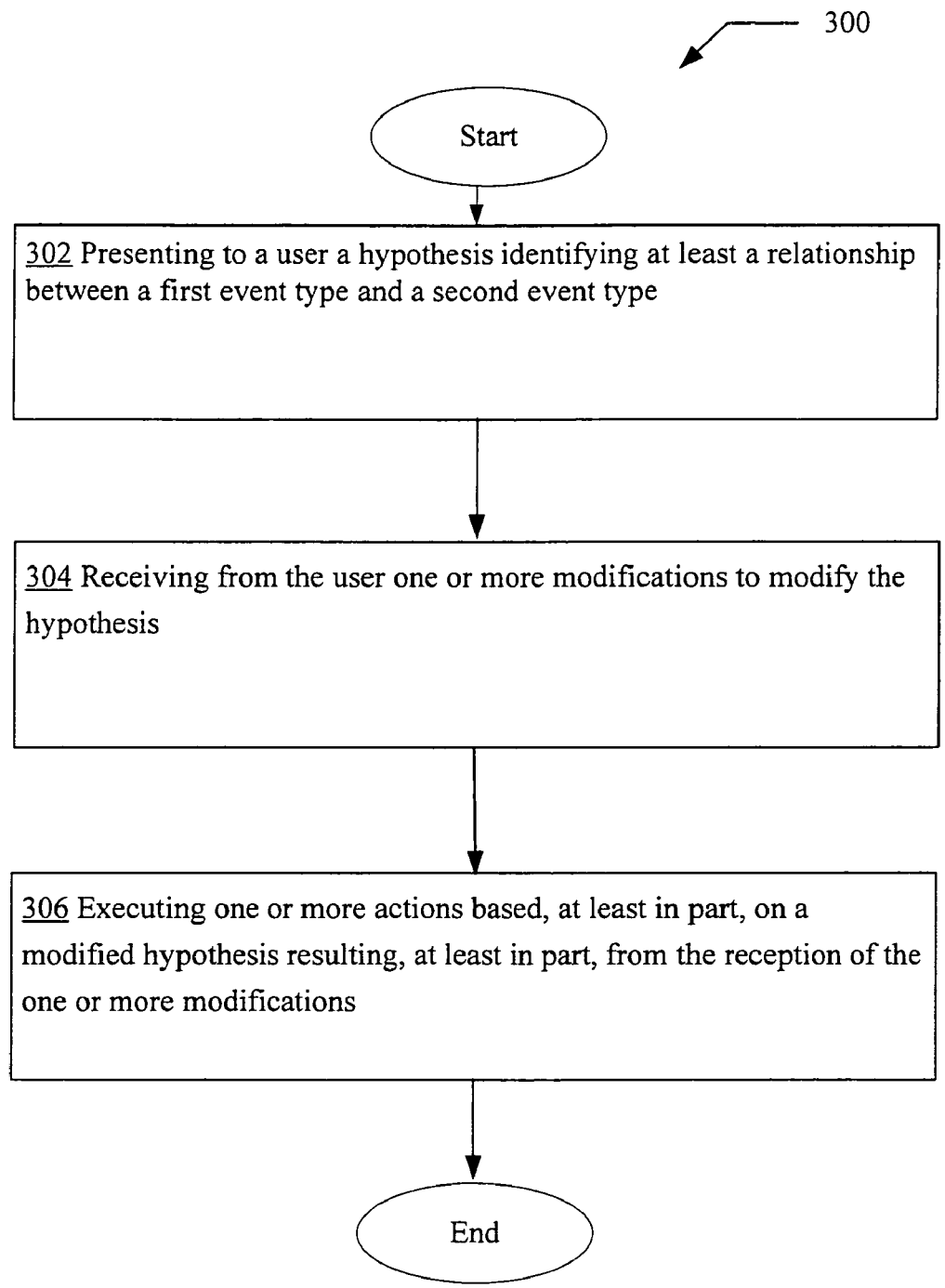
FIG. 3 is a high-level logic flowchart of a process.

FIG. 3 illustrates an operational flow 300 representing example operations related to, among other things, presenting a hypothesis to a user that identifies at least a relationship between a first event type and a second event type, receiving one or more modifications to modify the hypothesis from the user, and executing one or more actions based, at least in part, on a modified hypothesis resulting at least in part from the reception of the one or more modifications. In some embodiments, the operational flow 300 may be executed by, for example, the mobile device 30 or the computing device 10 of FIGS. 1a and 1b.

In FIG. 3 and in the following figures that include various examples of operational flows, discussions and explanations may be provided with respect to the above-described exemplary environment of FIGS. 1a and 1b, and/or with respect to other examples (e.g., as provided in FIGS. 2a-2k) and contexts. However, it should be understood that the operational flows may be executed in a number of other environments and contexts, and/or in modified versions of FIGS. 1a, 1b, and 2a-2k. Also, although the various operational flows are presented in the sequence(s) illustrated, it should be understood that the various operations may be performed in different sequential orders other than those which are illustrated, or may be performed concurrently.

Further, in the following figures that depict various flow processes, various operations may be depicted in a box-within-a-box manner. Such depictions may indicate that an operation in an internal box may comprise an optional example embodiment of the operational step illustrated in one or more external boxes. However, it should be understood that internal box operations may be viewed as independent operations separate from any associated external boxes and may be performed in any sequence with respect to all other illustrated operations, or may be performed concurrently.

In any event, after a start operation, the operational flow 300 may move to a hypothesis presentation operation 302 for presenting to a user a hypothesis identifying at least a relationship between a first event type and a second event type. For instance, the hypothesis presentation module 102* of the mobile device 30 or the computing device 10 presenting (e.g., indicating via a user interface 122* or transmitting via wireless and/or wired network 40) to a user 20\* a hypothesis 60 identifying at least a relationship between a first event type (e.g., a subjective user state, a subjective observation, or an objective occurrence) and a second event type (e.g., a subjective user state, a subjective observation, or an objective occurrence).

Next, operational flow 300 may include a modification reception operation 304 for receiving from the user one or more modifications to modify the hypothesis. For instance, the modification reception module 104\* of the mobile device 30 or the computing device 10 receiving (e.g., receiving via a user interface 122 or via wireless and/or wired network 40) from the user 20\* one or more modifications 61 to modify the hypothesis 60.

Finally, operation flow 300 may include an action execution operation 306 for executing one or more actions based, at least in part, on a modified hypothesis resulting, at least in part, from the reception of the one or more modifications. For instance, the action execution module 108\* of the mobile device 30 or the computing device 10 executing one or more actions (e.g., presenting one or more advisories 90 or configuring a device to execute one or more operations) based, at least in part, on a modified hypothesis 80 resulting, at least in part, from the reception of the one or more modifications 61. In a more specific example, the action execution module 108' of the mobile device 30 executing one or more actions (e.g., displaying the modified hypothesis 80 or prompting 91' one or more devices such as one or more sensing devices 35\* or network/local devices 55 to execute one or more operations) after receiving from the computing device 10 (e.g., when the computing device 10 is a server) a request for executing the one or more actions. In this example, the request may have been generated and transmitted by the computing device 10 based, at least in part, on the modified hypothesis 80.

Figure 4A:
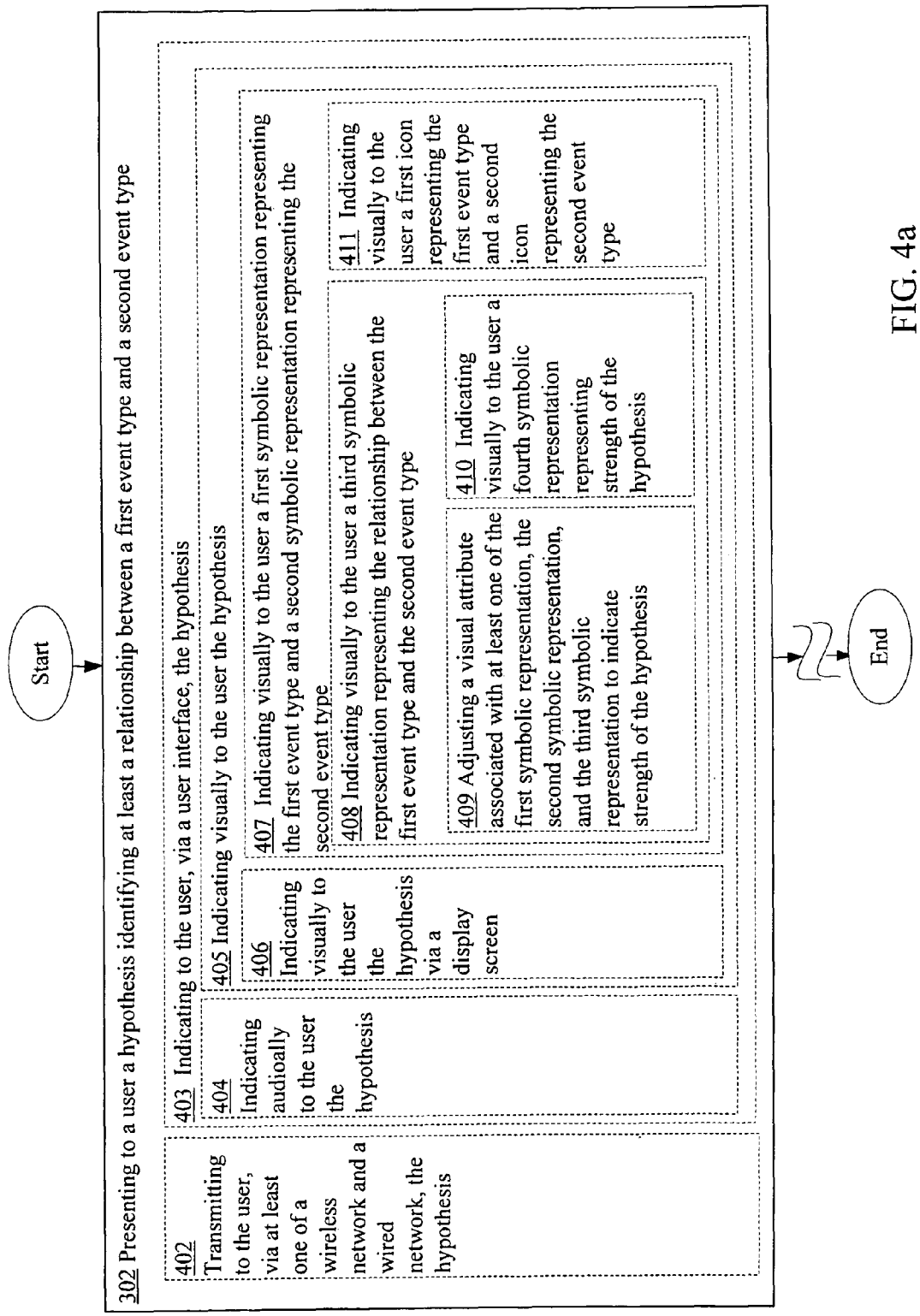
FIG. 4a is a high-level logic flowchart of a process depicting alternate implementations of the hypothesis presentation operation 302 of FIG. 3.

Referring back to the hypothesis presentation operation 302, the hypothesis 60 presented through the hypothesis presentation operation 302 may be presented in a variety of different ways. For example, in some implementations, the hypothesis presentation operation 302 may include an operation 402 for transmitting to the user, via at least one of a wireless network and a wired network, the hypothesis as depicted in FIG. 4*a*. For instance, the network transmission module 202 (see FIG. 2*a*) of the computing device 10 (e.g., in embodiments in which the computing device 10 is a server) transmitting to the user 20*a*, via at least one of a wireless network and a wired network 40, the hypothesis 60.

In some alternative implementations, the hypothesis presentation operation 302 may include an operation 403 for indicating to the user, via a user interface, the hypothesis as depicted in FIG. 4*a*. For instance, the user interface indication module 204\* of the mobile device 30 or the computing device 10 (e.g., in embodiments in which the computing device 10 is a standalone device) indicating to the user 20\*, via a user interface 122\*, the hypothesis 60.

In some implementations, operation 403 may include an operation 404 for indicating audioally to the user the hypothesis as depicted in FIG. 4*a*. For instance, the audio indication module 206\* of the mobile device 30 or the computing device 10 (e.g., in embodiments in which the computing device 10 is a standalone device) indicating audioally (e.g., via speaker system) to the user 20\* the hypothesis 60.

In the same or different implementations, operation 403 may include an operation 405 for indicating visually to the user the hypothesis as depicted in FIG. 4*a*. For instance, the visual indication module 208\* of the mobile device 30 or the computing device 10 (e.g., in embodiments in which the computing device 10 is a standalone device) indicating visually (e.g., via a display device such as a display monitor or touchscreen) to the user 20\* the hypothesis 60.

In some implementations, operation 405 may further include an operation 406 for indicating visually to the user the hypothesis via a display screen as depicted in FIG. 4*a*. For instance, the visual indication module 208\* of the mobile device 30 or the computing device 10 indicating visually to the user 20\* the hypothesis 60 via a display screen (e.g., touchscreen).

The hypothesis 60 to be visually indicated through operation 405 may be indicated in a variety of ways including, for example, in text form, in graphical form, in pictorial form, and so forth. For example, in various implementations, operation 405 may include an operation 407 for indicating visually to the user a first symbolic representation representing the first event type and a second symbolic representation representing the second event type as depicted in FIG. 4*a*. For instance, the visual indication module 208\* of the mobile device 30 or the computing device 10 indicating visually to the user 20\* a first symbolic representation representing the first event type and a second symbolic representation representing the second event type. A symbolic representation may be, for example, an icon, an emoticon, a figure, text, a number, and so forth.

In some implementations, operation 407 may further include an operation 408 for indicating visually to the user a third symbolic representation representing the relationship between the first event type and the second event type as depicted in FIG. 4*a*. For instance, the visual indication module 208\* of the mobile device 30 or the computing device 10 indicating visually to the user 20\* a third symbolic representation representing the relationship between the first event type and the second event type. For example, in some implementations, the third symbolic representation may be the spacing between the first and second symbolic representations shown on a display screen, a line or an arrow between the first and second symbolic representations, an attribute such as the color or darkness associated with the first and second symbolic representations, a textual phrase, and so forth.

Operation 408 may include, in various implementations, an operation 409 for adjusting a visual attribute associated with at least one of the first symbolic representation, the second symbolic representation, and the third symbolic representation to indicate strength of the hypothesis as depicted in FIG. 4*a*. For instance, the visual attribute adjustment module 210\* of the mobile device 30 or the computing device 10 adjusting a visual attribute (e.g., adjusting boldness, highlighting, color, spacing or angular relationships between the symbols, and so forth) associated with at least one of the first symbolic representation, the second symbolic representation, and the third symbolic representation to indicate strength of the hypothesis 60. In some implementations, the strength of a hypothesis 60 may be related to confidence level of the hypothesis 60. For instance, a hypothesis 60 that was developed based on a relatively large pool of data that shows a pattern of reported events that have repeatedly occurred and that uniformly supports the hypothesis 60 would result in a stronger or sounder hypothesis 60.

In some alternative implementations, operation 408 may include an operation 410 for indicating visually to the user a fourth symbolic representation representing strength of the hypothesis as depicted in FIG. 4*a*. For instance, the visual indication module 208\* of the mobile device 30 or the computing device 10 indicating visually to the user 20\* a fourth symbolic representation (e.g., a number) representing strength (e.g., soundness) of the hypothesis 60.

In various implementations, operation 407 may include an operation 411 for indicating visually to the user a first icon representing the first event type and a second icon representing the second event type as depicted in FIG. 4a. For instance, the visual indication module 208* of the mobile device 30 or the computing device 10 indicating visually to the user 20* a first icon (e.g., an emoticon such as a smiling face) representing the first event type (e.g., happiness) and a second icon (e.g., a figure of the sun) representing the second event type (e.g., sunny weather).

Figure 4B:
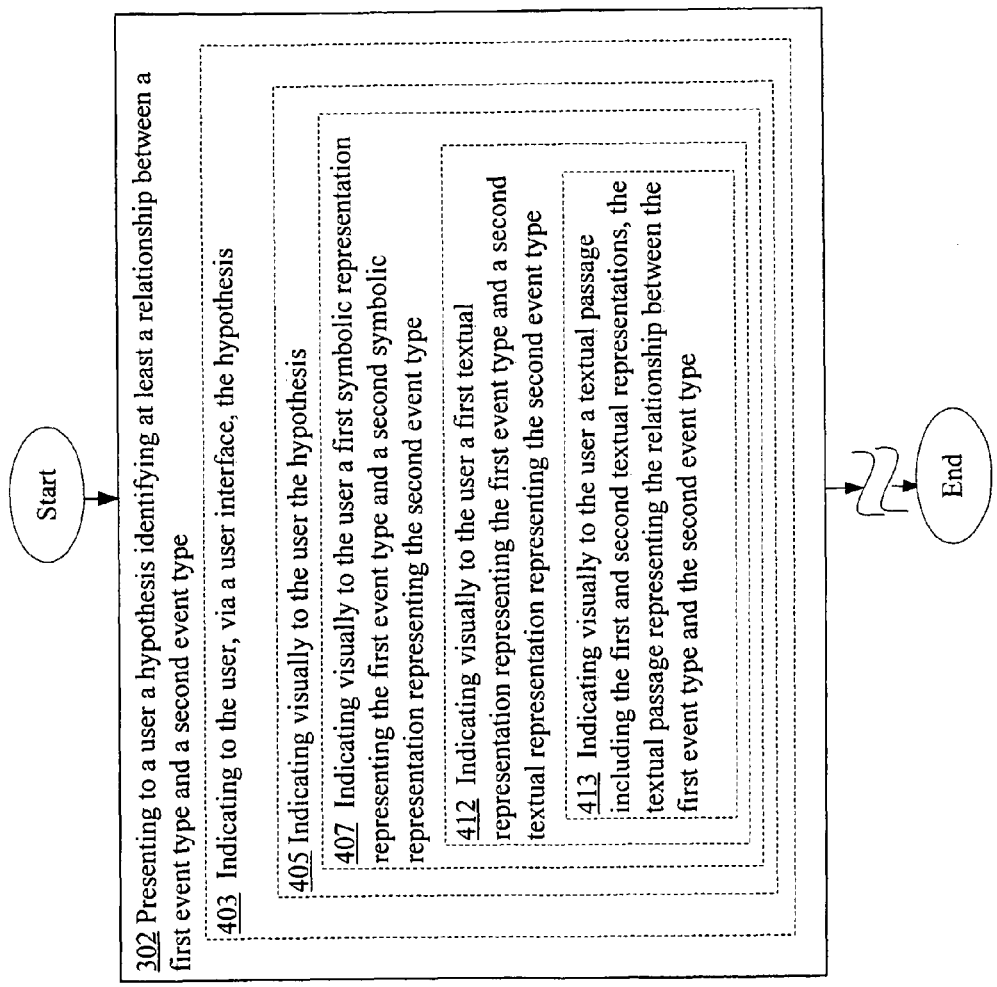
FIG. 4b is a high-level logic flowchart of a process depicting alternate implementations of the hypothesis presentation operation 302 of FIG. 3.

In alternative implementations, operation 407 may include an operation 412 for indicating visually to the user a first textual representation representing the first event type and a second textual representation representing the second event type as depicted in FIG. 4b. For instance, the visual indication module 208* of the mobile device 30 or the computing device 10 indicating visually to the user 20* a first textual representation (e.g., "sadness") representing the first event type and a second textual representation (e.g., "overcast day") representing the second event type.

Operation 412, in turn, may include an operation 413 for indicating visually to the user a textual passage including the first and second textual representations, the textual passage representing the relationship between the first event type and the second event type as depicted in FIG. 4b. For instance, the visual indication module 208* of the mobile device 30 or the computing device 10 indicating visually to the user 20* a textual passage including the first and second textual representations, the textual passage representing the relationship between the first event type and the second event type (e.g., "whenever it is cloudy, you are sad").

Figure 4C:
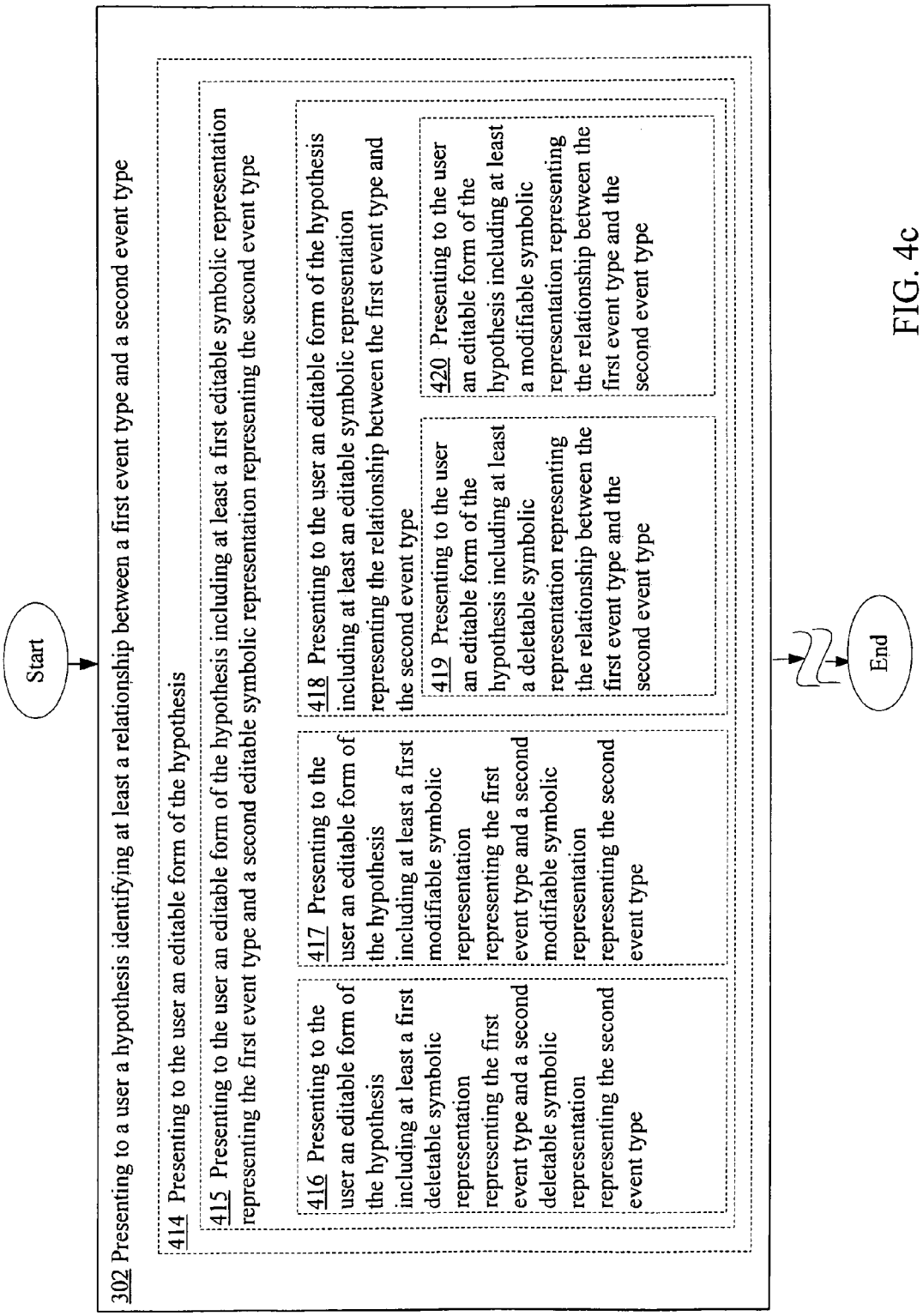
FIG. 4c is a high-level logic flowchart of a process depicting alternate implementations of the hypothesis presentation operation 302 of FIG. 3.

In various implementations, the hypothesis presentation operation 302 of FIG. 3 may include an operation 414 for presenting to the user an editable form of the hypothesis as depicted in FIG. 4c. For instance, the editable hypothesis presentation module 212* of the mobile device 30 or the computing device 10 presenting to the user 20* an editable form of the hypothesis 60. For example, in embodiments where the computing device 10 is a server that communicates with a user 20a via the mobile device 30, the editable hypothesis presentation module 212 of the computing device 10 may be designed to present an editable version of the hypothesis 60 to the user 20a by transmitting the editable version of the hypothesis 60 to the mobile device 30. The editable hypothesis presentation module 212' of the mobile device 30 may then present the editable version of the hypothesis 60 to the user 20a by indicating the editable version of the hypothesis 60 via a user interface 122' (e.g., a speaker system and/or a display system). The modifications made by the user 20a may then be transmitted back to the computing device 10 for modifying the hypothesis 60

As further depicted in FIG. 4c, in some implementations, operation 414 may include an operation 415 for presenting to the user an editable form of the hypothesis including at least a first editable symbolic representation representing the first event type and a second editable symbolic representation representing the second event type. For instance, the editable hypothesis presentation module 212* of the mobile device 30 or the computing device 10 presenting (e.g., audioally or visually indicating or transmitting via a wireless and/or wired network 40) to the user 20* an editable form of the hypothesis 60 including at least a first editable (e.g., deletable and/or modifiable) symbolic representation representing the first event type and a second editable (e.g., deletable and/or modifiable) symbolic representation representing the second event type.

Operation 415 may, in turn, comprise one or more additional operations in various alternative implementations. For example, in some implementations, operation 415 may include an operation 416 for presenting to the user an editable form of the hypothesis including at least a first deletable symbolic representation representing the first event type and a second deletable symbolic representation representing the second event type as depicted in FIG. 4c. For instance, the editable hypothesis presentation module 212* of the mobile device 30 or the computing device 10 presenting (e.g., audioally or visually indicating or transmitting via a wireless and/or wired network 40) to the user 20* an editable form of the hypothesis 60 including at least a first deletable symbolic representation representing the first event type and a second deletable symbolic representation representing the second event type.

As a further illustration, suppose the user 20* is presented with the editable form of the hypothesis 60 that may have been previously developed based on events previously reported by the user 20* that indicates that the user 20* may get a stomach ache (e.g., a first event type) if the user 20* eats at a particular Mexican restaurant (e.g., a second event type). After being presented with the editable form of the hypothesis 60, the user 20* recognizes that the hypothesis 60 may have been based solely on the user 20* last reported visit to that particular restaurant when the user 20* got sick and now realizes that the cause of his stomach ache may not have been from the visit to that particular restaurant but rather eating a new dish containing a new ingredient he had never eaten before. Thus, the user 20* may want to modify the editable form of the hypothesis 60 to delete one of the event types identified by the hypothesis 60 (e.g., the second symbolic representation representing the second event type that indicates eating at the particular Mexican restaurant) and replacing the deleted event type (or the second symbolic representation) with a new event type (e.g., a third symbolic representation representing the consumption of the new dish containing the new ingredient).

In some implementations, operation 415 may include an operation 417 for presenting to the user an editable form of the hypothesis including at least a first modifiable symbolic representation representing the first event type and a second modifiable symbolic representation representing the second event type as depicted in FIG. 4c. For instance, the editable hypothesis presentation module 212* of the mobile device 30 or the computing device 10 presenting (e.g., audioally or visually indicating or transmitting) to the user 20* an editable form of the hypothesis 60 including at least a first modifiable symbolic representation (e.g., a smiling face emoticon) representing the first event type and a second modifiable symbolic representation (e.g., a picture of clouds) representing the second event type. Such a feature (e.g., providing modifiable symbolic representations) may allow the user 20* to, for example, correct the hypothesis 60 (e.g., changing a smiling face emoticon to a sad face emoticon).

In some implementations, operation 415 may include an operation 418 for presenting to the user an editable form of the hypothesis including at least an editable symbolic representation representing the relationship between the first event type and the second event type as depicted in FIG. 4c. For instance, the editable hypothesis presentation module 212* of the mobile device 30 or the computing device 10 presenting (e.g., audioally or visually indicating or transmitting) to the user 20* an editable form of the hypothesis 60 including at least an editable symbolic representation representing the relationship between the first event type and the second event type.

For example, in some implementations, the editable form of the hypothesis 60 may be presented, for example, on a display monitor in graphical or pictorial form showing a first and a second icon representing the first event type and the second event type. The relationship (e.g., spatial or temporal/specific time relationship) between the first event type and the second event type may be represented in the graphical representation by spacing between the first and the second icon (e.g., the first and second icons being set against a grid background), a line between the first and the second icon, an arrow between the first and the second icon, and so forth, that may be editable. In this example, the symbolic representation representing the relationship between the first event type and the second event type would be the spacing between the first and the second icon, the line between the first and the second icon, the arrow between the first and the second icon, and so forth, As further depicted in FIG. 4c, in some implementations, operation 418 may include an operation 419 for presenting to the user an editable form of the hypothesis including at least a deletable symbolic representation representing the relationship between the first event type and the second event type as depicted in FIG. 4c. For instance, the editable hypothesis presentation module 212* of the mobile device 30 or the computing device 10 presenting (e.g., audioally or visually indicating or transmitting) to the user 20* an editable form of the hypothesis 60 including at least a deletable symbolic representation representing the relationship between the first event type and the second event type. For example, a pictorial or textual form of the hypothesis 60 may be presented, and at least the portion of the hypothesis 60 that indicates the relationship between the first event type and the second event type may be deletable (e.g., erasable).

In the same or different implementations, operation 418 may include an operation 420 for presenting to the user an editable form of the hypothesis including at least a modifiable symbolic representation representing the relationship between the first event type and the second event type as depicted in FIG. 4c. For instance, the editable hypothesis presentation module 212* of the mobile device 30 or the computing device 10 presenting (e.g., audioally or visually indicating or transmitting) to the user 20* an editable form of the hypothesis 60 including at least a modifiable symbolic representation representing the relationship between the first event type and the second event type. For example, suppose an editable form of the hypothesis 60 is presented in textual form that indicates that the user 20* "will become depressed after overcast weather." The phrase "after" in the message defines the relationship between the first event type (e.g., depressed) and the second event type (e.g., overcast weather) and may be modifiable (e.g., non-deletion editable) to be switched from "after" to "during."

Figure 4D:
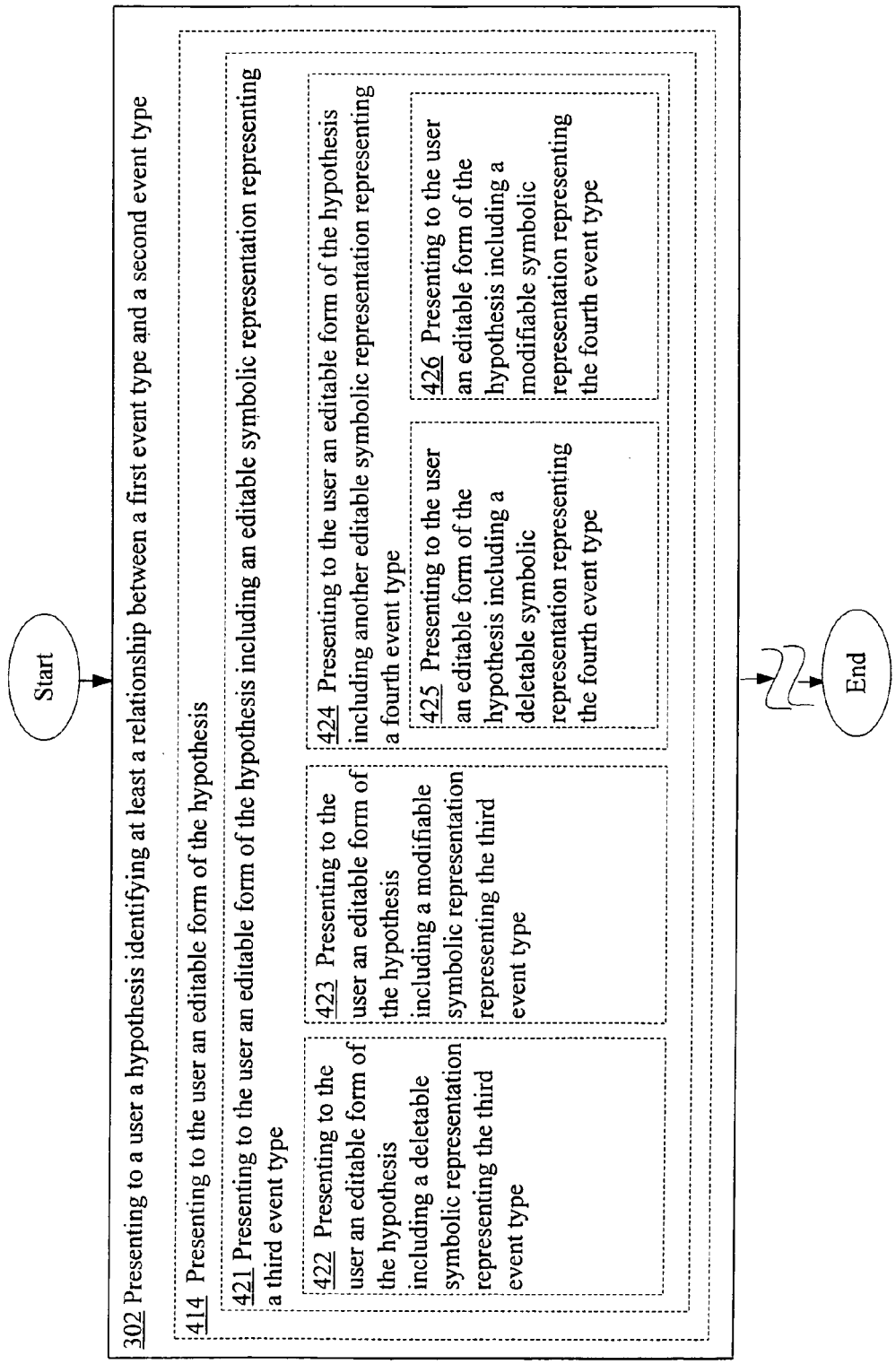
FIG. 4d is a high-level logic flowchart of a process depicting alternate implementations of the hypothesis presentation operation 302 of FIG. 3.

In some implementations, operation 414 of FIG. 4c for presenting an editable form of the hypothesis may include an operation 421 for presenting to the user an editable form of the hypothesis including an editable symbolic representation representing a third event type as depicted in FIG. 4d. For instance, the editable hypothesis presentation module 212* of the mobile device 30 or the computing device 10 presenting (e.g., audioally or visually indicating or transmitting) to the user 20* an editable form of the hypothesis 60 including an editable (e.g., deletable and/or modifiable) symbolic representation (e.g., audio or visual representation) representing a third event type (e.g., a subjective user state, an objective occurrence, or a subjective observation).

As further depicted in FIG. 4d, operation 421 may further include, in various implementations, an operation 422 for presenting to the user an editable form of the hypothesis including a deletable symbolic representation representing the third event type. For instance, the editable hypothesis presentation module 212* of the mobile device 30 or the computing device 10 presenting (e.g., audioally or visually indicating or transmitting) to the user 20* an editable form of the hypothesis 60 including a deletable symbolic representation representing the third event type.

In the same or different implementations, operation 421 may include an operation 423 for presenting to the user an editable form of the hypothesis including a modifiable symbolic representation representing the third event type as depicted in FIG. 4d. For instance, the editable hypothesis presentation module 212* of the mobile device 30 or the computing device 10 presenting (e.g., audioally or visually indicating or transmitting) to the user 20* an editable form of the hypothesis 60 a modifiable symbolic representation representing the third event type.

In the same or different implementations, operation 421 may include an operation 424 for presenting to the user an editable form of the hypothesis including another editable symbolic representation representing a fourth event type as depicted in FIG. 4d. For instance, the editable hypothesis presentation module 212* of the mobile device 30 or the computing device 10 presenting (e.g., audioally or visually indicating or transmitting) to the user 20* an editable form of the hypothesis 60 including another editable symbolic representation (e.g., audio or visual representation) representing a fourth event type.

In various implementations, operation 424 may further include an operation 425 for presenting to the user an editable form of the hypothesis including a deletable symbolic representation representing the fourth event type as depicted in FIG. 4d. For instance, the editable hypothesis presentation module 212* of the mobile device 30 or the computing device 10 presenting (e.g., audioally or visually indicating or transmitting) to the user 20* an editable form of the hypothesis 60 including a deletable (e.g. erasable) symbolic representation representing the fourth event type.

In the same or different implementations, operation 424 may include an operation 426 for presenting to the user an editable form of the hypothesis including a modifiable symbolic representation representing the fourth event type as depicted in FIG. 4d. For instance, the editable hypothesis presentation module 212* of the mobile device 30 or the computing device 10 presenting (e.g., audioally or visually indicating or transmitting) to the user 20* an editable form of the hypothesis 60 including a modifiable symbolic representation representing the fourth event type (e.g., a subjective user state, an objective occurrence, or a subjective observation).

Figure 4E:
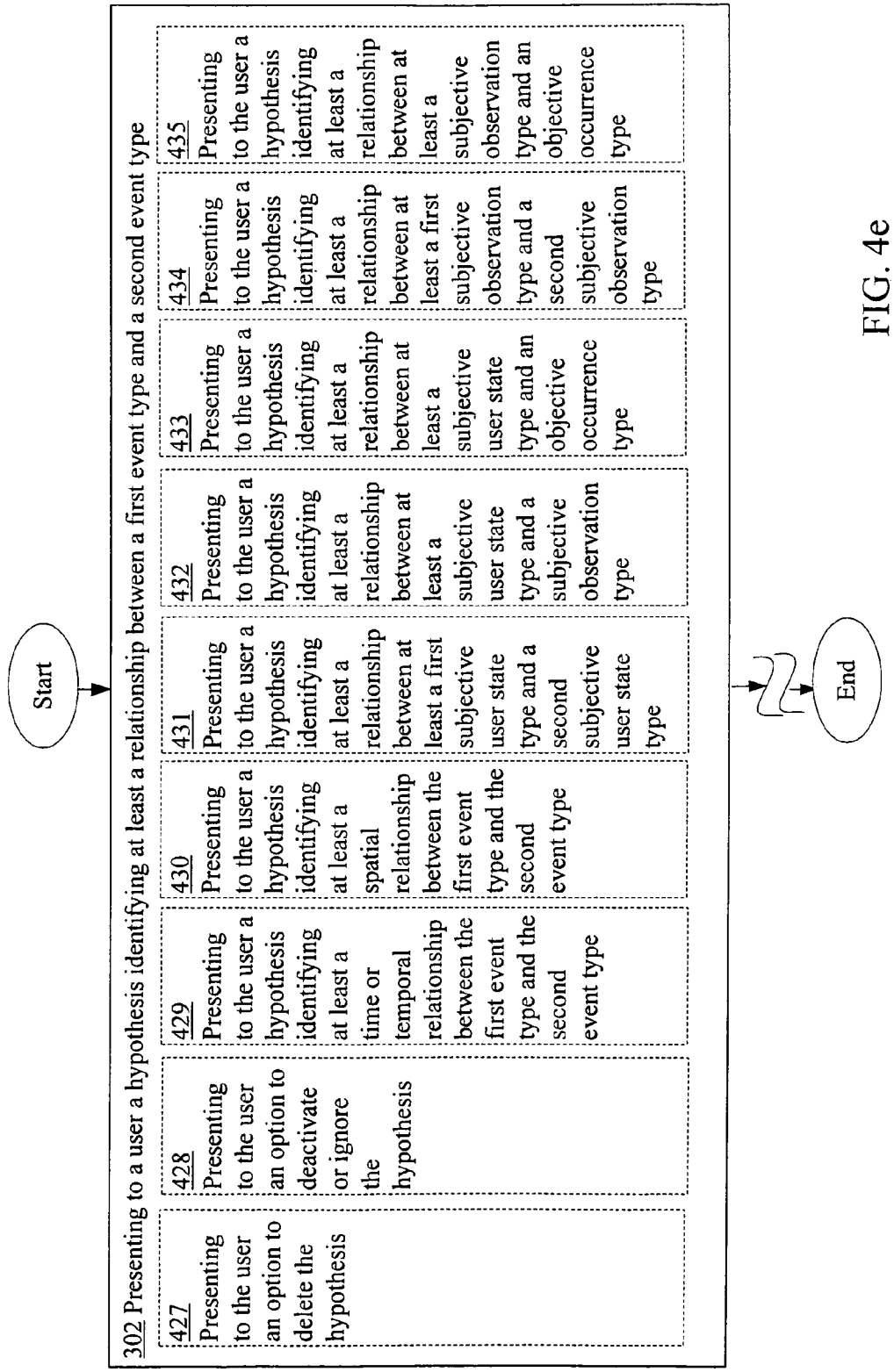
FIG. 4e is a high-level logic flowchart of a process depicting alternate implementations of the hypothesis presentation operation 302 of FIG. 3.

Referring back to the hypothesis presentation operation 302 of FIG. 3, in various implementations, the hypothesis presentation operation 302 may provide for one or more options. For example, in some implementations, the hypothesis presentation operation 302 may include an operation 427 for presenting to the user an option to delete the hypothesis as depicted in FIG. 4e. For instance, the hypothesis deletion option presentation module 214* of the mobile device 30 or the computing device 10 presenting to the user 20* an option to delete the hypothesis 60. Such an option may allow a user 20* to delete a hypothesis 60* that the user 20*, for example, feels is irrelevant or wish to ignore.

In the same or different implementations, the hypothesis presentation operation 302 may include an operation 428 for presenting to the user an option to deactivate or ignore the hypothesis as depicted in FIG. 4e. For instance, the hypothesis deactivation option presentation module 216* of the mobile device 30 or the computing device 10 presenting to the user 20* an option to deactivate or ignore the hypothesis 60. By deactivating the hypothesis 60, the action execution module 108* of the mobile device 30 or the computing device 10 may be prevented from executing one or more actions based on the hypothesis 60 (e.g., or a modified version of the hypothesis 60).

Various types of relationships between various types of events may be indicated by the hypothesis 60 presented in the hypothesis presentation operation 302 of FIG. 3. For example, in some implementations, the hypothesis presentation operation 302 may include an operation 429 for presenting to the user a hypothesis identifying at least a time or temporal relationship between the first event type and the second event type as depicted in FIG. 4e. For instance, the hypothesis presentation module 102* of the mobile device 10 or the computing device 10 presenting (e.g., audioally or visually indicating via a user interface 122* or transmitting via wireless and/or wired network 40) to the user 20* a hypothesis 60 identifying at least a time or temporal relationship between the first event type and the second event type. For example, presenting to the user 20* a hypothesis 60 in textual form that indicates that "whenever the user's friend borrows the car, the car always appears to run worse afterwards." In this example, "the user's friend borrows the car" represents the first event type, "the car always appears to run worse" represents the second event type, and the "afterwards" represents the temporal relationship between the first event type and the second event type.

In some implementations, the hypothesis presentation operation 302 may include an operation 430 for presenting to the user a hypothesis identifying at least a spatial relationship between the first event type and the second event type as depicted in FIG. 4e. For instance, the hypothesis presentation module 102* of the mobile device 30 or the computing device 10 presenting (e.g., audioally or visually indicating via a user interface 122* or transmitting via wireless and/or wired network 40) to the user 20* a hypothesis 60 identifying at least a spatial relationship between the first event type and the second event type. For example, presenting to the user 20* a hypothesis 60 in audio form that indicates that "whenever the spouse is working in another city, and the user is at home, the user is happy." In this example, "the spouse is working" may represent the first event type, "the user is happy" may represent the second event type, and the spouse working in another city and the "user is at home" may represent the spatial relationship between the first event type and the second event type.

In some implementations, the hypothesis presentation operation 302 may include an operation 431 for presenting to the user a hypothesis identifying at least a relationship between at least a first subjective user state type and a second subjective user state type as depicted in FIG. 4e. For instance, the hypothesis presentation module 102* of the mobile device 30 or the computing device 10 presenting (e.g., audioally or visually indicating via a user interface 122* or transmitting via wireless and/or wired network 40) to the user 20* a hypothesis 60 identifying at least a relationship between at least a first subjective user state type (e.g., anger) and a second subjective user state type (e.g., sore or stiff back).

In some implementations, the hypothesis presentation operation 302 may include an operation 432 for presenting to the user a hypothesis identifying at least a relationship between at least a subjective user state type and a subjective observation type as depicted in FIG. 4e. For instance, the hypothesis presentation module 102* of the mobile device 30 or the computing device 10 presenting (e.g., audioally or visually indicating via a user interface 122* or transmitting via wireless and/or wired network 40) to the user 20* a hypothesis 60 identifying at least a relationship between at least a subjective user state type (e.g., tension) and a subjective observation type (e.g., boss appears to be angry).

In some implementations, the hypothesis presentation operation 302 may include an operation 433 for presenting to the user a hypothesis identifying at least a relationship between at least a subjective user state type and an objective occurrence type as depicted in FIG. 4e. For instance, the hypothesis presentation module 102* of the mobile device 30 or the computing device 10 presenting (e.g., audioally or visually indicating via a user interface 122* or transmitting via wireless and/or wired network 40) to the user 20* a hypothesis 60 identifying at least a relationship between at least a subjective user state type (e.g., fatigue) and an objective occurrence type (e.g., alcoholic consumption).

In some implementations, the hypothesis presentation operation 302 may include an operation 434 for presenting to the user a hypothesis identifying at least a relationship between at least a first subjective observation type and a second subjective observation type as depicted in FIG. 4e. For instance, the hypothesis presentation module 102* of the mobile device 30 or the computing device 10 presenting (e.g., audioally or visually indicating via a user interface 122* or transmitting via wireless and/or wired network 40) to the user 20* a hypothesis 60 identifying at least a relationship between at least a first subjective observation type (e.g., pet dog appears to be depressed) and a second subjective observation type (e.g., spouse appears to be depressed).

In some implementations, the hypothesis presentation operation 302 may include an operation 435 for presenting to the user a hypothesis identifying at least a relationship between at least a subjective observation type and an objective occurrence type as depicted in FIG. 4e. For instance, the hypothesis presentation module 102* of the mobile device 30 or the computing device 10 presenting (e.g., audioally or visually indicating via a user interface 122* or transmitting via wireless and/or wired network 40) to the user 20* a hypothesis 60 identifying at least a relationship between at least a subjective observation type (e.g., sore ankles) and an objective occurrence type (e.g., jogging).

Figure 4F:
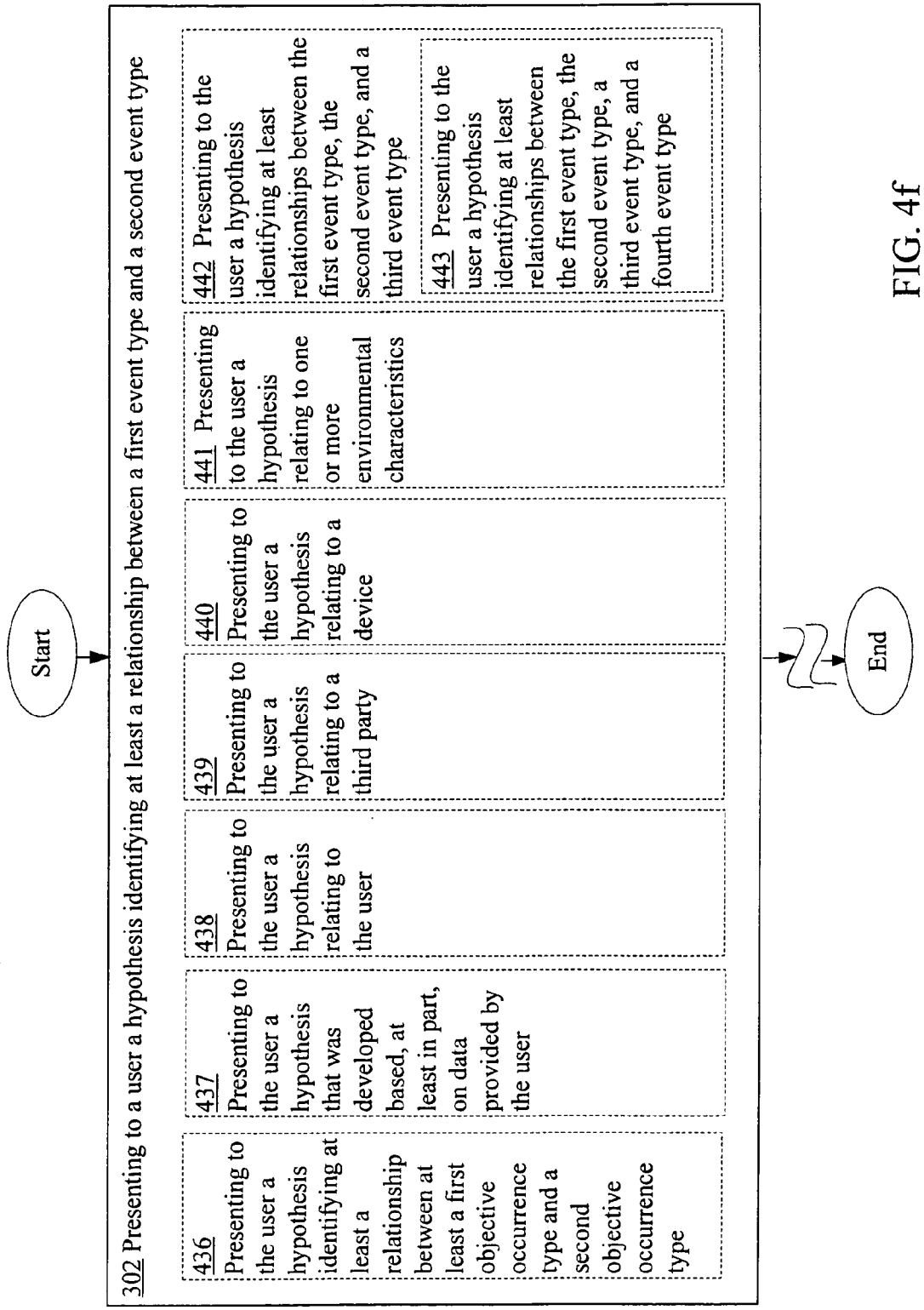
FIG. 4f is a high-level logic flowchart of a process depicting alternate implementations of the hypothesis presentation operation 302 of FIG. 3.

In some implementations, the hypothesis presentation operation 302 may include an operation 436 for presenting to the user a hypothesis identifying at least a relationship between at least a first objective occurrence type and a second objective occurrence type as depicted in FIG. 4f. For instance, the hypothesis presentation module 102* of the mobile device 30 or the computing device 10 presenting (e.g., audioally or visually indicating via a user interface 122* or transmitting via wireless and/or wired network 40) a hypothesis 60 identifying at least a relationship between at least a first objective occurrence type (e.g., elevated blood glucose level) and a second objective occurrence type (e.g., consumption of a particular type of food).

In various implementations, the hypothesis to be presented through the hypothesis presentation operation 302 of FIG. 3 may have been developed based on data (e.g., events data that indicate previously reported events) provided by a user 20*. For example, in some implementations, the hypothesis presentation operation 302 may include an operation 437 for presenting to the user a hypothesis that was developed based, at least in part, on data provided by the user as depicted in FIG. 4f. For instance, the hypothesis presentation module 102* of the mobile device 30 or the computing device 10 presenting (e.g., audioally or visually indicating via a user interface 122* or transmitting via wireless and/or wired network 40) to the user 20* a hypothesis 60 that was developed based, at least in part, on data provided by the user 20*. As a further illustration, a hypothesis 60* may be developed by, for example, the reported event reception module 110 of the computing device 10 receiving data that indicates reported events reported by the user 20*. Based on this data, and based at least in part on a pattern of reported events (e.g., spatial or temporal/time pattern of reported events) or reoccurring pattern of reported events identified by the hypothesis development module 112, the hypothesis development module 112 may develop a hypothesis 60.

The hypothesis to be presented through the hypothesis presentation operation 302 of FIG. 3 may be directed to various subjects in various alternative implementations. For example, in some implementations, the hypothesis presentation module 302 may include an operation 438 for presenting to the user a hypothesis relating to the user as depicted in FIG. 4f. For instance, the hypothesis presentation module 102* of the mobile device 30 or the computing device 10 presenting (e.g., audioally or visually indicating or transmitting) to the user 20* a hypothesis 60 relating to the user 20*. For example, presenting to the user 20* a hypothesis 60 that indicates a relationship between a subjective user state of the user 20* with consumption of a particular food item by the user 20*.

In some implementations, the hypothesis presentation operation 302 may include an operation 439 for presenting to the user a hypothesis relating to a third party as depicted in FIG. 4f. For instance, the hypothesis presentation module 102* of the mobile device 30 or the computing device 10 presenting (e.g., audioally or visually indicating or transmitting) to the user 20* a hypothesis 60 relating to a third party. For example, presenting to the user 20* a hypothesis 60 that indicates a relationship between a subjective user state of a third party (e.g., a pet such as a dog, livestock, a spouse, a friend, and so forth) with consumption of a particular food item by the third party.

In some implementations, the hypothesis presentation operation 302 may include an operation 440 for presenting to the user a hypothesis relating to a device as depicted in FIG. 4f. For instance, the hypothesis presentation module 102* of the mobile device 30 or the computing device 10 presenting (e.g., audioally or visually indicating or transmitting) to the user 20* a hypothesis 60 relating to a device. For example, presenting to the user 20* a hypothesis 60 that indicates a relationship between the use of a personal computer by an offspring and the prevalence of computer viruses in the personal computer afterwards.

In some implementations, the hypothesis presentation operation 302 may include an operation 441 for presenting to the user a hypothesis relating to one or more environmental characteristics as depicted in FIG. 4f. For instance, the hypothesis presentation module 102* of the mobile device 30 or the computing device 10 presenting (e.g., audioally or visually indicating or transmitting) to the user 20* a hypothesis 60 relating to one or more environmental characteristics. For example, presenting to the user 20* a hypothesis 60 that indicates a relationship between the local atmospheric pollution level (e.g., as sensed by pollution monitoring devices including those that measure gas and/or particulate levels in the atmosphere) and when a particular factory is in operation.

In various embodiments, the hypothesis 60 to be presented through the hypothesis presentation operation 302 of FIG. 3 may be directed or related to three or more event types (e.g., types of events). For example, in some implementations, the hypothesis presentation operation 302 may include an operation 442 for presenting to the user a hypothesis identifying at least relationships between the first event type, the second event type, and a third event type as depicted in FIG. 4f. For instance, the hypothesis presentation module 102* of the mobile device 30 or the computing device 10 presenting (e.g., audioally or visually indicating or transmitting) to the user 20* a hypothesis 60 identifying at least relationships between the first event type, the second event type, and a third event type. For example, presenting a hypothesis 60 that identifies temporal relationships between eating ice cream, drinking coffee, and having a stomach ache.

In various implementations, operation 442 may further include an operation 443 for presenting to the user a hypothesis identifying at least relationships between the first event type, the second event type, the third event type, and a fourth event type as depicted in FIG. 4f. For instance, the hypothesis presentation module 102* of the mobile device 30 or the computing device 10 presenting (e.g., audioally or visually indicating or transmitting) to the user 20* a hypothesis 60 identifying at least relationships between the first event type, the second event type, the third event type, and a fourth event type. For example, presenting a hypothesis 60 that identifies temporal relationships between eating ice cream (e.g., first event type), drinking coffee (e.g., second event type), waking-up late (e.g., third event type), and having a stomach ache (e.g., fourth event type). Note that in this illustration, the user 20* after being presented with the hypothesis 60 may determine that the third event type, waking-up late, may not be relevant with respect to the hypothesis 60 (e.g., things that may be linked to a stomach ache). As a result, the user 20*, as will be further described below, may delete the third event type from the hypothesis 60.

Figure 5A:
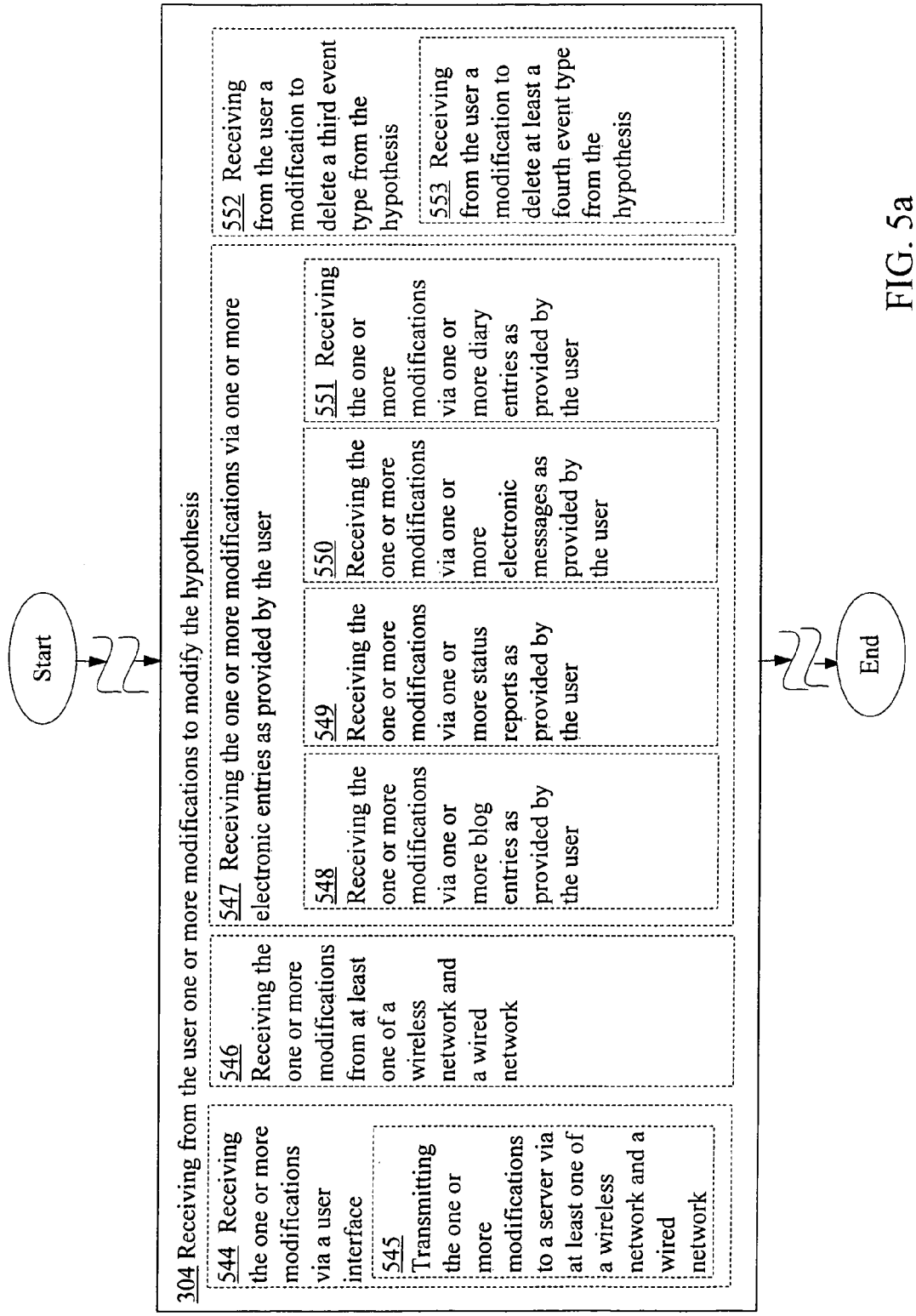
FIG. 5a is a high-level logic flowchart of a process depicting alternate implementations of the modification reception operation 304 of FIG. 3.

Referring back to the modification reception operation 304 of FIG. 3, the one or more modifications received through the modification reception operation 304 may be received in a variety of different ways. For example, in various implementations, the modification reception operation 304 may include an operation 544 for receiving the one or more modifications via a user interface as depicted in FIG. 5a. For instance, the user interface reception module 218* of the mobile device 30 or the computing device 10 (e.g., in embodiments in which the computing device 10 is a standalone device) receiving the one or more modifications 61 via a user interface 122* (e.g., a microphone, a touch screen, a keypad, a mouse, and so forth).

In some implementations, operation 544 may further include an operation 545 for transmitting the one or more modifications to a server via at least one of a wireless network and a wired network as depicted in FIG. 5a. For instance, the modification transmission module 219 of the mobile device 30 transmitting (e.g., via a wireless and/or wired network 40) the one or more modifications 61 to a server (e.g., computing device 10 in embodiments in which the computing device 10 is a server) via at least one of a wireless network and a wired network (e.g., via a wireless and/or wired network 40).

In some implementations, the modification reception operation 304 may include an operation 546 for receiving the one or more modifications from at least one of a wireless network and a wired network as depicted in FIG. 5a. For instance, the network reception module 220 of the computing device 10 (e.g., in embodiments where the computing device 10 is a server) receiving the one or more modifications 61 (e.g., as provided by the mobile device 30) from at least one of a wireless network and a wired network 40 (e.g., a wireless and/or wired network 40).

The one or more modifications received through the modification reception operation 304 of FIG. 3 may be received in a variety of different forms. For example, in some implementations, the modification reception operation 304 may include an operation 547 for receiving the one or more modifications via one or more electronic entries as provided by the user as depicted in FIG. 5a. For instance, the electronic entry reception module 222* of the mobile device 30 or the computing device 10 receiving (e.g., receiving directly via a user interface 122* or indirectly via a wireless and/or wired network 40) the one or more modifications 61 via one or more electronic entries as provided by the user 20*.

In some implementations, operation 547 may include an operation 548 for receiving the one or more modifications via one or more blog entries as provided by the user as depicted in FIG. 5a. For instance, the blog entry reception module 224* of the mobile device 30 or the computing device 10 receiving (e.g., receiving directly via a user interface 122* or indirectly via a wireless and/or wired network 40) the one or more modifications 61 via one or more blog entries (e.g., microblog entries) as provided by the user 20*.

In some implementations, operation 547 may include an operation 549 for receiving the one or more modifications via one or more status reports as provided by the user as depicted in FIG. 5a. For instance, the status report reception module 226* of the mobile device 30 or the computing device 10 receiving (e.g., receiving directly via a user interface 122* or indirectly via a wireless and/or wired network 40) the one or more modifications 61 via one or more (social networking) status reports as provided by the user 20*.

In some implementations, operation 547 may include an operation 550 for receiving the one or more modifications via one or more electronic messages as provided by the user as depicted in FIG. 5a. For instance, the electronic message reception module 228* of the mobile device 30 or the computing device 10 receiving (e.g., receiving directly via a user interface 122* or indirectly via a wireless and/or wired network 40) the one or more modifications 61 via one or more electronic messages (e.g., emails, text messages, IM messages, and so forth) as provided by the user 20*.

In some implementations, operation 547 may include an operation 551 for receiving the one or more modifications via one or more diary entries as provided by the user as depicted in FIG. 5a. For instance, the diary entry reception module 230* of the mobile device 30 or the computing device 10 receiving (e.g., receiving directly via a user interface 122* or indirectly via a wireless and/or wired network 40) the one or more modifications 61 via one or more diary entries as provided by the user 20*.

Various types of modifications may be received through the modification reception operation 304 of FIG. 3 in various alternative implementations. For example, in some implementations, the modification reception operation 304 may include an operation 552 for receiving from the user a modification to delete a third event type from the hypothesis as depicted in FIG. 5a. For instance, the modification reception module 104* of the mobile device 30 or the computing device 10 receiving from the user 20* a modification 61 to delete a third event type from the hypothesis 60.

In certain implementations, operation 552 may further include an operation 553 for receiving from the user a modification to delete at least a fourth event type from the hypothesis as depicted in FIG. 5a. For instance, the modification reception module 104* of the mobile device 30 or the computing device 10 receiving from the user 20* a modification 61 to delete at least a fourth event type from the hypothesis 60.

Figure 5B:
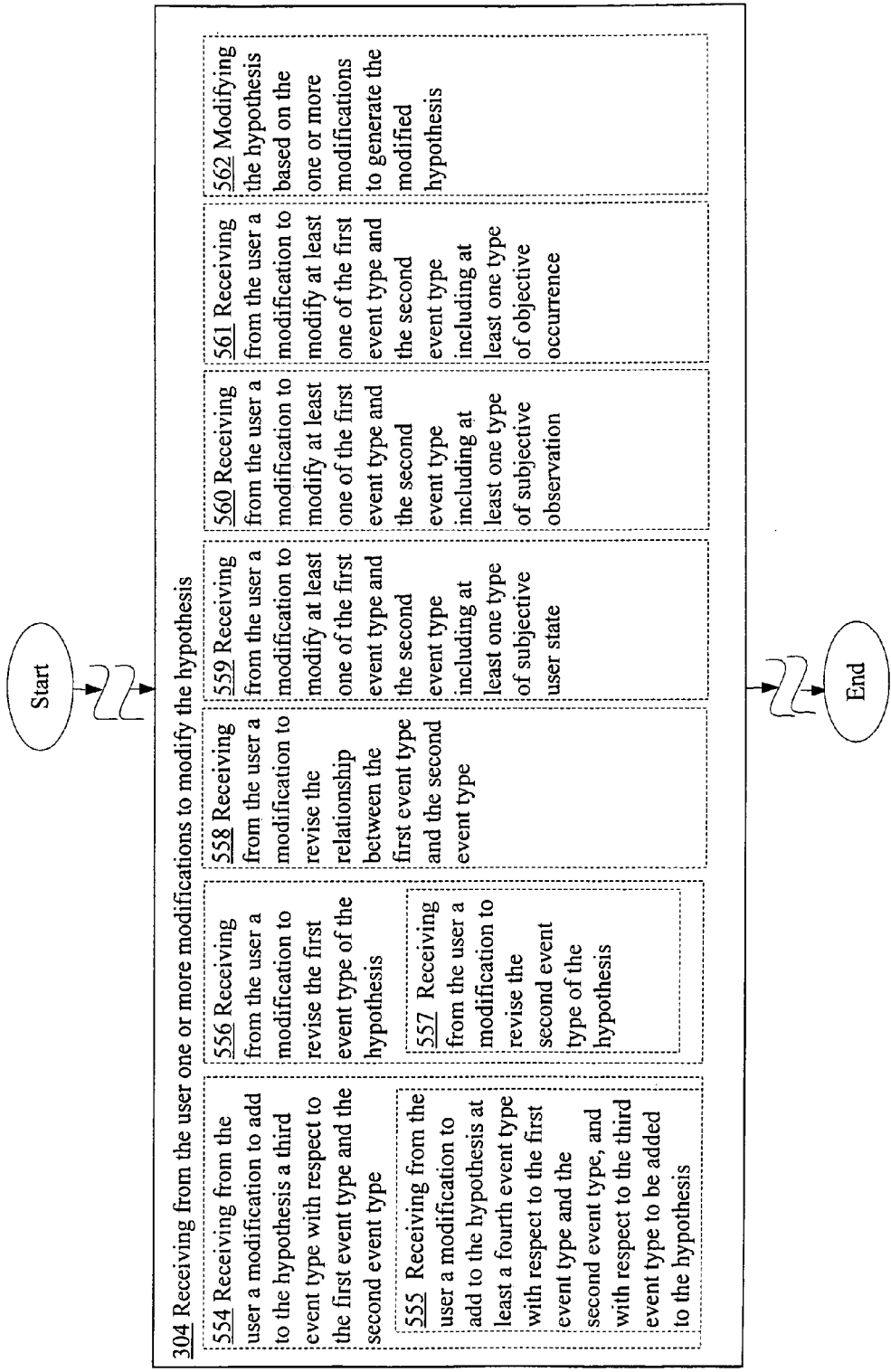
FIG. 5b is a high-level logic flowchart of a process depicting alternate implementations of the modification reception operation 304 of FIG. 3.

In various implementations, the modification reception operation 304 of FIG. 3 may include an operation 554 for receiving from the user a modification to add to the hypothesis a third event type with respect to the first event type and the second event type as depicted in FIG. 5b. For instance, the modification reception module 104* of the mobile device 30 or the computing device 10 receiving from the user 20* a modification 61 to add to the hypothesis 60 a third event type with respect to the first event type and the second event type. In other words, a modification to add to the hypothesis 60 a third event type and its spatial or time occurrence relative to the occurrences of the first event type and the second event type as indicated by the hypothesis 60.

In some implementations, operation 554 may further include an operation 555 for receiving from the user a modification to add to the hypothesis at least a fourth event type with respect to the first event type and the second event type, and with respect to the third event type to be added to the hypothesis as depicted in FIG. 5b. For instance, the modification reception module 104* of the mobile device 30 or the computing device 10 receiving from the user 20* a modification 61 to add to the hypothesis 60 at least a fourth event type with respect to the first event type and the second event type, and with respect to the third event type to be added to the hypothesis 60.

In various implementations, the modification reception operation 304 of FIG. 3 may include an operation 556 for receiving from the user a modification to revise the first event type of the hypothesis as depicted in FIG. 5b. For instance, the modification reception module 104* of the mobile device 30 or the computing device 10 receiving from the user 20* a modification 61 to revise the first event type of the hypothesis 60*(e.g., revising a subjective user state such as "anger" to another subjective user state such as "disappointment").

In some implementations, operation 556 may further include an operation 557 for receiving from the user a modification to revise the second event type of the hypothesis as depicted in FIG. 5b. For instance, the modification reception module 104* of the mobile device 30 or the computing device 10 receiving from the user 20* a modification to revise the second event type of the hypothesis 60 (e.g., an objective occurrence such as a co-worker not coming to work to another objective occurrence such as a co-worker coming to work late).

In some implementations, the modification reception operation 304 of FIG. 3 may include an operation 558 for receiving from the user a modification to revise the relationship between the first event type and the second event type as depicted in FIG. 5b. For instance, the modification reception module 104* of the mobile device 30 or the computing device 10 receiving from the user 20* a modification 61 to revise the relationship between the first event type and the second event type (e.g., changing the temporal relationship between the first event type and the second event type as indicated by the hypothesis 60).

In some implementations, the modification reception operation 304 may include an operation 559 for receiving from the user a modification to modify at least one of the first event type and the second event type including at least one type of subjective user state as depicted in FIG. 5b. For instance, the modification reception module 104* of the mobile device 30 or the computing device 10 receiving from the user 20* a modification 61 to modify at least one of the first event type and the second event type including at least one type of subjective user state (e.g., a subjective user state, a subjective physical state, or a subjective overall state).

In some implementations, the modification reception operation 304 may include an operation 560 for receiving from the user a modification to modify at least one of the first event type and the second event type including at least one type of subjective observation as depicted in FIG. 5b. For instance, the modification reception module 104* of the mobile device 30 or the computing device 10 receiving from the user 20* a modification 61 to modify at least one of the first event type and the second event type including at least one type of subjective observation (e.g., perceived subjective user state of a third party, a subjective observation or opinion regarding an external activity, a user's activity, or a third party's activity, a subjective observation or opinion regarding performance or characteristic of a device, and so forth).

In some implementations, the modification reception operation 304 may include an operation 561 for receiving from the user a modification to modify at least one of the first event type and the second event type including at least one type of objective occurrence as depicted in FIG. 5b. For instance, the modification reception module 104* of the mobile device 30 or the computing device 10 receiving from the user 20* a modification 61 to modify at least one of the first event type and the second event type including at least one type of objective occurrence (e.g., consumption of a food item, medicine, or nutraceutical by the user 20* or by a third party 50, an activity executed by the user 20* or by a third party 50, an external activity, an objectively measureable physical characteristic of the user 20* or of a third party 50, and so forth).

In some implementations, the modification reception operation 304 may include an operation 562 for modifying the hypothesis based on the one or more modifications to generate the modified hypothesis as depicted in FIG. 5b. For instance, the hypothesis modification module 106 of the computing device 10 modifying the hypothesis 60 based on the one or more modifications 61 (e.g., as received by the modification reception module 104 of the computing device 10) to generate the modified hypothesis 80.

Figure 6A:
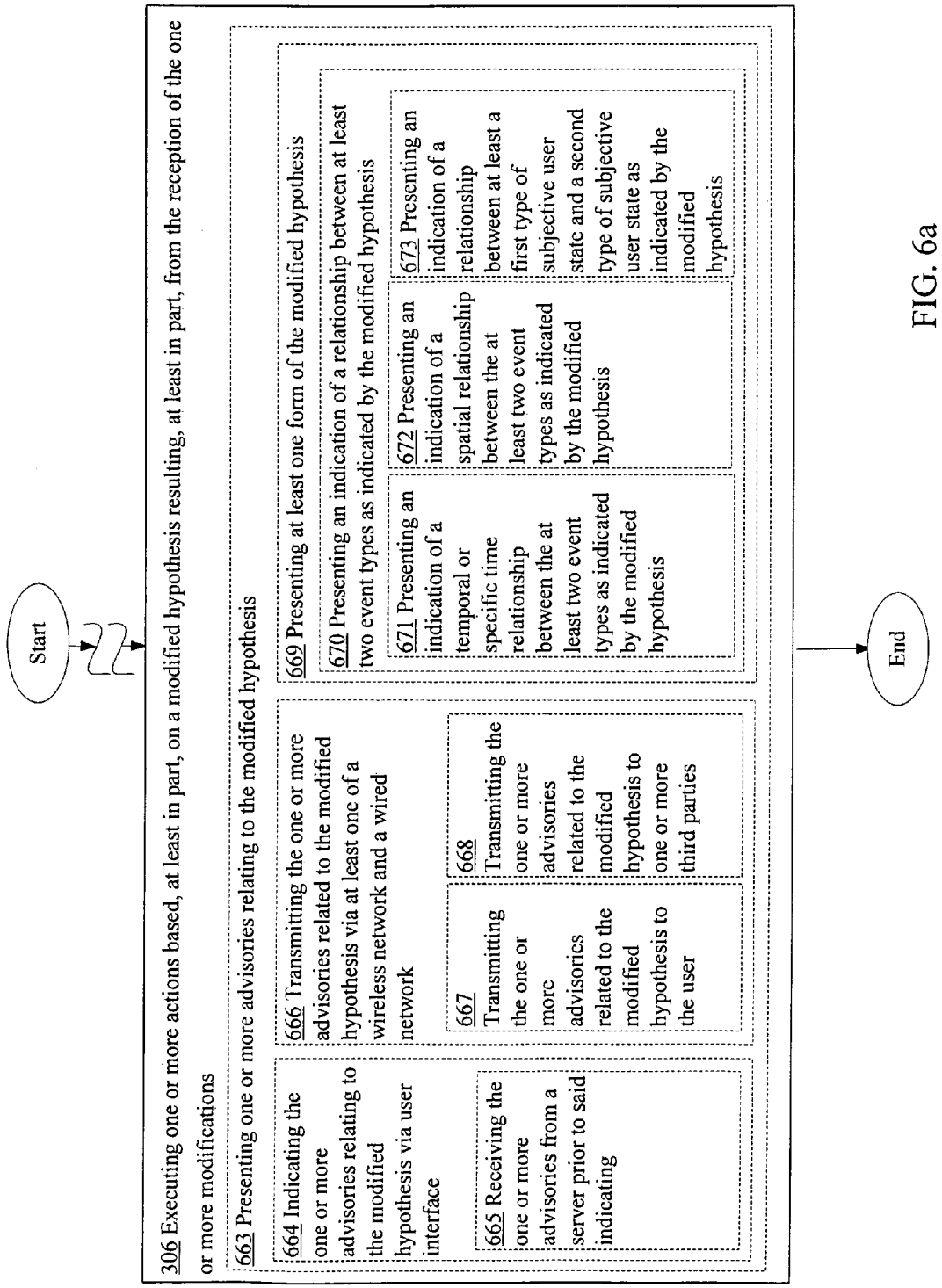
FIG. 6a is a high-level logic flowchart of a process depicting alternate implementations of the action execution operation 306 of FIG. 3.

Referring back to the action execution operation 306 of FIG. 3, various types of actions may be executed in action execution operation 306 in various alternative implementations. For example, in some implementations, the action execution operation 306 may include an operation 663 for presenting one or more advisories relating to the modified hypothesis as depicted in FIG. 6a. For instance, the advisory presentation module 232* of the mobile device 30 or the computing device 10 presenting (e.g., indicating via a user interface 122* or transmitting via a wireless and/or wired network 40) one or more advisories 90 relating to the modified hypothesis 80.

Various types of advisories may be presented through operation 663. For example, in some implementations, operation 663 may include an operation 664 for indicating the one or more advisories relating to the modified hypothesis via user interface as depicted in FIG. 6a. For instance, the user interface indication module 234* of the mobile device 30 or the computing device 10 indicating (e.g., audioally indicating and/or visually displaying) the one or more advisories 90 relating to the modified hypothesis 80 via user interface 122* (e.g., an audio system including one or more speakers and/or a display system including a display monitor or touch screen).

In some selective implementations, operation 664 may include an operation 665 for receiving the one or more advisories from a server prior to said indicating as depicted in FIG. 6a. For instance, the advisory reception module 235 of the mobile device 30 receiving the one or more advisories 90 from a server (e.g., the computing device 10 in embodiments where the computing device 10 is a network server) prior to said indicating of the one or more advisories 90.

In the same or different implementations, operation 663 may include an operation 666 for transmitting the one or more advisories related to the modified hypothesis via at least one of a wireless network and a wired network as depicted in FIG. 6a. For instance, the network transmission module 236* of the mobile device 30 or the computing device 10 transmitting the one or more advisories 90 related to the modified hypothesis 80 via at least one of a wireless network and a wired network 40. Note that, in addition to or instead of presenting the one or more advisories 90 to the user 20*, the one or more advisories 90 may be transmitted by the mobile device 30 or the computing device 10 to, for example, one or more third parties 50.

In various implementations, operation 666 may further include an operation 667 for transmitting the one or more advisories related to the modified hypothesis to the user as depicted in FIG. 6a. For instance, the network transmission module 236 of the computing device 10 (e.g., in embodiments in which the computing device 10 is a server) transmitting the one or more advisories 90 related to the modified hypothesis 80 to the user 20a.

In some implementations, operation 666 may include an operation 668 for transmitting the one or more advisories related to the modified hypothesis to one or more third parties as depicted in FIG. 6a. For instance, the network transmission module 236* of the mobile device 30 or the computing device 10 transmitting the one or more advisories 90 related to the modified hypothesis 80 to one or more third parties 50.

In various implementations, the modified hypothesis 80 may be presented through operation 663. For example, in some implementations, operation 663 may include an operation 669 for presenting at least one form of the modified hypothesis as depicted in FIG. 6a. For instance, the modified hypothesis presentation module 238* of the mobile device 30 or the computing device 10 presenting at least one form (e.g., audio form and/or visual form such as textual, graphical, or pictorial form) of the modified hypothesis 80.

Operation 669, in turn, may include an operation 670 for presenting an indication of a relationship between at least two event types as indicated by the modified hypothesis as depicted in FIG. 6a. For instance, the modified hypothesis presentation module 238* of the mobile device 30 or the computing device 10 presenting (e.g., indicating via a user interface 122 or transmitting via wireless and/or wired network 40) an indication of a relationship (e.g., spatial or temporal/specific time relationship) between at least two event types as indicated by the modified hypothesis 80.

In some implementations, operation 670 may include an operation 671 for presenting an indication of a temporal or specific time relationship between the at least two event types as indicated by the modified hypothesis as depicted in FIG. 6a. For instance, the modified hypothesis presentation module 238* of the mobile device 30 or the computing device 10 presenting an indication of a temporal or specific time relationship between the at least two event types as indicated by the modified hypothesis 80.

In the same or alternative implementations, operation 670 may include an operation 672 for presenting an indication of a spatial relationship between the at least two event types as indicated by the modified hypothesis as depicted in FIG. 6a. For instance, the modified hypothesis presentation module 238* of the mobile device 30 or the computing device 10 presenting an indication of a spatial relationship between the at least two event types as indicated by the modified hypothesis 80.

In the same or different implementations, operation 670 may include an operation 673 for presenting an indication of a relationship between at least a first type of subjective user state and a second type of subjective user state as indicated by the modified hypothesis as depicted in FIG. 6a. For instance, the modified hypothesis presentation module 238* of the mobile device 30 or the computing device 10 presenting an indication of a relationship between at least a first type of subjective user state (e.g., jealousy) and a second type of subjective user state (e.g., depression) as indicated by the modified hypothesis 80.

Figure 6B:
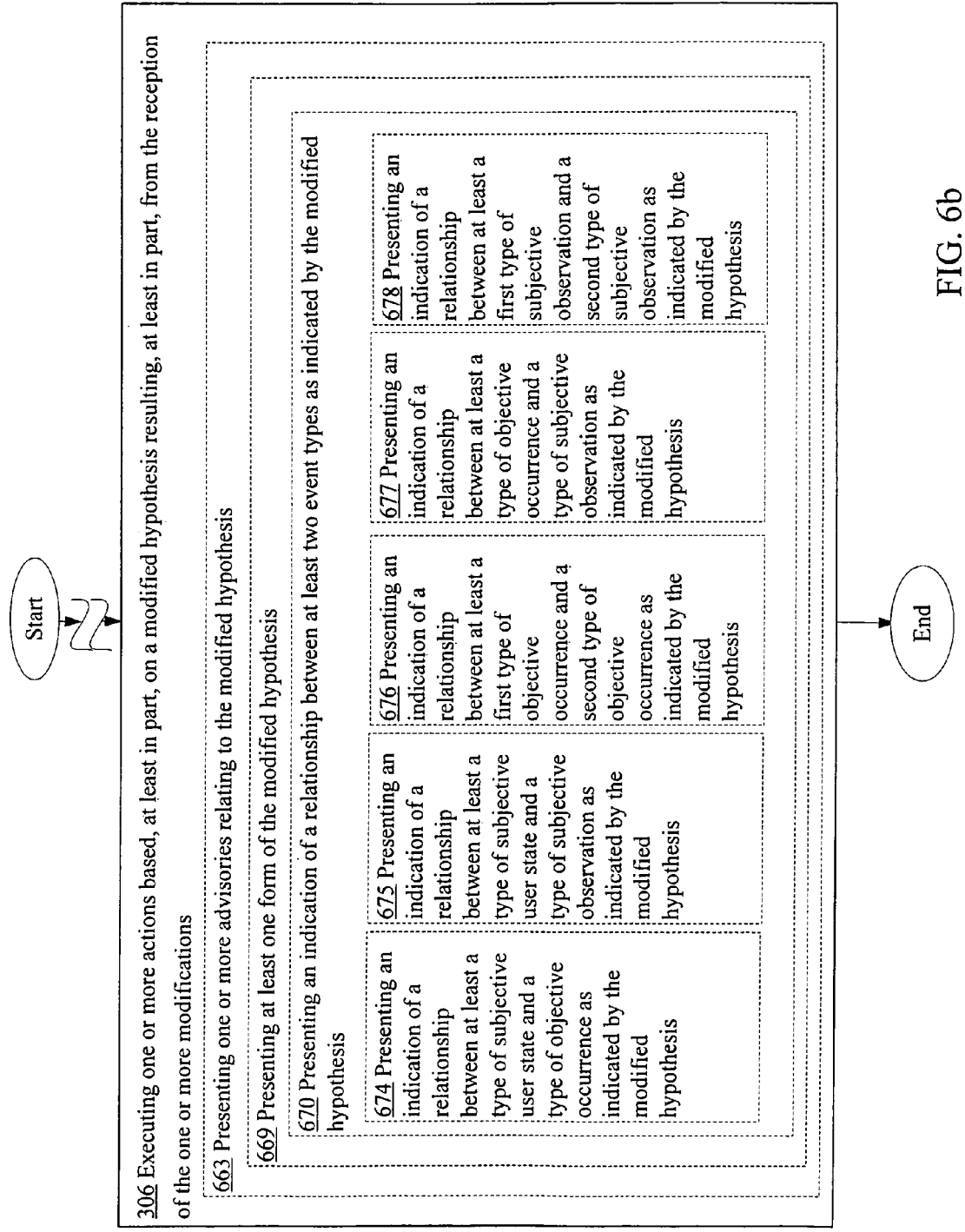
FIG. 6b is a high-level logic flowchart of a process depicting alternate implementations of the action execution operation 306 of FIG. 3.

In the same or different implementations, operation 670 may include an operation 674 for presenting an indication of a relationship between at least a type of subjective user state and a type of objective occurrence as indicated by the modified hypothesis as depicted in FIG. 6b. For instance, the modified hypothesis presentation module 238* of the mobile device 30 or the computing device 10 presenting an indication of a relationship between at least a type of subjective user state (e.g., subjective overall state such as "great") and a type of objective occurrence (e.g., fishing) as indicated by the modified hypothesis 80.

In the same or different implementations, operation 670 may include an operation 675 for presenting an indication of a relationship between at least a type of subjective user state and a type of subjective observation as indicated by the modified hypothesis as depicted in FIG. 6b. For instance, the modified hypothesis presentation module 238* of the mobile device 30 or the computing device 10 presenting an indication of a relationship between at least a type of subjective user state (e.g., fear) and a type of subjective observation (e.g., spouse perceived to be angry) as indicated by the modified hypothesis 80.

In the same or different implementations, operation 670 may include an operation 676 for presenting an indication of a relationship between at least a first type of objective occurrence and a second type of objective occurrence as indicated by the modified hypothesis as depicted in FIG. 6b. For instance, the modified hypothesis presentation module 238* of the mobile device 30 or the computing device 10 presenting an indication of a relationship between at least a first type of objective occurrence (e.g., off-spring parents' car) and a second type of objective occurrence (e.g., low fuel level in the car) as indicated by the modified hypothesis 80.

In the same or different implementations, operation 670 may include an operation 677 for presenting an indication of a relationship between at least a type of objective occurrence and a type of subjective observation as indicated by the modified hypothesis as depicted in FIG. 6b. For instance, the modified hypothesis presentation module 238* of the mobile device 30 or the computing device 10 presenting an indication of a relationship between at least a type of objective occurrence (e.g., staying home on wedding anniversary) and a type of subjective observation (e.g., spouse appears to be in bad mood) as indicated by the modified hypothesis 80.

In the same or different implementations, operation 670 may include an operation 678 for presenting an indication of a relationship between at least a first type of subjective observation and a second type of subjective observation as indicated by the modified hypothesis as depicted in FIG. 6b. For instance, the modified hypothesis presentation module 238* of the mobile device 30 or the computing device 10 presenting an indication of a relationship between at least a first type of subjective observation (e.g., "bad weather") and a second type of subjective observation (e.g., spouse appears to be in bad mood) as indicated by the modified hypothesis 80.

Figure 6C:
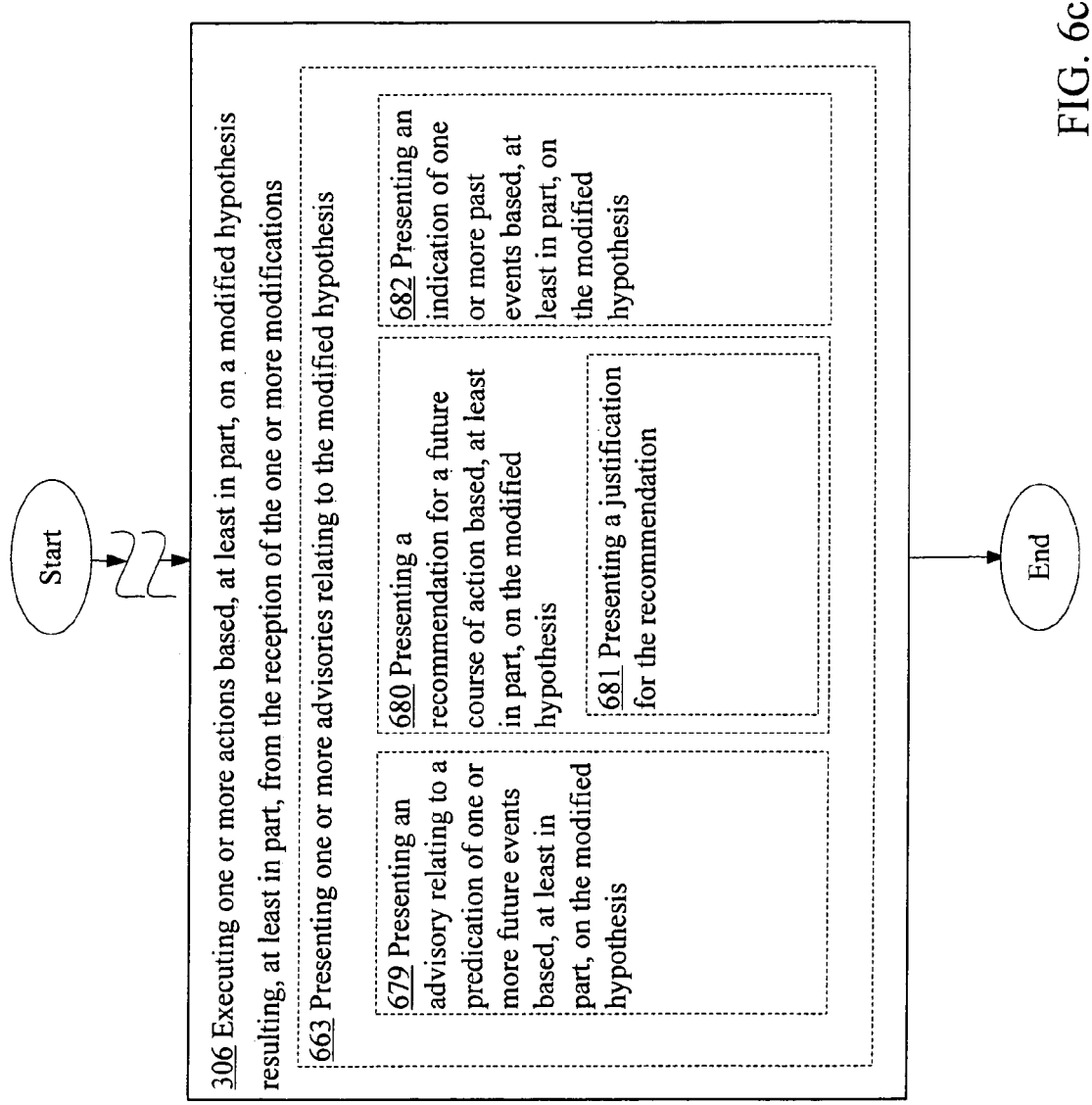
FIG. 6c is a high-level logic flowchart of a process depicting alternate implementations of the action execution operation 306 of FIG. 3.

In various implementations, operation 663 of FIG. 6a for presenting one or more advisories 90 may include an operation 679 for presenting an advisory relating to a predication of one or more future events based, at least in part, on the modified hypothesis as depicted in FIG. 6c. For instance, the prediction presentation module 240* of the mobile device 30 or the computing device 10 presenting (e.g., indicating via a user interface 122* or transmitting via a wireless and/or wired network 40) an advisory 90 relating to a predication of one or more future events (e.g., "you will have a headache tomorrow morning because you drank last night") based, at least in part, on the modified hypothesis 80.

In various implementations, operation 663 may include an operation 680 for presenting a recommendation for a future course of action based, at least in part, on the modified hypothesis as depicted in FIG. 6c. For instance, the recommendation presentation module 242* of the mobile device 30 or the computing device 10 presenting (e.g., indicating via a user interface 122* or transmitting via a wireless and/or wired network 40) a recommendation for a future course of action (e.g., "you should bring aspirin to work tomorrow") based, at least in part, on the modified hypothesis 80.

In some implementations, operation 680 may further include an operation 681 for presenting a justification for the recommendation as depicted in FIG. 6c. For instance, the justification presentation module 244* of the mobile device 30 or the computing device 10 presenting a justification for the recommendation (e.g., "you should bring aspirin to work tomorrow because you drank 12 mugs of beer tonight").

In some implementations, operation 663 may include an operation 682 for presenting an indication of one or more past events based, at least in part, on the modified hypothesis as depicted in FIG. 6c. For instance, the past event presentation module 246* of the mobile device 30 or the computing device 10 presenting (e.g., indicating via a user interface 122* or transmitting via a wireless and/or wired network 40) an indication of one or more past events based, at least in part, on the modified hypothesis 80 (e.g., "the last time you drank 12 mugs of beer, you had a hangover the next morning").

Figure 6D:
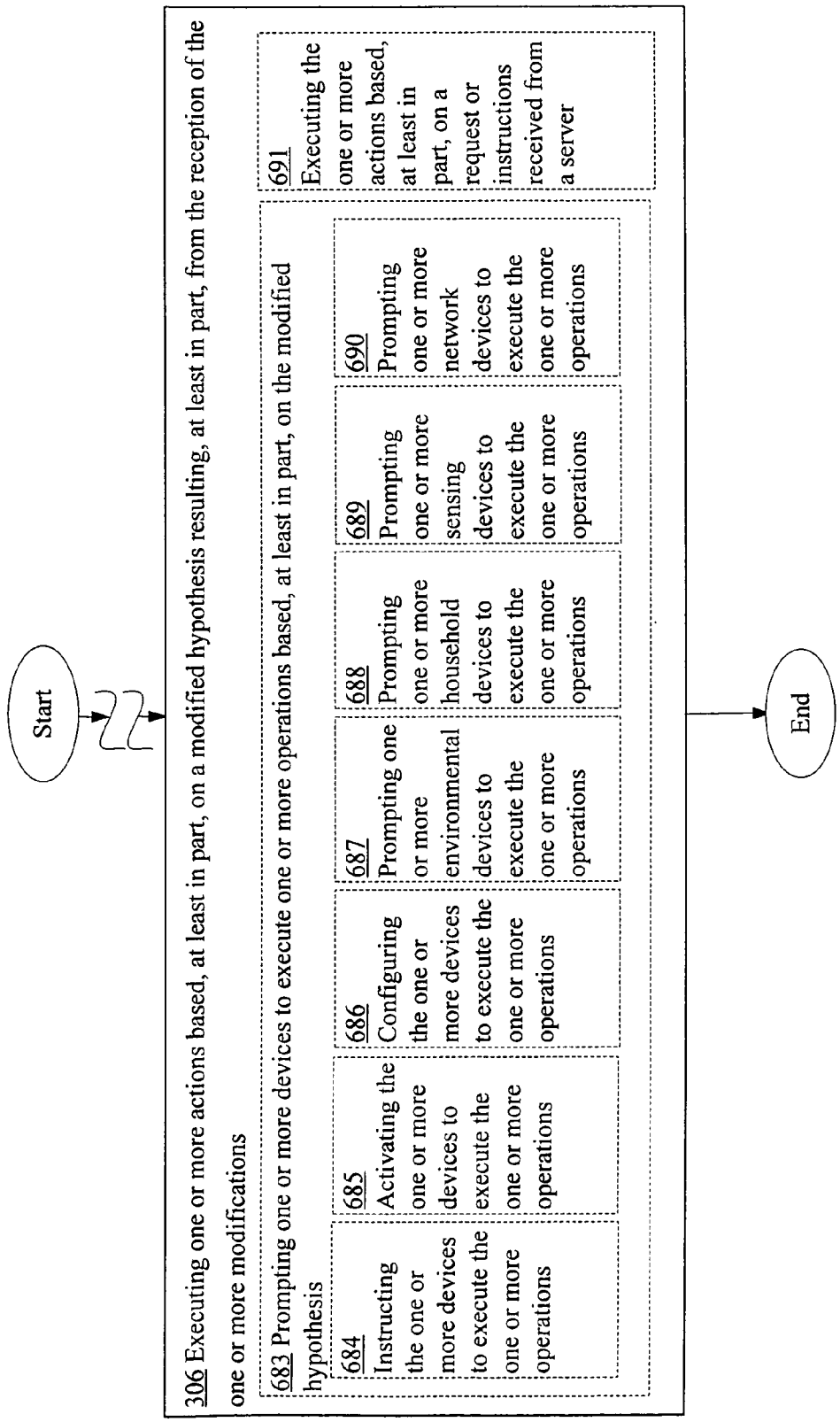
FIG. 6d is a high-level logic flowchart of a process depicting alternate implementations of the action execution operation 306 of FIG. 3.

Referring back to the action execution operation 306 of FIG. 3, the action execution operation 306, in various alternative implementations, may include prompting 91* one or more devices to execute one or more operations. For example, in some implementations, the action execution operation 306 may include an operation 683 for prompting one or more devices to execute one or more operations based, at least in part, on the modified hypothesis as depicted in FIG. 6d. For instance, the device prompting module 248* of the mobile device 30 or the computing device 10 prompting 91* one or more devices (e.g., network and/or local devices 55 and/or sensing devices 35*) to execute one or more operations based, at least in part, on the modified hypothesis 80.

Various techniques may be employed in order to prompt one or more devices to execute one or more operations in various alternative implementations. For example, in some implementations, operation 683 may include an operation 684 for instructing the one or more devices to execute the one or more operations as depicted in FIG. 6d. For instance, the device instruction module 250* of the mobile device 30 or the computing device 10 instructing the one or more devices (e.g., directly instructing a local device or indirectly instructing a remote network device via wireless and/or wired network 40) to execute the one or more operations. As an illustration, instructing a home appliance or a sensing device 35* to execute one or more operations in accordance with instructions provided by the device instruction module 250*.

In some implementations, operation 683 may include an operation 685 for activating the one or more devices to execute the one or more operations as depicted in FIG. 6d. For instance, the device activation module 252* of the mobile device 30 or the computing device 10 activating (e.g., directly activating a local device or indirectly activating a network device via wireless and/or wired network 40) the one or more devices (e.g., a home environmental device such as an air conditioner or an air purifier) to execute the one or more operations.

In some implementations, operation 683 may include an operation 686 for configuring the one or more devices to execute the one or more operations as depicted in FIG. 6d. For instance, the device configuration module 254* of the mobile device 30 or the computing device 10 configuring (e.g., directly configuring a local device or indirectly configuring a network device via wireless and/or wired network 40) the one or more devices (e.g., a personal device such as the mobile device 30 or a standalone computing device 10) to execute the one or more operations.

Various types of devices may be prompted through operation 683 in various alternative implementations. For example, in some implementations, operation 683 may include an operation 687 for prompting one or more environmental devices to execute the one or more operations as depicted in FIG. 6d. For instance, the device prompting module 248* of the mobile device 30 or the computing device 10 prompting 91* one or more environmental devices (e.g., air conditioner, humidifier, air purifier, and so forth) to execute the one or more operations.

In some implementations, operation 683 may include an operation 688 for prompting one or more household devices to execute the one or more operations as depicted in FIG. 6d. For instance, the device prompting module 250* of the mobile device 30 or the computing device 10 prompting one or more household devices (e.g., a television, hot water heater, lawn sprinkler system, and so forth) to execute the one or more operations.

In some implementations, operation 683 may include an operation 689 for prompting one or more sensing devices to execute the one or more operations as depicted in FIG. 6d. For instance, the device prompting module 248* of the mobile device 30 or the computing device 10 prompting 91* one or more sensing devices 35* to execute (e.g., physical or physiological sensing devices, environmental sensing devices, GPSs, pedometers, accelerometers, and so forth) the one or more operations.

In some implementations, operation 683 may include an operation 690 for prompting one or more network devices to execute the one or more operations as depicted in FIG. 6d. For instance, the device prompting module 248* of the mobile device 30 or the computing device 10 prompting one or more network devices (e.g., devices that can interface with a wireless and/or wired network 40) to execute the one or more operations.

Referring back to the action execution operation 306 of FIG. 3, in various implementations, the one or more actions to be executed through action execution operation 306 may be executed in response to receiving a request or instructions from network device such as a server. For example, in some implementations, the action execution operation 306 may include an operation 691 for executing the one or more actions based, at least in part, on a request or instructions received from a server as depicted in FIG. 6d. For instance, the action execution module 108' of the mobile device 30 executing the one or more actions based, at least in part, on a request or instructions received (e.g., as received by the request/instruction reception module 237 of the mobile device 30) from a server (e.g., computing device 10 in embodiments where the computing device 10 is a network server).

Figure 6E:
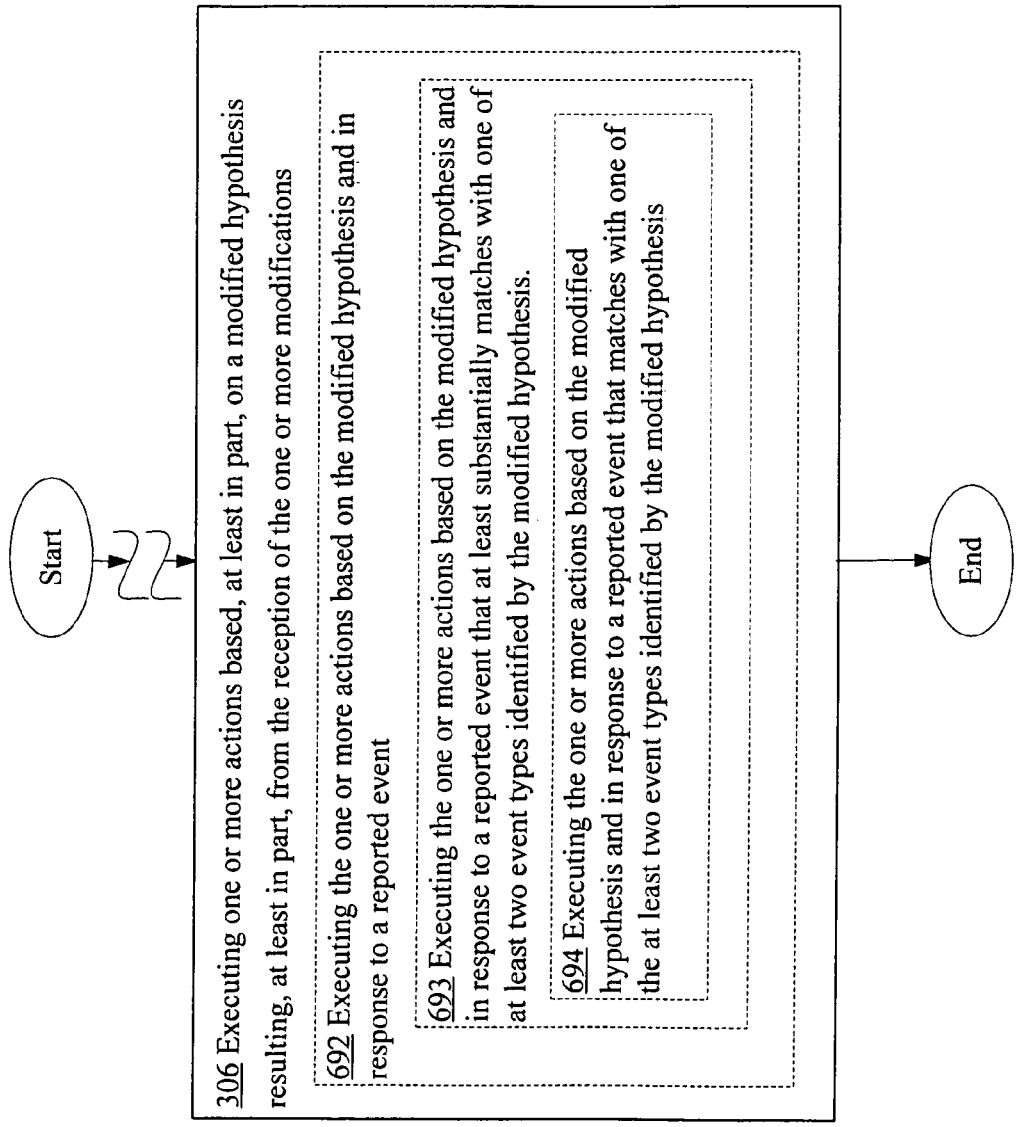
FIG. 6e is a high-level logic flowchart of a process depicting alternate implementations of the action execution operation 306 of FIG. 3.

The one or more actions to be executed in the action execution operation 306 of FIG. 3 may be in response to a reported event in addition to being based at least in part to the modified hypothesis 80. For example, in various implementations, the action execution operation 306 may include an operation 692 for executing the one or more actions based on the modified hypothesis and in response to a reported event as depicted in FIG. 6e. For instance, the action execution module 108* of the mobile device 30 or the computing device 10 executing the one or more actions based on the modified hypothesis 80 and in response to a reported event (e.g., in response to the reported event reception module 110* of the mobile device 30 or the computing device 10 receiving data indicating a reported event).

In some implementations, operation 692 may further include an operation 693 for executing the one or more actions based on the modified hypothesis and in response to a reported event that at least substantially matches with one of at least two event types identified by the modified hypothesis as depicted in FIG. 6e. For instance, the action execution module 108* of the mobile device 30 or the computing device 10 executing the one or more actions based on the modified hypothesis 80 and in response to a reported event that substantially matches with one of at least two event types identified by the modified hypothesis 80. To illustrate, suppose the modified hypothesis 80 indicates a relationship between eating a particular Mexican dish at a particular restaurant (e.g., an event type) with a stomach ache (e.g., another event type). Under this scenario, the action execution module 108* may execute an action (e.g., indicate a warning about a pending stomach ache) if it is reported that a similar Mexican dish was consumed at the same restaurant (e.g., reported event).

Operation 693, in turn, may further include an operation 694 for executing the one or more actions based on the modified hypothesis and in response to a reported event that matches with one of the at least two event types identified by the modified hypothesis as depicted in FIG. 6e. For instance, the action execution module 108* of the mobile device 30 or the computing device 10 executing the one or more actions based on the modified hypothesis 80 and in response to a reported event (e.g., in response to the reported event reception module 110* of the mobile device 30 or the computing device 10 receiving data indicating a reported event) that matches with one of the at least two event types identified by the modified hypothesis 80. To illustrate, suppose the modified hypothesis 80 indicates a relationship between exercising on a treadmill (e.g., an event type) and feeling hot (e.g., another event type). Under this scenario, the action execution module 108* may execute an action (e.g., configuring an air conditioner to operate at full power) if it is reported that the treadmill was used for exercising (e.g., reported event).

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those having skill in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes"

should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.).

In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

What is claimed is:

1. A system in the form of a machine, article of manufacture, or composition of matter, comprising:
a hypothesis presentation module configured to present one or more hypotheses including presenting to a user a hypothesis that identifies at least a relationship between a first event type and a second event type;
a modification reception module configured to receive at least one modification to modify the hypothesis from the user; and
an action execution module configured to execute at least one action based, at least in part, on a modified hypothesis resulting, at least in part, from the reception of the at least one modification by the modification reception module.

2. The system of claim 1, wherein said hypothesis presentation module configured to present one or more hypotheses including presenting to a user a hypothesis that identifies at least a relationship between a first event type and a second event type comprises:
an editable hypothesis presentation module configured to present an editable form of the hypothesis to the user.

3. The system of claim 2, wherein said editable hypothesis presentation module configured to present an editable form of the hypothesis to the user comprises:
an editable hypothesis presentation module configured to present an editable form of the hypothesis including at least a first editable symbolic representation and a second editable symbolic representation representing the first event type and the second event type, respectively.

4. The system of claim 1, wherein said hypothesis presentation module configured to present one or more hypotheses including presenting to a user a hypothesis that identifies at least a relationship between a first event type and a second event type comprises:
a hypothesis deactivation option presentation module configured to present an option to deactivate or ignore the hypothesis.

5. The system of claim 1, wherein said hypothesis presentation module configured to present one or more hypotheses including presenting to a user a hypothesis that identifies at least a relationship between a first event type and a second event type comprises:
a hypothesis presentation module configured to present a hypothesis that identifies a time or temporal relationship between the first event type and the second event type.

6. The system of claim 1, wherein said hypothesis presentation module configured to present one or more hypotheses including presenting to a user a hypothesis that identifies at least a relationship between a first event type and a second event type comprises:
a hypothesis presentation module configured to present a hypothesis that identifies a relationship between two subjective user state types.

7. The system of claim 1, wherein said hypothesis presentation module configured to present one or more hypotheses including presenting to a user a hypothesis that identifies at least a relationship between a first event type and a second event type comprises:
a hypothesis presentation module configured to present a hypothesis that identifies a relationship between a subjective user state type and a subjective observation type.

8. The system of claim 1, wherein said hypothesis presentation module configured to present one or more hypotheses including presenting to a user a hypothesis that identifies at least a relationship between a first event type and a second event type comprises:
a hypothesis presentation module configured to present a hypothesis that identifies a relationship between a subjective user state type and an objective occurrence type.

9. The system of claim 1, wherein said hypothesis presentation module configured to present one or more hypotheses including presenting to a user a hypothesis that identifies at least a relationship between a first event type and a second event type comprises:
a hypothesis presentation module configured to present a hypothesis that identifies a relationship between two subjective observation types.

10. The system of claim 1, wherein said hypothesis presentation module configured to present one or more hypotheses including presenting to a user a hypothesis that identifies at least a relationship between a first event type and a second event type comprises:
a hypothesis presentation module configured to present a hypothesis that identifies a relationship between a subjective observation type and an objective occurrence type.

11. The system of claim 1, wherein said hypothesis presentation module configured to present one or more hypotheses including presenting to a user a hypothesis that identifies at least a relationship between a first event type and a second event type comprises:
  a hypothesis presentation module configured to present a hypothesis related to the user.

12. The system of claim 1, wherein said hypothesis presentation module configured to present one or more hypotheses including presenting to a user a hypothesis that identifies at least a relationship between a first event type and a second event type comprises:
  a hypothesis presentation module configured to present a hypothesis related to a third party.

13. The system of claim 1, wherein said hypothesis presentation module configured to present one or more hypotheses including presenting to a user a hypothesis that identifies at least a relationship between a first event type and a second event type comprises:
  a hypothesis presentation module configured to present a hypothesis related to a device.

14. The system of claim 1, wherein said hypothesis presentation module configured to present one or more hypotheses including presenting to a user a hypothesis that identifies at least a relationship between a first event type and a second event type comprises:
  a hypothesis presentation module configured to present a hypothesis related to one or more environmental characteristics.

15. The system of claim 1, wherein said modification reception module configured to receive at least one modification to modify the hypothesis from the user comprises:
  an electronic entry reception module configured to receive the at least one modification via at least one electronic entry.

16. The system of claim 15, wherein said electronic entry reception module configured to receive the at least one modification via at least one electronic entry comprises:
  a blog entry reception module configured to receive the at least one modification via at least one blog entry.

17. The system of claim 15, wherein said electronic entry reception module configured to receive the at least one modification via at least one electronic entry comprises:
  a status report reception module configured to receive the at least one modification via at least one status report.

18. The system of claim 15, wherein said electronic entry reception module configured to receive the at least one modification via at least one electronic entry comprises:
  a diary entry reception module configured to receive the at least one modification via at least one diary entry.

19. The system of claim 1, wherein said modification reception module configured to receive at least one modification to modify the hypothesis from the user comprises:
  a modification reception module configured to receive a modification to delete a third event type from the hypothesis.

20. The system of claim 1, wherein said modification reception module configured to receive at least one modification to modify the hypothesis from the user comprises:
  a modification reception module configured to receive a modification to add a third event type to the hypothesis with respect to the first event type and the second event type.

21. The system of claim 1, wherein said modification reception module configured to receive at least one modification to modify the hypothesis from the user comprises:
  a modification reception module configured to receive a modification to revise the first event type.

22. The system of claim 21, wherein said modification reception module configured to receive a modification to revise the first event type comprises:
  a modification reception module configured to receive a modification to revise the second event type.

23. The system of claim 1, wherein said modification reception module configured to receive at least one modification to modify the hypothesis from the user comprises:
  a modification reception module configured to receive a modification to revise the relationship between the first event type and the second event type.

24. The system of claim 1, wherein said modification reception module configured to receive at least one modification to modify the hypothesis from the user comprises:
  a modification reception module configured to receive a modification to modify at least one type of subjective user state.

25. The system of claim 1, wherein said modification reception module configured to receive at least one modification to modify the hypothesis from the user comprises:
  a modification reception module configured to receive a modification to modify at least one type of subjective observation.

26. The system of claim 1, further comprising:
  a hypothesis modification module configured to, based on the at least one modification, modify the hypothesis to generate the modified hypothesis.

27. The system of claim 1, wherein said action execution module configured to execute at least one action based, at least in part, on a modified hypothesis resulting, at least in part, from the reception of the at least one modification by the modification reception module comprises:
  an advisory presentation module configured to present at least one advisory related to the modified hypothesis.

28. The system of claim 27, wherein said advisory presentation module configured to present at least one advisory related to the modified hypothesis comprises:
  a modified hypothesis presentation module configured to present one or more forms of the modified hypothesis.

29. The system of claim 28, wherein said modified hypothesis presentation module configured to present one or more forms of the modified hypothesis comprises:
  a modified hypothesis presentation module configured to present a relationship between at least two event types as indicated by the modified hypothesis.

30. The system of claim 29, wherein said modified hypothesis presentation module configured to present a relationship between at least two event types as indicated by the modified hypothesis comprises:
  a modified hypothesis presentation module configured to present a relationship between two types of subjective user states as indicated by the modified hypothesis.

31. The system of claim 29, wherein said modified hypothesis presentation module configured to present a relationship between at least two event types as indicated by the modified hypothesis comprises:
  a modified hypothesis presentation module configured to present a relationship between a type of subjective user state and a type of objective occurrence as indicated by the modified hypothesis.

32. The system of claim 29, wherein said modified hypothesis presentation module configured to present a relationship between at least two event types as indicated by the modified hypothesis comprises:
a modified hypothesis presentation module configured to present a relationship between a type of subjective user state and a type of subjective observation as indicated by the modified hypothesis.

33. The system of claim 29, wherein said modified hypothesis presentation module configured to present a relationship between at least two event types as indicated by the modified hypothesis comprises:
a modified hypothesis presentation module configured to present a relationship between a type of objective occurrence and a type of subjective observation as indicated by the modified hypothesis.

34. The system of claim 29, wherein said modified hypothesis presentation module configured to present a relationship between at least two event types as indicated by the modified hypothesis comprises:
a modified hypothesis presentation module configured to present a relationship between two types of subjective observations as indicated by the modified hypothesis.

35. The system of claim 27, wherein said advisory presentation module configured to present at least one advisory related to the modified hypothesis comprises:
a prediction presentation module configured to present based, at least in part, on the modified hypothesis, a prediction of one or more future events.

36. The system of claim 27, wherein said advisory presentation module configured to present at least one advisory related to the modified hypothesis comprises:
a recommendation presentation module configured to present based, at least in part, on the modified hypothesis, a recommendation for a future course of action.

37. The system of claim 1, wherein said action execution module configured to execute at least one action based, at least in part, on a modified hypothesis resulting, at least in part, from the reception of the at least one modification by the modification reception module comprises:
a device prompting module configured to prompt at least one device to execute at least one operation based, at least in part, on the modified hypothesis.

38. The system of claim 37, wherein said device prompting module configured to prompt at least one device to execute at least one operation based, at least in part, on the modified hypothesis comprises:
a device prompting module configured to prompt at least one environmental device to execute the at least one operation.

39. The system of claim 37, wherein said device prompting module configured to prompt at least one device to execute at least one operation based, at least in part, on the modified hypothesis comprises:
a device prompting module configured to prompt at least one household device to execute the at least one operation.

40. The system of claim 37, wherein said device prompting module configured to prompt at least one device to execute at least one operation based, at least in part, on the modified hypothesis comprises:
a device prompting module configured to prompt at least one sensing device to execute the at least one operation.

41. The system of claim 37, wherein said device prompting module configured to prompt at least one device to execute at least one operation based, at least in part, on the modified hypothesis comprises:
a device prompting module configured to prompt at least one network device to execute the at least one operation.

42. The system of claim 1, wherein said action execution module configured to execute at least one action based, at least in part, on a modified hypothesis resulting, at least in part, from the reception of the at least one modification by the modification reception module comprises:
an action execution module configured to execute the at least one action in response to a reported event.

43. The system of claim 42, wherein said action execution module configured to execute the at least one action in response to a reported event comprises:
an action execution module configured to execute the at least one action in response to a reported event that at least substantially matches with one of at least two event types identified by the modified hypothesis.

44. The system of claim 43, wherein said action execution module configured to execute the at least one action in response to a reported event that at least substantially matches with one of at least two event types identified by the modified hypothesis comprises:
an action execution module configured to execute the at least one action in response to a reported event that matches with one of the at least two event types identified by the modified hypothesis.

45. An article of manufacture, comprising:
a non-transitory storage medium bearing:
one or more instructions for presenting one or more hypotheses including presenting to a user a hypothesis that identifies at least a relationship between a first event type and a second event type;
one or more instructions for receiving at least one modification to modify the hypothesis from the user; and
one or more instructions for executing at least one action based, at least in part, on a modified hypothesis resulting, at least in part, from the reception of the at least one modification.

46. A system, comprising:
circuitry configured to present one or more hypotheses including presenting to a user a hypothesis that identifies at least a relationship between a first event type and a second event type;
circuitry configured to receive at least one modification to modify the hypothesis from the user; and
circuitry configured to execute at least one action based, at least in part, on a modified hypothesis resulting, at least in part, from the reception of the at least one modification.

* * * * *